(12) United States Patent
Nakamura et al.

(10) Patent No.: US 6,444,393 B2
(45) Date of Patent: Sep. 3, 2002

(54) ANIONIC INFRARED-RAY ABSORBING AGENT, PHOTOSENSITIVE COMPOSITION AND PLANOGRAPHIC PRINTING PLATE PRECURSOR USING SAME

(75) Inventors: Tatsuo Nakamura; Kazuto Kunita, both of Shizuoka-ken; Shin-ichi Morishima, Kanagawa, all of (JP)

(73) Assignee: Fuji Photo Film Co., Ltd., Minami-Ashigara (JP)

( * ) Notice: Subject to any disclaimer, the term of this patent is extended or adjusted under 35 U.S.C. 154(b) by 0 days.

(21) Appl. No.: 09/275,259

(22) Filed: Mar. 23, 1999

(30) Foreign Application Priority Data

| Mar. 26, 1998 | (JP) | ............................................ | 10-079912 |
| Aug. 24, 1998 | (JP) | ............................................ | 10-237634 |
| Sep. 24, 1998 | (JP) | ............................................ | 10-270097 |

(51) Int. Cl.⁷ .............................................. G03F 7/004
(52) U.S. Cl. ..................... 430/270.1; 430/302; 430/348
(58) Field of Search ............................ 430/270.1, 302, 430/348, 944, 945, 964

(56) References Cited

U.S. PATENT DOCUMENTS 4,632,895 A    12/1986   Patel et al. ................. 430/201

(List continued on next page.)

FOREIGN PATENT DOCUMENTS

| EP | 0 397 435 | 11/1990 |
| EP | 823 327 | * 2/1998 |
| EP | 0 901 902 | 3/1999 |
| EP | 0 908 305 | 4/1999 |
| EP | 0 908 306 | 4/1999 |
| EP | 0 911 153 | 4/1999 |
| GB | 1245924 | 2/1972 |
| JP | 11025505 | * 1/1999 |
| JP | 11058960 | * 3/1999 |
| WO | 97/39894 | 10/1997 |

OTHER PUBLICATIONS

Horspool, William M. "Aspects of Organic Photochemistry." Academic Press, New York 1976, pp. 30–33.*

(List continued on next page.)

Primary Examiner—Janet Baxter
Assistant Examiner—Barbara Gilmore
(74) Attorney, Agent, or Firm—Burns, Doane, Swecker & Mathis, LLP

(57) ABSTRACT

A positive-type photosensitive composition that has high sensitivity, good latitude in development, and good storage stability and is for use in a direct plate production process using an infrared laser and a novel anionic infrared-ray absorbing agent suitable therefor. This composition comprises (a) an anionic, infrared-ray absorbing agent represented by general formula (I) and (b) a polymeric compound that is insoluble in water but soluble in an aqueous alkaline solution so that the composition becomes soluble in the aqueous alkaline solution when irradiated with the infrared laser. In the general formula (I) given below, M represents a conjugated chain, $G_a^-$ represents an anionic substituent group, $G_b$ represents a neutral substituent group, and $X^{m+}$ represents a cation including a portion, the cation having a valence of from 1 to m, wherein m represents an integer ranging from 1 to 6.

$$\{G_a^- - M - G_b\}_m X^{m+} \qquad (I)$$

6 Claims, 2 Drawing Sheets

¹H NMR of IR(I-21) (300MHz, SOLVENT DMSO d-6)

U.S. PATENT DOCUMENTS

| | | | | |
|---|---|---|---|---|
| 4,708,925 A | * | 11/1987 | Newman | 430/270 |
| 4,763,966 A | | 8/1988 | Suzuki et al. | 350/1.1 |
| 4,789,619 A | * | 12/1988 | Ruckert et al. | 430/270 |
| 5,741,619 A | * | 4/1998 | Aoshima et al. | 430/175 |
| 5,814,431 A | * | 9/1998 | Nagasaka et al. | 430/281.1 |
| 6,004,728 A | * | 12/1999 | Deroover et al. | 430/302 |
| 6,040,113 A | * | 3/2000 | Van Damm et al. | 430/271.1 |
| 6,060,218 A | * | 5/2000 | Van Damme et al. | 430/302 |
| 6,074,802 A | * | 7/2000 | Murata et al. | 430/270.1 |
| 6,083,663 A | * | 7/2000 | Vermeersch et al. | 430/302 |
| 6,117,613 A | * | 9/2000 | Kawauchi et al. | 430/270.1 |
| 6,159,673 A | * | 12/2000 | Nishigaki et al. | 430/512 |
| 6,248,886 B1 | * | 6/2001 | Williams et al. | 544/106 |
| 6,248,893 B1 | * | 6/2001 | Williams et al. | 546/347 |

OTHER PUBLICATIONS

Turro, Nicholas J. "Modern Molecular Photochemistry." The Benjamin/Cummings Publishing Co., Inc., Massachusetts, 1978. pp. 2–7, 72–75, 242–245.*

Kavarnos, George J. "Fundamentals of Photoinduced Electron Transfer." VCH Publishers, London, 1993. pp. 20–22.*

Grant, Julius. Hackh's Chemical Dictionary. $3^{rd}$ Edition. 1944.*

Timpe, Hans–Joachim. "Mechanistical Aspects of Thermal Plates." International Conference on Digital Printing Technologies 1999: 209–212.*

* cited by examiner $^1$H NMR of IR(I-13) (300MHz, SOLVENT CD$_3$OD)

ANIONIC INFRARED-RAY ABSORBING AGENT, PHOTOSENSITIVE COMPOSITION AND PLANOGRAPHIC PRINTING PLATE PRECURSOR USING SAME

BACKGROUND OF THE INVENTION

1. Field of the Invention

The present invention relates to a photosensitive composition suitable as a positive-type image forming material and also to a planographic printing plate precursor using the composition. More specifically, the present invention relates to a positive-type image forming composition that is designed for use with an infrared laser and is characterized by writability with heat, particularly with an infrared laser, thermal head or the like, and by suitability for use in a planographic printing plate precursor that can be prepared by a so-called direct plate production process in which the plate is prepared directly according to digital signals, particularly from a computer or the like. Further, the present invention relates to a planographic printing plate precursor using the foregoing composition.

2. Description of the Related Art

In recent years, due to progress in technologies related to solid-state lasers and semiconductor lasers emitting rays in regions ranging from a near-infrared region to an infrared region, a system that uses these infrared lasers in a printing plate production process so that a printing plate is prepared directly according to digital data from a computer, has been drawing attention.

Japanese Patent Application Laid-Open (JP-A) No. 7-285,275 discloses a material for a positive-type planographic printing plate precursor for use with an infrared laser in direct plate production. This invention relates to an image forming material comprising a resin soluble in an aqueous alkaline solution, a substance capable of generating heat by absorbing light, and a positive-type photosensitive compound such as a quinone diazide, wherein in image portions, the positive-type photosensitive compound acts as a dissolution inhibiting agent which substantially reduces the solubility of the resin soluble in the aqueous alkaline solution, whereas in non-image portions, the positive-type compound is thermally decomposed to thereby lose its dissolution inhibiting capability and can be removed through developing.

As a result of their investigations, the present inventors have found that a positive image can be obtained without using a quinone diazide in an image recording material. However, mere elimination of the quinone diazide from the image recording material presents a drawback in which the stability of sensibility with respect to the concentration of a developer, i.e., latitude in development, becomes poor.

On the other hand, an onium salt or a compound capable of forming alkali-insoluble hydrogen bonds is known to act as an agent that inhibits an alkali -soluble polymer from becoming dissolved in an alkali. As to an image forming material for use with an infrared laser, WO 97/39,894 describes that a composition that uses a cationic, infrared-ray absorbing dye as an agent that inhibits an alkali-soluble polymer from being dissolved in an alkali exhibits a positive-type operation. This positive-type operation in an operation in which the infrared-ray absorbing dye absorbs the laser light and generates heat which causes the polymeric film to lose a dissolution-inhibiting effect in irradiated region, to thereby form an image.

However, this invention is associated with a problem that, although the image-forming performance of the photosensitive composition at a surface thereof irradiated with a laser is satisfactory, a satisfactory effect cannot be obtained in the depths of the composition because a sufficient amount of heat is not diffused to the depths, and, as a result, an on-off distinction between exposed areas and unexposed areas is insufficient in a developing process with alkali. Consequently, a good image is not obtained (i.e., low sensitivity and narrow latitude in development). The term "latitude in development" as used herein means the broadness of the allowable range of the alkali concentrations of an alkali developer for the creation of a good image.

Further, infrared-ray absorbing agents are generally used in order to improve the sensitivity of image forming materials. As an infrared-ray absorbing agent used for image forming materials, for example, the following are known: dyes such as cyanine dyes or metal complexes, and pigments such as carbon black or phthalocyanine. However, metal complexes are problematic since their molecular extinction coefficients are low, and pigments are problematic since they tend to cause blemishes during development. Cyanine dyes impair development when they are used in excess though they are suited for the purpose in terms of wavelengths and molecular extinction coefficients.

The inventors of the present invention found that the use of an anionic oxonol dye provides good images and as a result filed Japanese Patent Application No. 10-79912. However, more improvement regarding wavelengths that are apt for infrared-rays was desired.

As an example of an oxonol dye that absorbs wavelength in a long wavelength region, EP No. 444789 discloses pentamethine compounds. However, EP No. 444789 includes no description of physical properties such as the molecular extinction coefficient or the like although they are important factors for an image forming material. EP No. 397435 discloses examples of heptamethineoxonol dyes. However these compounds have a problem in that their absorption wavelengths are 780 nm or less and thus insufficient for corresponding to an IR laser. Additionally, their molecular extinction coefficients are small.

As is discussed above, there are very few known oxonol dyes whose maximum absorption wavelength are near or over 800 nm, and therefore an anionic, infrared-ray absorbing agent whose absorption wavelength is in a long wavelength region has been desired.

Accordingly, an object of the present invention is to provide a novel anionic, infrared-ray absorbing agent having an absorption wavelength is in a long wavelength region and capable of being preferably used for an image forming material, to provide a photosensitive composition characterized by high sensitivity, good latitude in development, and good storage stability, and to provide a positive-type planographic printing plate precursor that uses the foregoing composition in a direct plate production process and enables an image to be formed with high sensitivity with an infrared laser.

SUMMARY OF THE INVENTION

After a series of studies for the purpose of upgrading image-forming performance, i.e., increasing sensitivity and latitude in development, the present inventors found that latitude in development was improved by use of specific, anionic, infrared-ray absorbing agents, and filed a patent application, i.e., Japanese Patent Application No. 10-79,912, based on this finding. As a result of further studies, they discovered that a better match with a laser as well as superior sensitivity and broad latitude in development can be obtained by using, inter alia, an oxonol-based dye having a relatively long conjugated chain in a molecule thereof as the anionic, infrared-ray absorbing agent, and they have achieved the present invention based on this finding.

Further, among these anionic infrared-ray absorbing agents, the compound represented by the following general formula (1) is a novel compound with naphthoindandione groups in its end groups, which provides a large molecular extinction coefficient and an absorption wavelength in a long wavelength region.

Namely, a photosensitive composition of the present invention comprises the following components (a) and (b) and becomes soluble in an aqueous alkaline solution when irradiated with an infrared laser:

(a) an anionic, infrared-ray absorbing agent; and
(b) a polymeric compound insoluble in water but soluble in an aqueous alkaline solution.

Preferably, the (a) the anionic, infrared-ray absorbing agent of the photosensitive composition of the present invention is (a-1) an anionic metal complex, (a-2) an anionic carbon black, (a-3) an anionic phthalocyanine, or (a-4) a compound represented by the following general formula (I):

$$\{G_a^- - M - G_b\}_m \, X^{m+} \quad (I)$$

wherein, M represents a conjugated chain of carbon atoms; $G_a^-$ represents an anionic substituent group; $G_b$ represents a neutral substituent group; and $X^{m+}$ represents a cation including a proton, said cation having a valence of from 1 to m, wherein m represents an integer ranging from 1 to 6.

Further, it is preferable that (a) the anionic, infrared-ray absorbing agent of the photosensitive composition of the present invention is (a-4) the compound represented by the following general formula (1):

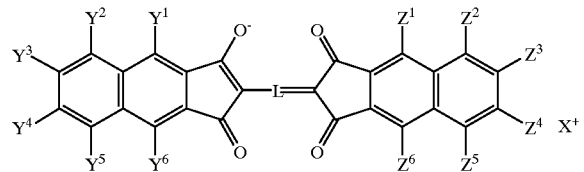

wherein, L represents a conjugated methine chain which has seven or more carbon atoms and which may contain substituent groups that may form a ring by linking together; $X^+$ represents a cation; $Y^1$ to $Y^6$ and $Z^1$ to $Z^6$ each independently represents a hydrogen atom or a substituent group such that substituent groups thereof may form a ring by linking together.

Further, it is preferable that the counter cation of (a) the anionic, infrared-ray absorbing agent has a construction of a thermally decomposable onium salt.

The planographic printing plate precursor of the present invention comprises a substrate and a photosensitive layer formed thereon comprising the foregoing photosensitive composition.

Although the working mechanism of the photosensitive composition of the present invention is not clear, the mechanism is presumably as follows. The use of (a) the anionic, infrared-ray absorbing agent having a relatively long conjugated chain causes the counter cation to act as a dissolution inhibitor of (b) the polymeric compound soluble in alkaline water and the dissolution-inhibiting effect can be eliminated by heat, which is generated when the anionic, infrared-ray absorbing agent absorbs the laser light, in portions irradiated with the laser. Because the anionic, infrared-ray absorbing agent had a relatively long conjugated chain that comprises 7 or more carbon atoms in a molecule thereof, an improvement in sensitivity was achieved, presumably because the anionic, infrared-ray absorbing agent had a high molecular absorption coefficient in a near infrared region and excellent solubility in a solvent.

In a case of conventionally known cationic, infrared-ray absorbing dyes, for the purpose of absorbing light in an infrared region, the molecular structure of the dye is inevitably confined within a limited scope so that the structure that has the dissolution-inhibiting effect, will not inhibit the light absorption in the infrared region. Therefore, the dissolution-inhibiting effect cannot be controlled as desired by the molecular structure. In contrast, when the anionic, infrared-ray absorbing agent is used as in the present invention, since the counter cation can be selected freely and since the dissolution inhibition effect can be controlled at will, image-forming performance can be enhanced as desired, which is an effect of the present invention. In addition, the use of the anionic, infrared-ray absorbing agent having a relatively long conjugated chain, such as heptamethine or nanomethine, in the anionic portion increases the molecular absorption coefficient in the near infrared region, thus improving further the adaptability to a laser. Among these anionic, infrared-ray absorbing agents, the novel compound of the present invention represented by theral formula (1) has naphthoindandione groups in its end groups and therefore has a large molecular extinction coefficient and an absorption wavelength shifted towards longer wavelengths.

Furthermore, the use of a thermally decomposable onium salt as the counter cation of (a) the anionic, infrared-ray absorbing agent enables an image to be formed with an even higher level of sensitivity and broader latitude in development, presumably because the thermally decomposable onium salt is decomposed by the heat generated by the infrared absorbing agent to thereby eliminate the dissolution-inhibiting effect more rapidly and with a higher level of sensitivity.

DESCRIPTION OF THE PREFERRED EMBODIMENTS

Figure 1:
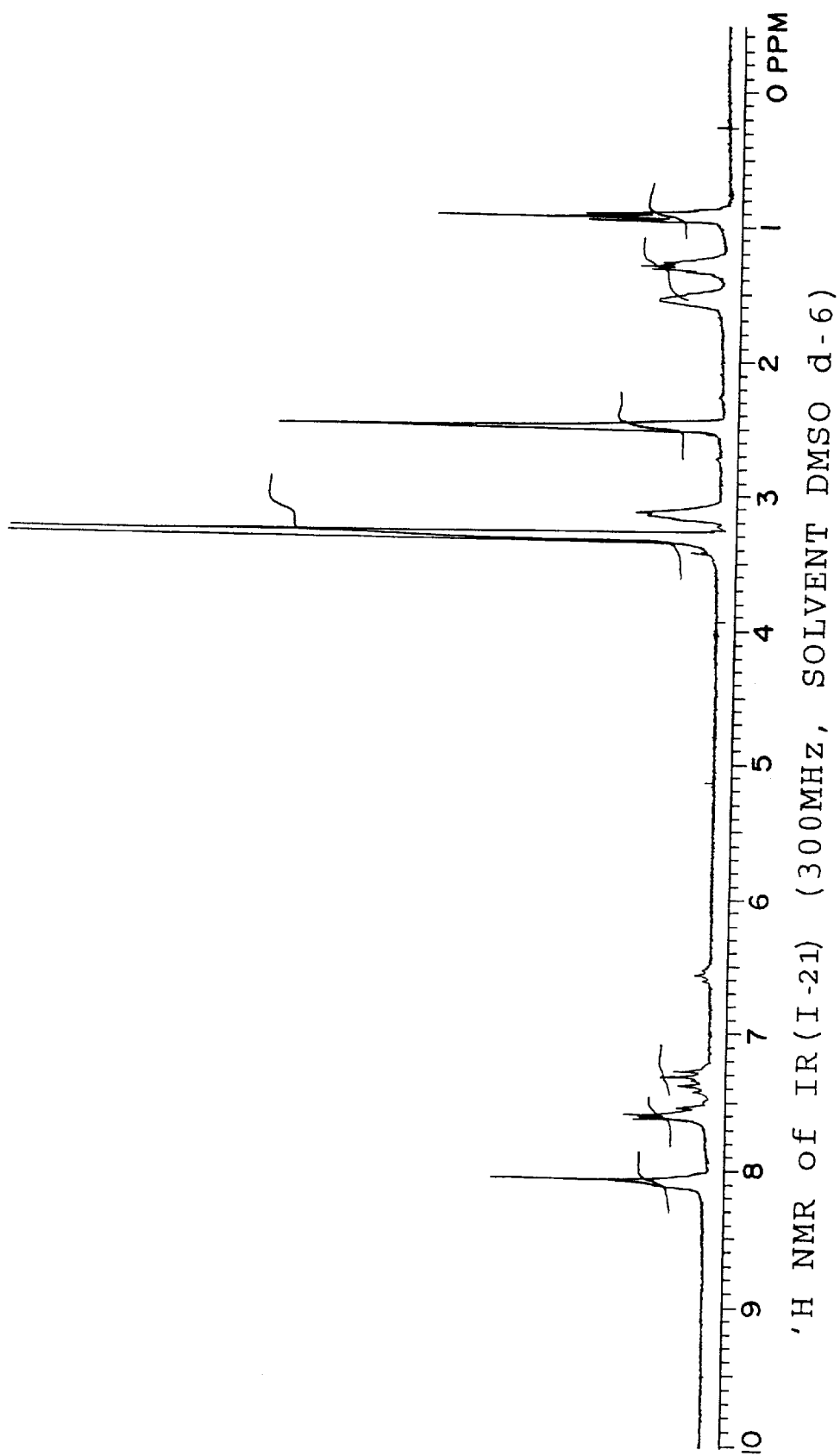
FIG. 1 is a $^1$H NMR chart of IR-21.

The details of the present invention are given below. (a) anionic, infrared-ray absorbing agent The term "anionic, infrared-ray absorbing agent" is used herein to refer to an infrared-ray absorbing agent whose dye mother nucleus, which substantially absorbs infrared rays, does not have a cationic structure and has an anionic structure.

Examples of the anionic, infrared-ray absorbing agent include (a-1) an anionic metal complex, (a-2) an anionic carbon black, (a-3) an anionic phthalocyanine, and (a-4) a compound represented by the general formula (I). The counter cation of the anionic, infrared-ray absorbing agent is a monovalent or polyvalent cation including a proton.

The term "(a-1) anionic metal complex" is used herein to refer to a substance that is anionic as a whole, comprising a central metal and a ligand jointly constituting the complex that substantially absorbs light.

Examples of (a-2) the anionic carbon black include a carbon black to which an anionic group, such as a sulfonic acid group, a carboxylic acid group, or a phosphonic acid group, is linked as a substituent group. For example, a method for introducing such a group into carbon black comprises oxidizing the carbon black with a desired acid as described on page 12 of *The Carbon Black, Handbook,* 3rd edition (edited by the Carbon Black Society of Japan and issued on Apr. 5, 1995 by this society).

As will be described later, an anionic, infrared-ray absorbing agent that is an anionic carbon black whose anionic group has an onium salt as a counter cation linked thereto by ionic bonding, is suited for use in the present invention. However, it must be noted that a substance comprising carbon black and an onium salt adsorbed thereto is not included in the anionic, infrared-ray absorbing agent of the present invention and a substance produced by mere adsorption cannot bring about the effect of the present invention.

The term "(a-3) anionic phthalocyanine" is used herein to refer to a phthalocyanine that is anionic as a whole, comprising a phthalocyanine skeleton having linked thereto an anionic group described as a substituent group in the explanation of (a-2) the anionic carbon black.

Next, the details of (a-4) the compound represented by the general formula (I) are described. The compound represented by the formula (1) falls under what is considered as so-called an oxonol-type IR absorbing agents.

In the general formula (1), L represents a long conjugated methine chain which that may contain substituent groups that may form a ring by linking together and which has 7 or more carbon atoms. When the methine chain contains a substitutent group, the substituent group is preferably selected from the group consisting of an alkyl group, an aryl group, a carbonyl group, a halogen group, a cyano group, an alkenyl group, an alkynyl group, an amino group, a thio group, an oxy group, a sulfonyl group, and the like. Among these, an alkyl group and/or a halogen group is/are most preferably used. From a standpoint of synthetic aptitude, the methine chain being free of substituent group and/or having cyclic structure is/are preferable.

$X^+$ represents a cation. As the cation, metal ions, ammonium salts, sulfonium salts, iodonium salts, diazonium salts, oxonium salts, selenonium salts, phosphonium salts and the like are preferably used. Among these, cations with thermal decomposing property is preferably used from a stand point of image forming.

$Y^1$ to $Y^6$ and $Z^1$ to $Z^6$ each independently represents a hydrogen atom or a substituent group that may form a ring by substituent groups linking together. The substituent group that may be used for $Y^1$ to $Y^6$ and $Z^1$ to $Z^6$ is the same as that used for the substituent group of the methine chain described above. Among these, an alkyl group, a hydrogen atom, a halogen atom or the like is preferably used.

From a standpoint of ease of synthesis, an infrared-ray absorbing agent having at both ends naphthoindandione groups without substituent groups, namely, an infrared-ray absorbing agent wherein $Y^1$ to $Y^6$ and $Z^1$ to $Z^6$ each represents a hydrogen atom is most preferable for the present invention. As a specific example of such an infrared-ray absorbing agent, and as an example with a ring in its methine chain, an anionic, infrared-ray absorbing agent represented by the following general formula (2) may be listed:

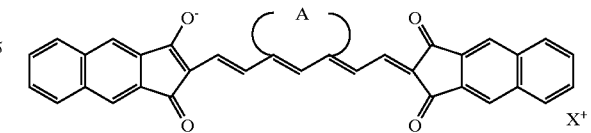

(2)

wherein, A represents 14 or less nonmetallic atoms forming a 5-membered carbocycle, a 6-membered carbocycle, a 7-membered carbocycle, a 5-membered heterocycle, a 6-membered heterocycle, a 7-membered heterocycle, a 5-membered condensed ring, a 6-membered condensed ring or a 7-membered condensed ring, each of the atoms being selected from the group consisting of a carbon atom, a nitrogen atom, an oxygen atom, a sulfur atom and a selenium atom.

When the substituent groups of the methine chain form a ring, the ring is preferably one or two 6-membered carbocycles and may have an additional substituent group.

An anionic infrared-ray absorbing agent wherein $Y^1$ to $Y^6$ and $Z^1$ to $Z^6$ each independently represents a hydrogen atom and has no ring in its methine chain is represented by the following general formula (3):

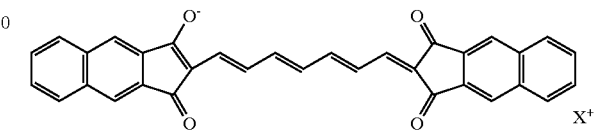

(3)

wherein, $X^+$ represents a cation.

The following are structural formulae, maximum absorption wavelengths and molecular absorption coefficients of representative compounds IR(21) and IR (13) of the novel anionic infrared-ray absorbing agent of the present invention. The maximum absorption wavelength and molecular absorption coefficient of a comparative example dye compound dye-1 and the chemical structure of a preferable example Example 1 are also shown. However, the present invention is not limited to these examples.

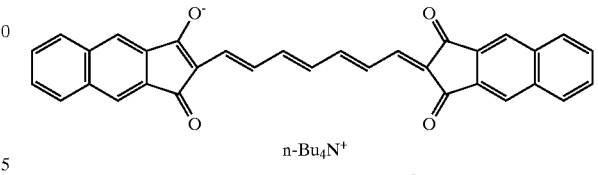

IR21 n-Bu$_4$N$^+$

λmax = 798 nm (MeOH) = 2.0 × 10$^5$ l/mol·cm

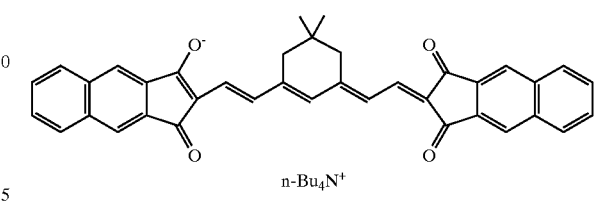

IR13 n-Bu$_4$N$^+$

λmax = 811 nm (MeOH) = 1.7 × 10$^5$ l/mol·cm

-continued dye-1

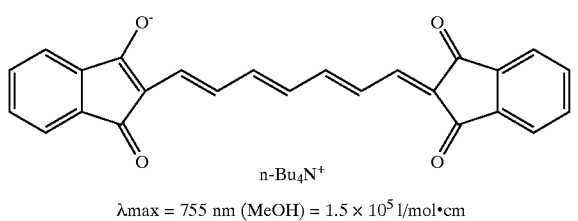

n-Bu₄N⁺

λmax = 755 nm (MeOH) = 1.5 × 10⁵ l/mol·cm

Example 1

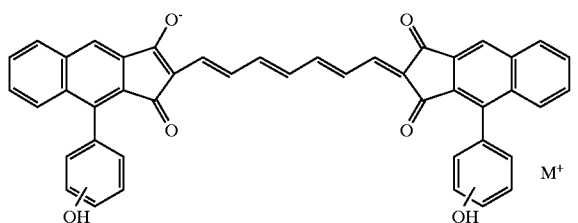

As is understood from the data, the anionic infrared-ray absorbing agent that can be considered a so-called oxonol-dye of the present invention having at both ends naphthoin-dandione groups and having a relatively long methine chain of 7 or more carbon atoms is a novel compound. The inventors of the present invention proved that the novel compound is useful as an image forming material because its absorption wavelength is in a long wavelength range (near 800 nm) and its molecular absorption coefficient is sufficiently high. The superiority of the novel compound of the present invention with regard to the maximum absorption wavelength and the molecular absorption coefficient thereof is apparent in comparison to the dye compound dye-1 whose structure is similar to the novel compound of the present invention.

Next, a description will be given of requirements of a photosensitive composition of the present invention containing the infrared-ray absorbing agent of the present invention having at both ends naphthoindandione groups, having the relatively long conjugated methine chain and represented by the oxonol dye. As is described above, the photosensitive composition of the present invention comprises the following components (a) and (b) and becomes soluble in an aqueous alkaline solution when irradiated with an infrared laser: (a) the anionic, infrared-ray absorbing agent represented by the following general formula (I); and (b) a polymeric compound insoluble in water but soluble in an aqueous alkaline solution. These features enables the photosensitive composition of the present invention to be a photosensitive material useful for photosensitive recording material capable of being inscribed by infrared-ray irradiation.

In the general formula (I), M represents a conjugated chain, which may have a substituent group or a cyclic structure. The conjugated chain M can be represented by the following formula:

$$\{G_a^- \text{---} M \text{---} G_b\}_m X^{m+} \quad (I)$$

wherein $R^2$ to $R^{2n+2}$ are each selected independently from the group consisting of a hydrogen atom, halogen atom, and a cyano, alkyl, aryl, alkenyl, alkynyl, carbonyl, thio, sulfonyl, sulfinyl, oxy, and amino groups, which may join together to form a cyclic structure n represents an integer of from 3 to 8.

$G_a^-$ represents an anionic substituent group; $G_b$ represents a neutral substituent group; and $X^{m+}$ represents a cation having a valency of 1~m including a proton, wherein m represents an integer of from 1 to 6.

In a case where $R^1$ to $R^{2n+1}$ are each an alkyl group, examples of the alkyl group include a straight-chain alkyl group, a branched alkyl group, and a cyclic alkyl group, each having 1 to 20 carbon atoms. Specific examples of the alkyl group include methyl, ethyl, propyl, butyl, pentyl, hexyl, heptyl, octyl, nonyl, decyl, undecyl, dodecyl, tridecyl, hexadecyl, octadecyl, eicosyl, isopropyl, isobutyl, s-butyl, t-butyl, isopentyl, neopentyl, 1-methylbutyl, isohexyl, 2-ethylhexyl, 2-methylhexyl, cyclohexyl, cyclopentyl, and 2-norbornyl groups. Among these groups, preferable are a straight-chain alkyl group having 1 to 12 carbon atoms, a branched alkyl group having 3 to 12 carbon atoms, and a cyclic alkyl group having 5 to 10 carbon atoms.

These alkyl groups may have a substituent group, and preferred examples of the substituent group are monovalent, nonmetallic atomic groups excluding a hydrogen atom. Preferred examples of the substituent group include halogen atoms (—F, —Br, —Cl, and —I), hydroxyl group, alkoxy groups, aryloxy groups, mercapto group, alkylthio groups, arylthio groups, alkyldithio groups, aryldithio groups, amino groups, N-alkylamino groups, N,N-dialkylamino groups, N-arylamino groups, N,N-diarylamino groups, N-alkyl-N-arylamino groups, acyloxy groups, carbamoyloxy group, N-alkylcarbamoyloxy groups, N-arylcarbamoyloxy groups, N,N-dialkylcarbamoyloxy groups, N,N-diarylcarbamoyloxy groups, N-alkyl-N-arylcarbamoyloxy groups, alkylsulfoxy groups, arylsulfoxy groups, acylthio groups, acylamino groups, N-alkylacylamino groups, N-arylacylamino groups, ureido groups, N'-alkylureido groups, N',N'-dialkylureido groups, N'-arylureido groups, N',N'-diarylureido groups, N'-alkyl-N'-arylureido groups, N-alkylureido groups, N-arylureido groups, N'-alkyl-N-alkylureido groups, N'-alkyl-N-arylureido groups, N',N'-dialkyl-N-alkylureido groups, N',N'-dialkyl-N-arylureido groups, N'-aryl-N-alkylureido groups, N'-aryl-N-alkylureido groups, N'-aryl-N-arylureido groups, N',N'-diaryl-N-alkylureido groups, N',N'-diaryl-N-arylureido groups, N'-alkyl-N'-aryl-N-alkylureido groups, N'-alkyl-N'-aryl-N-arylureido groups, alkoxycarbonylamino groups, aryloxycarbonylamino groups, N-alkyl-N-alkoxycarbonylamino groups, N-alkyl-N-aryloxycarbonylamino groups, N-aryl-N-alkoxycarbonylamino groups, N-aryl-N-aryloxycarbonylamino groups, formyl group, acyl groups, carboxyl group and conjugate base groups thereof (hereinafter referred to as "carboxylate"), alkoxycarbamoyl groups, aryloxycarbamoyl groups, carbamoyl group, N-alkylcarbamoyl groups, N,N-dialkylcarbamoyl groups, N-arylcarbamoyl groups, N,N-diarylcarbamoyl groups, N-alkyl-N-arylcarbamoyl groups, alkylsulfinyl groups, arylsulfinyl groups, alkylsulfonyl groups, arylsulfonyl groups, sulfo group (—SO₃H) and a conjugate base group thereof (hereinafterreferred to as "sulfonato group"), alkoxysulfonyl groups, aryloxysulfonyl groups, sulfinamoyl group, N-alkylsulfinamoyl groups, N,N-dialkylsulfinamoyl groups, N-arylsulfinamoyl groups, N,N-diarylsulfinamoyl groups, N-alkyl-N-arylsulfinamoyl groups, sulfamoyl group, N-alkylsulfamoyl groups, N,N-dialkylsulfamoyl groups, N-arylsulfamoyl groups, N,N-diarylsulfamoyl groups, N-alkyl-N-arylsulfamoyl groups, N-acylsulfamoyl groups and conjugate base groups thereof, N-alkylsulfonylsulfamoyl groups (—SO₂NHSO₂R where R represents an alkyl group) and conjugate base groups thereof, N-arylsulfonylsulfamoyl groups (—SO₂NHSO₂Ar where Ar represents an aryl group) and conjugate base groups thereof, N-alkylsulfonylcarbamoyl groups (—CONHSO$_2$R where R represents an alkyl group) and conjugate base groups thereof, N-arylsulfonylcarbamoyl groups (—CONHSO$_2$Ar where Ar represents an aryl group) and conjugate base groups thereof, alkoxysilyl groups (—Si(OR)$_3$ where R represents an alkyl group), aryloxysilyl groups (—Si(OAr)$_3$ where Ar represents an aryl group), hydroxysilyl group (—Si(OH)$_3$) and a conjugate base group thereof, phosphono group (—PO$_3$H$_2$) and a conjugate base group thereof (hereinafter referred to as "phosphonato group"), dialkylphosphono groups (—PO$_3$R$_2$ where R represents an alkyl group), diarylphosphono groups (—PO$_3$Ar$_2$ where Ar represents an aryl group), alkylarylphosphono groups (—PO$_3$(R) (Ar) where R represents an alkyl group and Ar represents an aryl group), monoalkylphosphono groups (—PO$_3$H (R) where R represents an alkyl group) and conjugate base groups thereof (hereinafter referred to as "alkylphosphonato group"), monoarylphosphono groups (—PO$_3$H (Ar) where Ar represents an aryl group) and conjugate base groups thereof (hereinafter referred to as "arylphosphonato group"), phosphonoxy group (—OPO$_3$H$_2$) and a conjugate base group thereof (hereinafter referred to as "phosphonatoxy group"), dialkylphosphonoxy groups (—OPO$_3$R$_2$ where R represents an alkyl group), diarylphosphonoxy groups (—OPO$_3$Ar$_2$ where Ar represents an aryl group), alkylarylphosphonoxy groups (—OPO$_3$(R) (Ar) where R represents an alkyl group and Ar represents an aryl group), monoalkylphosphonoxy groups (—OPO$_3$H (R) where R represents an alkyl group) and conjugate base groups thereof (hereinafter referred to as "alkylphosphonatoxy group"), monoarylphosphonoxy groups (—OPO$_3$H (Ar) where Ar represents an aryl group) and conjugate base groups thereof (hereinafter referred to as "arylphosphonatoxy group"), cyano group, nitro group, aryl groups, alkenyl groups, and alkynyl groups. Specific examples of the alkyl groups in these substituent groups include the previously described alkyl groups. Specific examples of the aryl groups in these substituent groups include phenyl, biphenyl, naphthyl, tolyl, xylyl, mesityl, cumenyl, fluorophenyl, chlorophenyl, bromophenyl, chloromethylphenyl, hydroxyphenyl, methoxyphenyl, ethoxyphenyl, phenoxyphenyl, acetoxyphenyl, benzoyloxyphenyl, methylthiophenyl, phenylthiophenyl, methylaminophenyl, dimethylaminophenyl, acetylaminophenyl, carboxyphenyl, methoxycarbonylphenyl, ethoxycarbonylphenyl, phenoxycarbonylphenyl, N-phenylcarbamoylphenyl, nitrophenyl, cyanophenyl, sulfophenyl, sulfonatophenyl, phosphonophenyl, and phosphonatophenyl groups. Examples of the alkenyl group include vinyl, 1-propenyl, 1-butenyl, cinnamyl, and 2-chloro-1-ethenyl groups. Examples of the alkynyl group include ethynyl, 1-propynyl, 1-butynyl, trimethylsilylethynyl, and phenylethynyl groups. Examples of the acyl groups (R$^1$CO—) include the groups in which R$^1$ represents one of the following a hydrogen atom, and the previously described alkyl, aryl, alkenyl, and alkynyl groups.

Among these substituent groups, preferable are halogen atoms (—F, —Br, —Cl, and —I), alkoxy groups, aryloxy groups, alkylthio groups, arylthio groups, N-alkylamino groups, N,N-dialkylamino groups, acyloxy groups, N-alkylcarbamoyloxy groups, N-arylcarbamoyloxy groups, acylamino groups, formyl group, acyl groups, carboxyl group, alkoxycarbonyl groups, aryloxycarbonyl groups, carbamoyl group, N-alkylcarbamoyl groups, N,N-dialkylcarbamoyl groups, N-arylcarbamoyl groups, N-alkyl-N-arylcarbamoyl groups, sulfo group, sulfonato group, sulfamoyl group, N-alkylsulfamoyl groups, N,N-dialkylsulfamoyl groups, N-arylsulfamoyl groups, N-alkyl-N-arylsulfamoyl groups, phosphono group, phosphonato group, dialkylphosphono groups, diarylphosphono groups, monoalkylphosphono groups, alkylphosphonato groups, monoarylphosphono groups, arylphosphonato groups, phosphonoxy group , phosphonatoxy group, aryl groups, and alkenyl groups.

Examples of the alkylene group in the substituted alkyl groups include divalent organic residual groups which are formed when any one of the hydrogen atoms is removed from the previously described alkyl groups having 1 to 20 carbon atoms. Among these groups, preferable are a straight-chain alkylene group having 1 to 12 carbon atoms, a branched alkylene group having 3 to 12 carbon atoms, and a cyclic alkylene group having 5 to 10 carbon atoms. Preferred specific examples of the substituted alkyl groups, which are formed by combining the substituent groups and the alkylene groups, include chloromethyl, bromomethyl, 2-chloroethyl, trifluoromethyl, methoxymethyl, methoxyethoxyethyl, allyloxymethyl, phenoxymethyl, methylthiomethyl, tolythiomethyl, ethylaminoethyl, diethylaminopropyl, morpholinopropyl, acetyloxymethyl, benzoyloxymethyl, N-cyclohexylcarbamoyloxyethyl, N-phenylcarbamoyloxyethyl, acetylaminoethyl, N-methylbenzoylaminopropyl, 2-oxoethyl, 2-oxopropyl, carboxypropyl, methoxycarbonylethyl, methoxycarbonylmethyl, methoxycarbonylbutyl, allyloxycarbonylbutyl, chlorophenoxycarbonylmethyl, carbamoylmethyl, N-methylcarbamoylethyl, N,N-dipropylcarbamoylmethyl, N-(methoxyphenyl)carbamoylethyl, N-methyl-N-(sulfophenyl)carbamoylmethyl, sulfopropyl, sulfobutyl, sulfonatobutyl, sulfamoylbutyl, N-ethylsulfamoylmethyl, N,N-dipropylsulfamoylpropyl, N-tolylsulfamoylpropyl, N-methyl-N-(phosphonophenyl)sulfamoyloctyl, phosphonobutyl, phosphonatohexyl, diethylphosphonobutyl, diphenylphosphonopropyl, methylphosphonobutyl, methylphosphonatobutyl, tolylphosphonohexyl, tolylphosphonatohexyl, phosphonoxypropyl, phosphonatoxybutyl, benzyl, phenethyl, α-methylbenzyl, 1-methyl-1-phenylethyl, p-methylbenzyl, cinnamyl, allyl, 1 -propenylmethyl, 2-butenyl, 2-methylallyl, 2-methylpropenylmethyl, 2-propynyl, 2-butynyl, and 3-butynyl groups.

In a case where R$^1$ to R$^{2n+1}$ are each an aryl group, examples of the aryl group include a fused ring formed by 1 to 3 benzene rings and a fused ring formed by a benzene ring and a 5-membered unsaturated ring. Specific examples include phenyl, naphthyl, anthryl, phenanthryl, indenyl, acenaphthenyl, and fluorenyl groups. Among these groups, preferable are phenyl and naphthyl groups.

Examples of the substituted aryl groups include the previously described aryl groups wherein a ring-forming carbon atom has as a substituent group thereof a monovalent nonmetallic atomic group excluding a hydrogen atom. Preferred specific examples of the substituent group include the previously described alkyl groups and substituted alkyl groups, and the groups described as the substituent groups in the substituted alkyl groups.

Preferred specific examples of these substituted aryl groups include biphenyl, tolyl, xylyl, mesityl, cumenyl, chlorophenyl, bromophenyl, fluorophenyl, chloromethylphenyl, trifluoromethylphenyl, hydroxyphenyl, methoxyphenyl, methoxyethoxyphenyl, allyloxyphenyl, phenoxyphenyl, methylthiophenyl, tolylthiophenyl, phenylthiophenyl, ethylaminophenyl, diethylaminophenyl, morpholinophenyl, acetyloxyphenyl, benzoyloxyphenyl, N-cyclohexylcarbamoyloxyphenyl, N-phenylcarbamoyloxyphenyl, acetylaminophenyl, N-methylbenzoylaminophenyl, carboxyphenyl, methoxycarbonylphenyl, allyloxycarbonylphenyl, chlorophenoxycarbonylphenyl, carbamoylphenyl, N-methylcarbamoylphenyl, N,N-dipropylcarbamoylphenyl, N-(methoxyphenyl)carbamoylphenyl, N-methyl-N-(sulfophenyl)carbamoylphenyl, sulfophenyl, sulfonatophenyl, sulfamoylphenyl, N-ethylsulfamoylphenyl, N,N-dipropylsulfamoylphenyl, N-tolylsulfamoylphenyl, N-methyl-N-(phosphonophenyl) sulfamoylphenyl, phosphonophenyl, phosphonatophenyl, diethylphosphonophenyl, diphenylphosphonophenyl, methylphosphonophenyl, methylphosphonatophenyl, tolylphosphonophenyl, tolylphosphonatophenyl, allyl, 1-propenylmethyl, 2-butenyl, 2-methylallylphenyl, 2-methylpropenylphenyl, 2-propynylphenyl, 2-butynylphenyl, and 3-butynylphenyl groups.

The alkenyl groups, the substituted alkenyl groups, the alkynyl groups, and the substituted alkynyl groups (—C($R^7$)=C($R^8$)($R^9$) and —C≡C($R^{10}$)) for $R^1$ to $R^{2n+1}$ may be the groups in which $R^7$, $R^8$, $R^9$ and $R^{10}$ each represent a monovalent nonmetallic atomic group. Preferred examples of $R^7$, $R^8$, $R^9$ and $R^{10}$ include a hydrogen atom, halogen atoms, alkyl groups, substituted alkyl groups, aryl groups, and substituted aryl groups. Specific examples of these groups include the previously described groups. Preferred examples of the substituent groups of $R^7$, $R^8$, $R^9$ and $R^{10}$ include a hydrogen atom, a halogen atom, and a straight-chain, branched, or cyclic alkyl group having 1 to 10 carbon atoms.

Specific examples of the above-described $R_{n+1}$, $R_{n+2}$ and $R_{n+3}$ include methyl, ethyl, propyl, butyl, pentyl, hexyl, heptyl, octyl, nonyl, decyl, undecyl, dodecyl, tridecyl, hexadecyl, octadecyl, eicosyl, isopropyl, isobutyl, s-butyl, t-butyl, isopentyl, neopentyl, 1-methylbutyl, isohexyl, 2-ethylhexyl, allyl, 1-propenylmethyl, 2-butenyl, 2-methylallyl, 2-methylpropenyl, 2-propynyl, 2-butynyl, 3-butynyl, benzyl, phenethyl, α-methylbenzyl, 1-methyl-1-phenylethyl, p-methylbenzyl, cinnamyl, hydroxyethyl, methoxyethyl, phenoxydiethyl, allyloxyethyl, methoxyethoxyethyl, ethoxyethoxyethyl, morpholinoethyl, morpholinopropyl, sulfopropyl, sulfonatopropyl, sulfobutyl, sulfonatobutyl, carboxydimethyl, carboxydiethyl, carboxypropyl, methoxycarbonylethyl, 2-ethylhexyloxycarbonylethyl, phenoxycarbonymethyl, methoxycarbonylpropyl, N-methylcarbamoylethyl, N,N-ethylaminocarbamoylmethyl, N-phenylcarbamoylpropyl, N-tolylsulfamoylbutyl, p-toluenesulfonylaminopropyl, benzoylaminohexyl, phosphonomethyl, phosphonoethyl, phosphonopropyl, p-phosphonobenzylaminocarbonylethyl, phosphonatomethyl, phosphonatopropyl, phosphonatobutyl, p-phosphonatobenzylaminocarbonylethyl, vinyl, and ethynyl groups.

Substituted carbonyl groups ($R^{11}CO$—) for $R^1$ to $R^{2n+1}$ may be the groups in which $R^{11}$ represents a monovalent nonmetallic atomic group. Preferred examples of the substituted carbonyl group include formyl group, acyl groups, carboxyl group, alkoxycarbonyl groups, aryloxycarbonyl groups, carbamoyl group, N-alkylcarbamoyl groups, N,N-dialkylcarbamoyl groups, N-arylcarbamoyl groups, and N-alkyl-N-arylcarbamoyl groups. Examples of the alkyl and aryl groups in the foregoing groups include the previously described groups exemplified as alkyl groups, substituted alkyl groups, aryl groups, and substituted aryl groups. Among these groups, preferable substituent groups include formyl group, acyl groups, carboxyl group, alkoxycarbonyl groups, aryloxycarbonyl groups, carbamoyl group, N-alkylcarbamoyl groups, N,N-dialkylcarbamoyl groups, and N-arylcarbamoyl groups. Among these groups, more preferable substituent groups include formyl group, acyl groups, alkoxycarbonyl groups, and aryloxycarbonyl groups. Preferred specific examples of the substituent groups include formyl, acetyl, benzoyl, carboxymethyl, methoxycarbonyl, allyloxycarbonyl, N-methylcarbamoyl, N-phenylcarbamoyl, N,N-diethylcarbamoyl, and morpholinocarbamoyl groups.

Substituted thio groups ($R^{14}S$—) may be those in which $R^{14}$ represents a monovalent nonmetallic atomic group excluding a hydrogen atom. Preferred examples of the substituted thio group include alkylthio groups, arylthio groups, alkyldithio groups, aryldithio groups, and acylthio groups. Examples of the alkyl and aryl groups in the foregoing groups include the previously described groups exemplified as alkyl groups, substituted alkyl groups, aryl groups, and substituted aryl groups. $R^{13}$ of the acyl group ($R^{13}CO$—) in the acylthio groups is as previously described. Among these groups, preferable are alkylthio groups and arylthio groups. Preferred specific examples of the substituted thio groups include methylthio, ethylthio, phenylthio, ethoxyethylthio, carboxyethylthio, and methoxycarbonylthio groups.

Substituted sulfonyl groups ($R^{19}SO_2$—) may be those in which $R^{19}$ represents a monovalent nonmetallic atomic group. More preferred examples of the substituted sulfonyl group include alkylsulfonyl groups and arylsulfonyl groups. Examples of the alkyl and aryl groups in the foregoing groups include the previously described groups exemplified as alkyl groups, substituted alkyl groups, aryl groups, and substituted aryl groups. Specific examples of the substituted sulfonyl groups include butylsulfonyl and chlorophenylsulfonyl groups.

Substituted sulfinyl groups ($R^{18}SO$—) maybe those in which $R^{18}$ represents a monovalent nonmetallic atomic group. Preferred examples of the substituted sulfinyl group include alkylsulfinyl groups, arylsulfinyl groups, sulfinamoyl group, N-alkylsulfinamoyl groups, N,N-dialkylsulfinamoyl groups, N-arylsulfinamoyl groups, N,N-diarylsulfinamoyl groups, and N-alkyl-N-arylsulfinamoyl groups. Examples of the alkyl and aryl groups in the foregoing groups include the previously described groups exemplified as alkyl groups, substituted alkyl groups, aryl groups, and substituted aryl groups. Preferred examples of the substituted sulfinyl groups include alkylsulfinyl groups and arylsulfinyl groups. Specific examples of the substituted sulfinyl groups include hexylsulfinyl, benzylsulfinyl, and tolylsulfinyl groups.

Substituted oxy groups ($R^{12}O$—) may be those in which $R^{12}$ represents a monovalent nonmetallic atomic group excluding a hydrogen atom. Preferred examples of the substituted oxy group include alkoxy groups, aryloxy groups, acyloxy groups, carbamoyloxy group, N-alkylcarbamoyloxy groups, N-arylcarbamoyloxy groups, N,N-dialkylcarbamoyloxy groups, N,N-diarylcarbamoyloxy groups, N-alkyl-N-arylcarbamoyloxy groups, alkylsulfoxy groups, arylsulfoxy groups, phosphonoxy group, and phosphonatoxy group. Examples of the alkyl and aryl groups in the foregoing groups include the previously described groups exemplified as alkyl groups, substituted alkyl groups, aryl groups, and substituted aryl groups. Further, examples of the acyl groups ($R^{13}CO$—) in the acyloxy groups include the acyl groups whose $R^{13}$ is previously exemplified as alkyl groups, substituted alkyl groups, aryl groups, and substituted aryl groups. Among these substituent groups, preferable are alkoxy groups, aryloxy groups, acyloxy groups, and arylsulfoxy groups. Preferred specific examples of the substituted oxy group include methoxy, ethoxy, propyloxy, isopropyloxy, butyloxy, pentyloxy, hexyloxy, dodecyloxy, benzyloxy, allyloxy, phenethyloxy, carboxyethyloxy, methoxycarbonylethyloxy, ethoxycarbonylethyloxy, methoxyethoxy, phenoxyethoxy, methoxyethoxyethoxy, ethoxyethoxyethoxy, morpholinoethoxy, morpholinopropyloxy, allyloxyethoxyethoxy, phenoxy, tolyloxy, xylyloxy, mesityloxy, cumenyloxy, methoxyphenyloxy, ethoxyphenyloxy, chlorophenyloxy, bromophenyloxy, acetyloxy, benzoyloxy, naphthyloxy, phenylsulfonyloxy, phosphonoxy, and phosphonatoxy groups.

Substituted amino groups ($R^{15}NH$— and ($R^{16}$)($R^{17}$)N—) may be those in which $R^{15}$, $R^{16}$ and $R^{17}$ each represent a monovalent nonmetallic atomic group excluding a hydrogen atom. Preferred examples of the substituted amino group include N-alkylamino groups, N,N-dialkylamino groups, N-arylamino groups, N,N-diarylamino groups, N- alkyl-N-arylamino groups, acylamino groups, N-alkylacylamino groups, N-arylacylamino groups, ureido groups, N'-alkylureido groups, N',N'-dialkylureido groups, N'-arylureido groups, N',N'-diarylureido groups, N'-alkyl-N'-arylureido groups, N-alkylureido groups, N-arylureido groups, N'-alkyl- N-alkylureido groups, N'-alkyl-N-arylureido groups, N',N'-dialkyl-N-alkylureido groups, N',N'-dialkyl-N-arylureido groups, N'-aryl-N-alkylureido groups, N'-aryl-N-arylureido groups, N',N'-diaryl-N-alkylureido groups, N', N'-diaryl-N-arylureido groups N'-alkyl-N'-aryl-N-alkylureido groups, N'-alkyl-N'-aryl-N-arylureido groups, alkoxycarbonylamino groups, aryloxycarbonylamino groups, N-alkyl-N-alkoxycarbonylamino groups, N-alkyl-N-aryloxycarbonylamino groups, N-aryl-N-alkoxycarbonylamino groups, and N-aryl-N-aryloxycarbonylamino groups. Examples of the alkyl and aryl groups in the foregoing groups include the previously described groups exemplified as alkyl groups, substituted alkyl groups, aryl groups, and substituted aryl groups. $R^{13}$ of the acyl group ($R^{13}CO$—) in the acylamino groups, N-alkylacylamino groups, and N-arylacylamino groups is as previously described. Among these groups, more preferable are N-alkylamino groups, N,N-dialkylamino groups, N-arylamino groups, and acylamino groups. Specific examples of the substituted amino groups include methylamino, ethylamino, diethylamino, morpholino, piperidino, pyrrolizino, phenylamino, benzoylamino, and acetylamino groups.

In the general formula (I), $G_a^-$ represents an anionic substituent group; and $G_b$ represents a neutral substituent group. These groups can be represented by the following structural formulae, respectively.

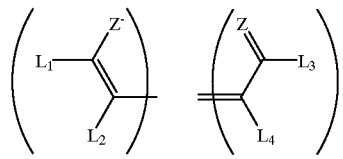

In these formulae, $L_1$~$L_4$ are each selected independently from the group consisting of a hydrogen atom, a halogen atom, a cyano group, and the previously described alkyl, aryl, alkenyl, alkynyl, carbonyl, thio, sulfonyl, sulfinyl, oxy, and amino groups; and $L_1$ and $L_2$ as well as $L_3$ and $L_4$ may join together to form a cyclic structure. Preferably, $G_b$ represents an acidic nucleus of a cyanine dye, and $G_a^-$ that in which an anionic nucleus is rendered anionic. Examples of the acidic nucleus include the compounds described in Table 8, 2-B, on page 199 of "The Theory of the Photographic Process", and the nuclei given below.

1) 1,3-dicarbonyl nuclei, for example, 1,3-indandione, 1,3-cyclohexanedione, 5,5-dimethyl-1,3-cyclohexanedione, and 1,3-dioxane-4,6-dione;
2) pyrazolinone nuclei, for example, 3-methyl-1-phenyl-2-pyrazoline-5-one, 1-phenyl-2-pyrazoline-5-one, 1-phenyl-2-pyrazoline-5-one, 1-(2-benzothiazolyl)-3-methyl-2-pyrazoline-5-one;
3) isooxazolinone nuclei, for example, 3-phenyl-2-isooxazolinone-5-one, 3-methyl-2- isooxazolinone-5-one;
4) oxyindole nuclei, for example, 1-alkyl-2,3-dihydro-2-oxyindole;
5) 2,4,6-triketohexahydropyrimidine nuclei, for example, barbituric acid or 2-thiobarbituric acid and derivatives thereof exemplified by 1-alkyl derivatives such as 1-methyl and 1-ethyl derivatives; 1,3-dialkyl derivatives such as 1,3-diethyl and 1,3-dibutyl derivatives; 1,3-diaryl derivatives such as 1,3-diphenyl, 1,3-di(p-chlorophenyl), and 1,3-di(p-ethoxycarbonylphenyl) derivatives; and 1-alkyl-3-aryl derivatives such as 1-ethyl-3-phenyl derivatives.
6) 2-thio-2,4-thiazolidinedione nuclei, for example, rhodanine and derivatives thereof exemplified by 3-alkylrhodanine derivatives such as 3-ethylrhodanine and 3-allylrhodanine; and 3-arylrhodanine derivatives such as 3-phenylrhodanine;
7) 2-thio-2,4-oxazolidinedione (2-thio-2,4-(3H, 5H)-oxazoledione) nuclei, for example, 2-ethyl-2-thio-2,4-oxazolidinedione;
8) thianaphthenone nuclei, for example, 3(2H)-thianaphthenone and 3(2H)-thianaphthenone-1,1-dioxide;
9) 2-thio-2,5-thiazolidinedione nuclei, for example, 3-ethyl-2-thio-2,5-thiazolidinedione;
10) 2,4-thiazolidinedione nuclei, for example, 2,4-thiazolidinedione, 3-ethyl-2,4-thiazolidinedione, and 3-phenyl-2,4-thiazolidinedione;
11) thiazolidinone nuclei, for example, 4-thiazolidinone and 3-ethyl-4-thiazolidinone;
12) 4-thiazolidinone nuclei, for example, 2 -ethylmercapto-5-thiazoline-4-one and 2-alkylphenylamino-5-thiazoline-4-one;
13) 2-imino-2-oxazoline-4-one (pseudo hydantoin) nuclei;
14) 2,4-imidazolidinedione (hydantoin) nuclei, for example, 2,4-imidazolidinedione and 3-ethyl-2,4-imidazolidinedione;
15) 2-thio-2,4-imidazolidinedione (2-thiohydantoin) nuclei, for example, 2-thio-2,4-imidazolidinedione and 3-ethyl-2-thio-2,4-imidazolidinedione;
16) 2-imidazoline-5-one nuclei, for example, 2-n-propyl-mercapto-2-imidazoline-5-one;
17) furan-5-one;
18) 4-hydroxy-2(1H)-quinoline nuclei or 4-hydroxy-2(1H)-pyridinone nuclei, for example, N-methyl-4-hydroxy-2-(1H)-quinoline, N-n-butyl-4-hydroxy-2(1H)-quinoline, and N-methyl-4-hydroxy-2(1H)-pyridinone;
19) substituted or unsubstituted 4-hydroxy-2H-pyran-2-one and 4-hydroxycoumarin;
20) substituted or unsubstituted thioindoxyl, for example, 5-methylthioindoxyl.

In the general formula (I), Z represents a chalcogen atom or a —C($Y_1$)($Y_2$) group, where $Y_1$ and $Y^2$ may be the same or different and are selected from the group consisting of —CN, —CO$_2$R' and —SO$_2$R" wherein R' and R" represent the previously described alkyl groups and aryl groups, respectively.

In preferred modes of the anionic, infrared absorbing agent, positive-type image formation is effected by a counter cation exemplified by one having an onium salt structure. Examples of the onium salt include ammonium salts, diazonium salts, oxonium salts, sulfonium salts, selenonium salts, phosphonium salts, carbonium salts, and iodonium salts.

Examples of the onium salts suited for use in the present invention include diazonium salts described in S. I. Schlesinger, *Photogr. Sci. Eng.*, 18, p. 387(1974), T. S. Bal et al.; *Polymer*, 21, p. 423(1980), and JP-A No. 5-158,230; ammonium salts described in U.S. Pat. Nos. 4,609,055 and 4,609,056 and JP-A No. 3-140,140; phosphonium salts described in D. C. Necker et al.; *Macromolecules*, 17, p. 2468(1984), C. S. Wen et al.; *The,* Proc. Conf. Rad. Curing ASIA, p. 478, Tokyo, Oct. (1988), U.S. Pat. Nos. 4,609,055 and 4,609,056; iodonium salts described in J. V. Crivello et al.; *Macromolecules*, 10(6), p. 1307(1977), *Chem. & Eng. News*, November 28, p. 31(1988), European Patent No. 104,143, U.S. Pat. Nos. 339,049 and 410,201, and JP-A Nos. 2-150,848 and 2-296,514; sulfonium salts described in J. V. Crivello et al., *Polymer* J. 17, p. 73(1985), J. V. Crivello et al., *J. Org. Chem.*, 43, p. 3055(1978), W. R. Watt et al., *J. Polymer Sci.*, Polymer Chem. Ed., 22, p. 1789(1984), J. V. Crivello et al.; *Polymer Bull.*, 14, p. 279(1985), J. V. Crivello et al.; *Macromolecules*, 14(5), p. 1141(1981), J. V. Crivello et at, *J. Polymer Sci.*, Polymer Chem. Ed., 17, p. 2877 (1979), European Patent Nos. 370,693, 233,576, 297,443 and 297,442, U.S. Pat. Nos. 4,933,377, 3,902,114, 410,201, 339,049, 4,760,013, 4,734,444 and 2,833,827, and German Patent Nos. 2,904,626, 3,604,580 and 3,604,581; selenonium salts described in J. V. Crivello et al., *Macromolecules*, 10(6), p. 1307(1977) and J. V. Crivello et al., *J. Polymer Sci.*, Polymer Chem. Ed., 17, p. 1047(1979); and arsonium salts described in C. S. Wen et al., *Teh.*, Proc. Conf. Rad. Curing ASIA, p. 478, Tokyo, October (1988).

In addition, suitable for use in the present invention are the ammonium salts, phosphonium salts, sulfonium salts, iodonium salts, and the like described in JP-A No. 9-134,009.

The oxonium salts are represented by any of the following general formulae (A) and (B):

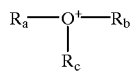

(A)

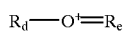

(B)

wherein $R_a$~$R_d$ are each selected independently from the group consisting of alkyl groups and aryl groups; and $R_e$ represents an alkylene group or an arylene group. Vicinal $R_a$~$R_c$ groups or $R_d$ and $R_e$ may join together to form a cyclic structure.

The selenonium salts are represented by any of the following general formulae (C) and (D):

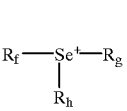

(C)

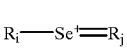

(D)

wherein $R_f$~$R_i$ are each selected independently from the group consisting of alkyl groups and aryl groups, and $R_j$ represents an alkylene group or an arylene group. Vicinal $R_f$~$R_g$ groups or $R_i$ and $R_j$ may join together to form a cyclic structure.

The diazonium salts are represented by the following general formula (E):

$$R_k\!-\!N^+\!\equiv\!N \quad (E)$$

wherein $R_k$ represents an alkyl group or an aryl group.

The carbonium salts are represented by any of the following general formulae (F) and (G):

(F)

(G)

wherein $R_l$~$R_o$ are each selected independently from the group consisting of alkyl groups and aryl groups, and $R_p$ represents an alkylene group or an arylene group. Vicinal $R_l$~$R_m$ groups or $R_o$ and $R_p$ may join together to form a cyclic structure.

Other onium salts suited for use in the present invention include, for example, those represented by the following general formulae (H)-(K).

(H)

(I)

(J)

(K)

In these formulae, $R^A$, $R^B$, $R^C$, $R^D$, $R^J$, $R^K$, $R^L$, and $R^M$ are each selected independently from the group consisting of alkyl groups, aryl groups, and aralkyl groups. $R^A$, $R^B$, $R^C$, and $R^D$ may join together to form a cyclic structure, and $R^J$, $R^K$, $R^L$, and $R^M$ may join together to form a cyclic structure. $R^E$, $R^F$, and $R^G$ are each selected independently from the group consisting of alkyl groups and aryl groups. $R^E$, $R^F$, and $R^G$ may join together to form a cyclic structure. $R^H$ and $R^I$ each independently represent an alkyl group.

A further preferable mode is the use of a counter cation that is a thermally decomposable onium salt. The term "thermally decomposable onium salt" is used herein to refer to an onium salt that exhibits 10 mol % or more of decomposition at a temperature of 200° C. or lower when decomposition is measured by differential calorimetric/thermogravimetric analysis or by use of a melting point measuring apparatus.

Such a thermally decomposable onium salt can be easily obtained by appropriately selecting the substituent group of the onium salt. The thermally decomposable onium salt may be any one selected from the group consisting of ammonium salts, diazonium salts, oxonium salts, sulfonium salts, selenonium salts, phosphonium salts, carbonium salts, and iodonium salts, provided the thermally decomposable onium salt fulfills the above-described requirement.

Some specific examples of the anionic, infrared absorbing agent are given below. However, it must be noted that the present invention is not limited to these examples.

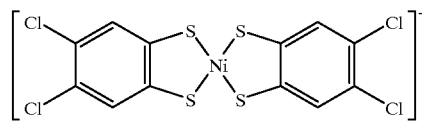

AD-1⁻

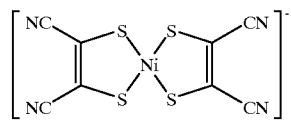

AD-2⁻ carbon-black—$CO_2^-$

AD-3⁻

These substances can be synthesized by known methods. For example, the above-described anionic Ni complexes (AD-1⁻ and AD-2⁻) can be synthesized by the method described in *J. of American Chem. Soc.*, vol. 88(1966), pp. 43–50 or pp. 4870–4875. On the other hand, the anionic carbon black (AD-3⁻) can be produced by introducing a carboxylic acid group by oxidation as described on page 12 of *The Carbon Black Handbook* (edited by the Carbon Black Society of Japan and issued in 1995 by this society).

The skeleton of the anionic dye of (a-4) the compound represented by the general formulae (I) can be represented by the following general formula (II):

$$G_{a\theta}^- - M_{\alpha\phi} - G_{b\theta} \quad (II)$$

wherein θ, α, and φ are each a variable so that specific structures of the skeleton of the anionic dye can be indicated by combining the partial structures $G_a^\theta$, $M\alpha\phi$, and $G_b^\theta$. For example, a combination of the following partial structures $G_{a1}$, $Mf_3$, and $G_{b2}$ forms an anionic dye with a skeleton having a structure such as that described below.

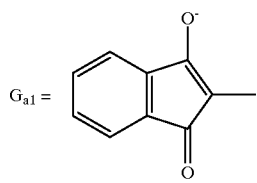

$G_{a1}$ =

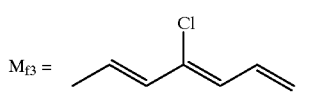

$M_{f3}$ =

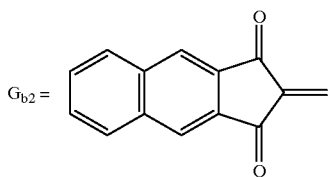

$G_{b2}$ =

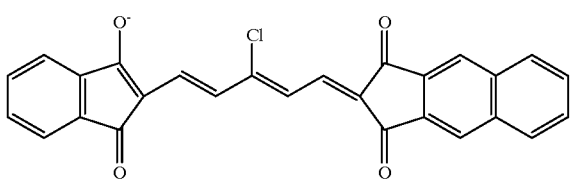

Some examples of the partial structures of the skeleton of the anionic dye, and specific examples of the onium salts suited for use as counter ions in the present invention are given below. However, it must be noted that the present invention is not limited to these examples. Examples of the partial structure $G_a^\theta$ include the following.

$G_{a1}^-$ $G_{a2}^-$ $G_{a3}^-$ $G_{a4}^-$ $G_{a5}^-$

-continued

G<sub>a6</sub><sup>-</sup>
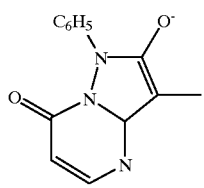

G<sub>a7</sub><sup>-</sup>
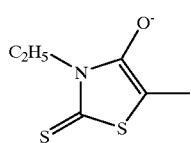

G<sub>a8</sub><sup>-</sup>
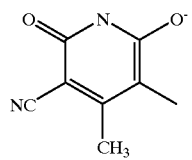

G<sub>a9</sub><sup>-</sup>
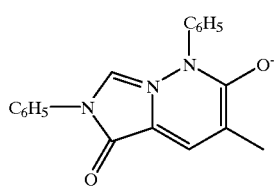

G<sub>a10</sub><sup>-</sup>
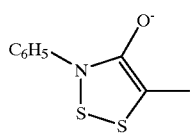

G<sub>a11</sub><sup>-</sup>
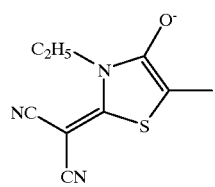

G<sub>a12</sub><sup>-</sup>
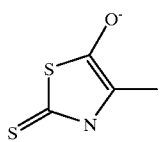

G<sub>a13</sub><sup>-</sup>
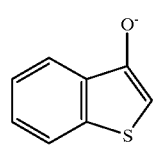

Examples of the partial structure $G_b^\theta$ include the following.

G<sub>b1</sub>
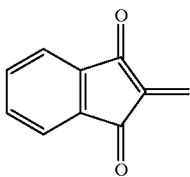

G<sub>b2</sub>
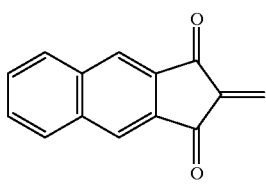

G<sub>b3</sub>
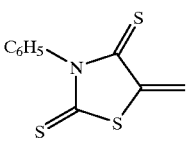

G<sub>b4</sub>
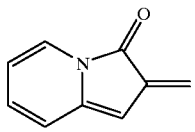

G<sub>b5</sub>
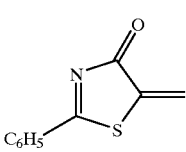

G<sub>b6</sub>
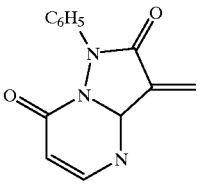

G<sub>b7</sub>
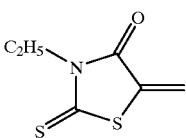

G<sub>b8</sub>
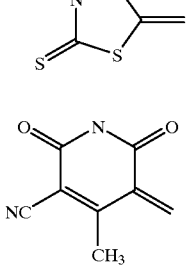

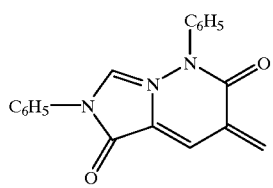
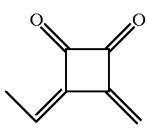 Gb9
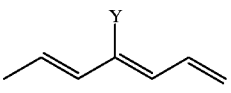 Gb10
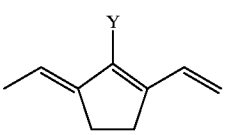 Gb11
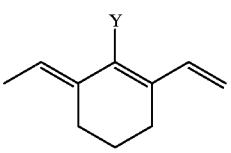 Gb12
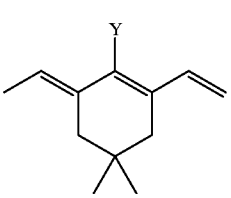 Gb13
Examples of the methine chain Mαφ include the following.
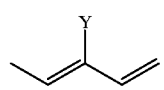 Ma
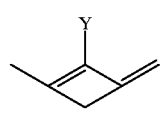 Mb
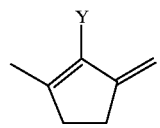 Mc
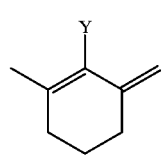 Md
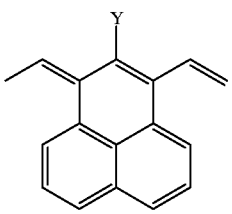 Me
Mf
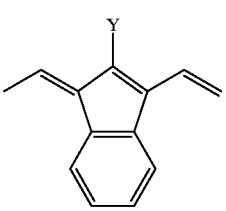 Mg
Mh
Mi
Mj
Mk
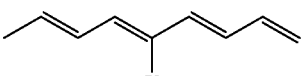 Ml
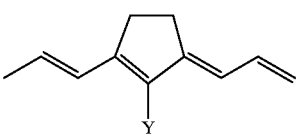 Mm

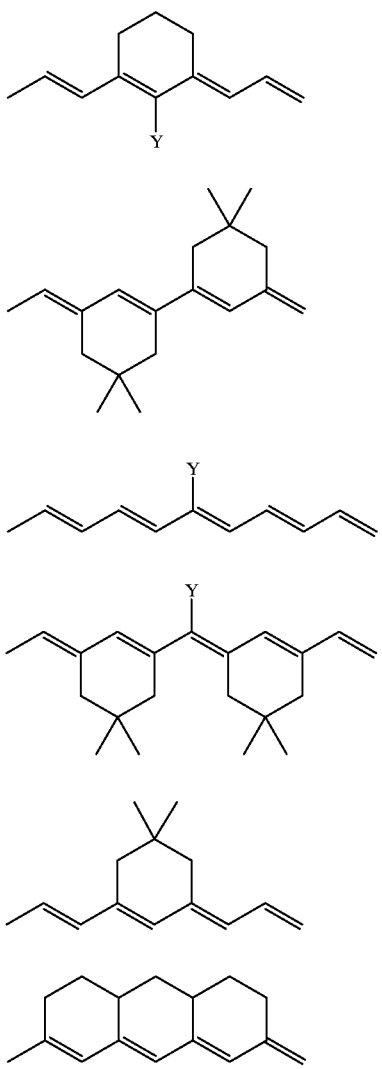
In a case where the methine chain Mαφ has a substituent group, examples of the substituent group φ-Y include the following.
1  —H
2  —F
3  —Cl
4  —Br
5  —I
6  —CN
7  —CH$_3$
8  —C$_2$H$_5$
9  —$^n$C$_3$H$_7$
10 —$^i$C$_3$H$_7$
11 —$^n$C$_4$H$_9$
12 —$^t$C$_4$H$_9$
13 —$^n$C$_5$H$_{11}$
14 —$^n$C$_6$H$_{13}$
15 
16 —CH$_2$—C$_6$H$_5$
17 
18 
19 —CF$_3$
20 —C$_8$H$_{17}$
21 —C$_6$H$_5$
22 
23 
24 
25 
26 
27 (acyl with C$_6$H$_5$)
28 (ester with OCH$_3$)

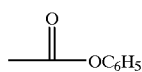

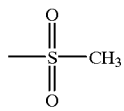

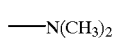

Examples of partial structures of suitable counter cations represented by the general formulas (A)–(G) include the following.

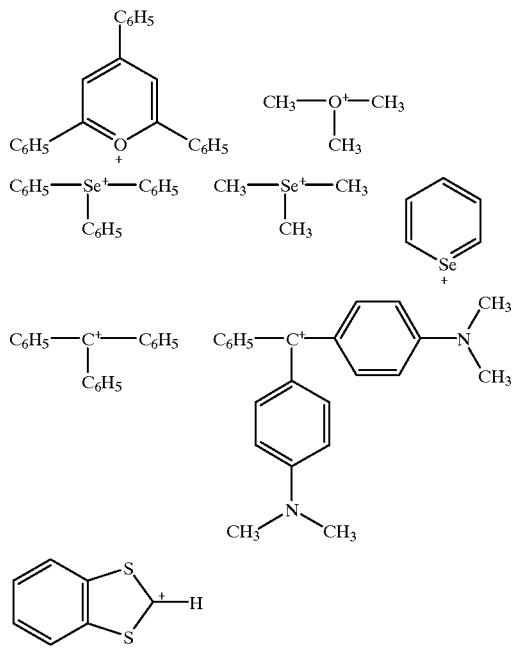

Examples of partial structures of suitable counter cations represented by the general formulae (H) include the following.

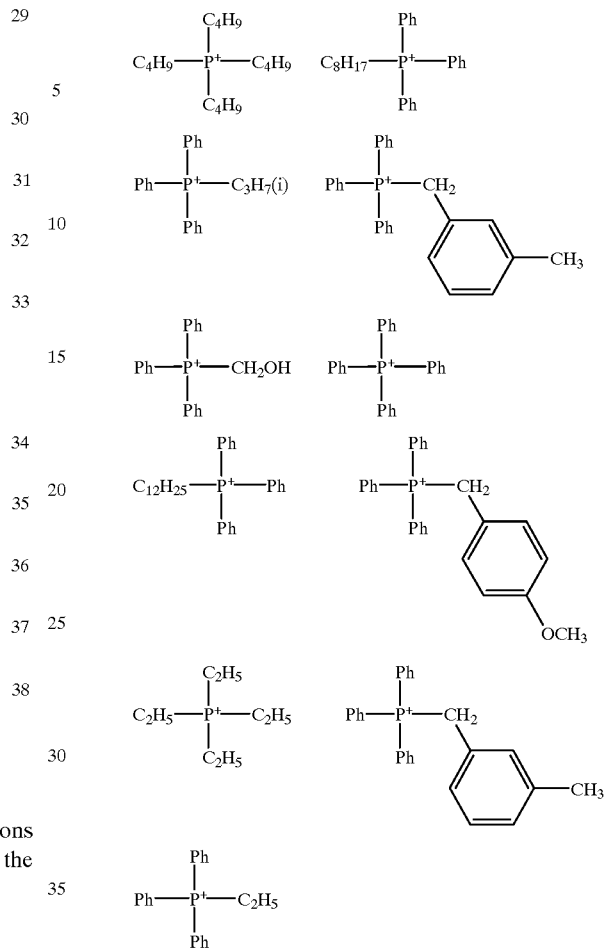

Examples of partial structures of suitable counter cations represented by the general formulae (I) include the following.

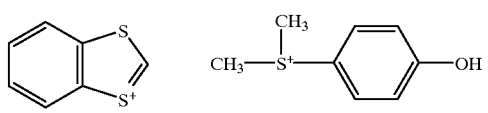
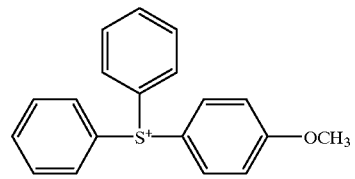
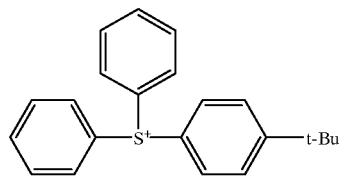
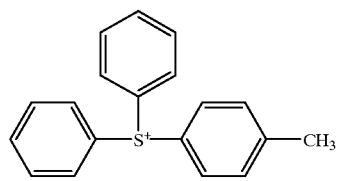
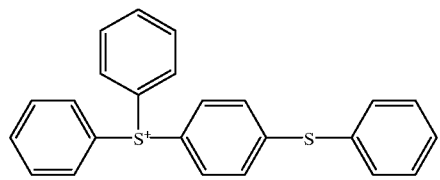
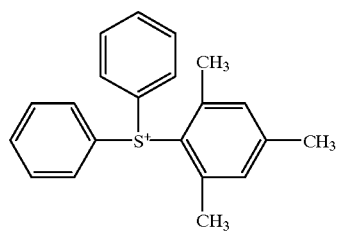
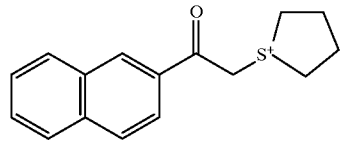
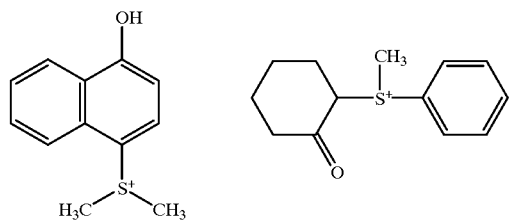
Examples of partial structures of suitable counter cations represented by the general formulae (J) include the following.
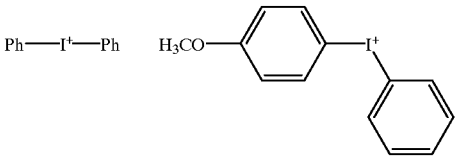
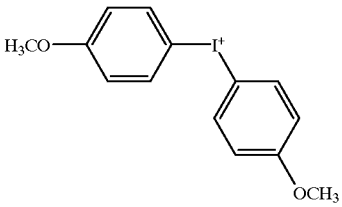
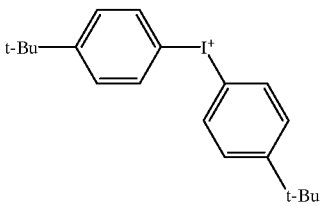
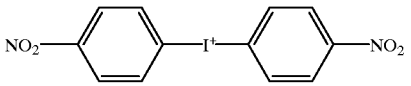
Examples of partial structures of suitable counter cations represented by the general formulae (K) include the following.
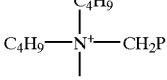 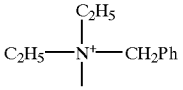
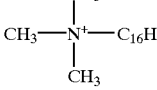 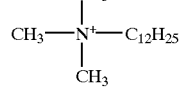
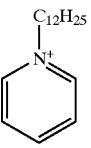 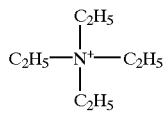
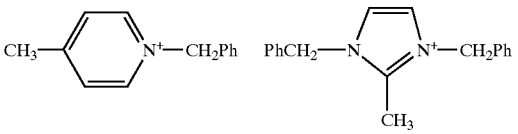
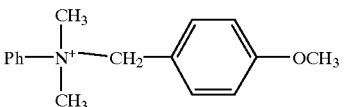
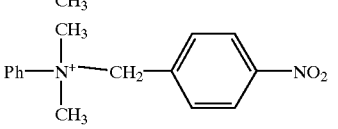

-continued

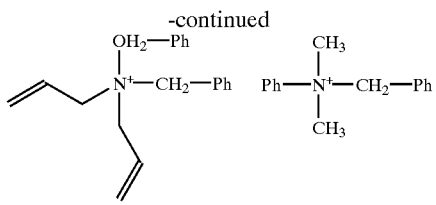  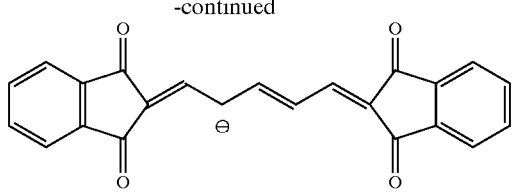

Examples of oxonol dyes represented by the general formula (I) include the dyes described in European Patent (hereinafter described as EP) No.397,435, Patent Registration No. 2,676,212.

Some preferred specific examples (A1~A39 and IR-1~IR-52) of the anionic, infrared absorbing agent composed of compounds made by using the foregoing suitable counter ions are given below. However, it must be noted that the present invention is not limited to these specific examples. In the following examples, if any numeral is given under a compound number, the numeral denotes the number of carbon atoms in the conjugated methine chain.

Also, it must be noted that the structure of each of the following dyes is represented by one of the resonance structures thereof and accordingly the following structural formulae, for example, indicate the same molecule.

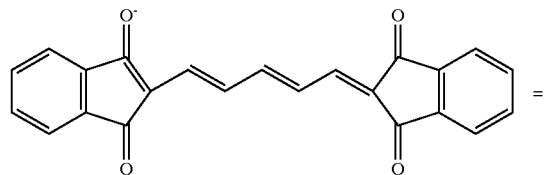

-continued

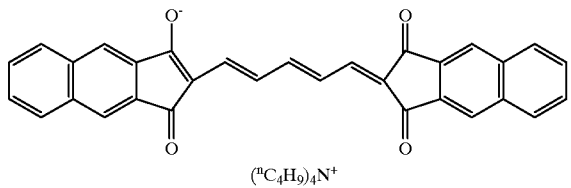

A-1

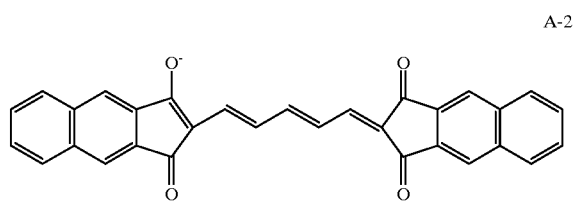

A-2

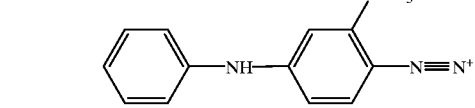

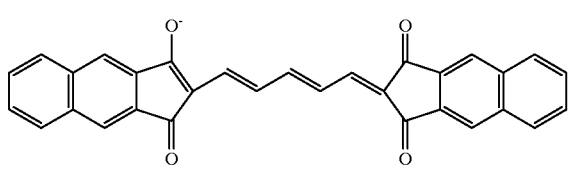

A-3

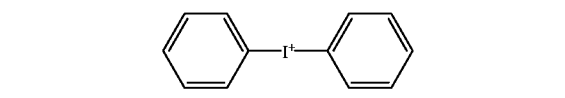

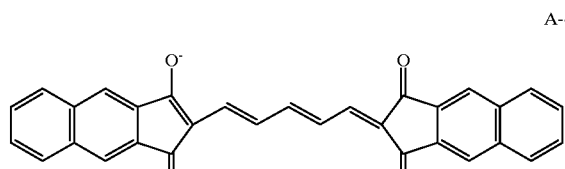

A-4

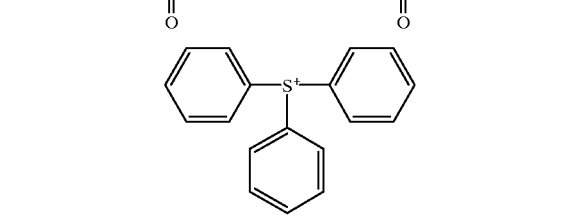

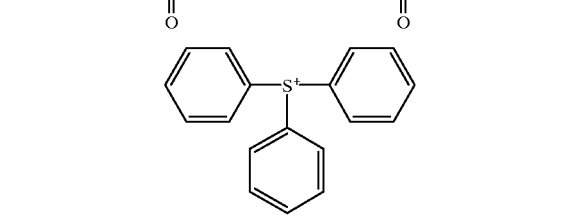

A-5
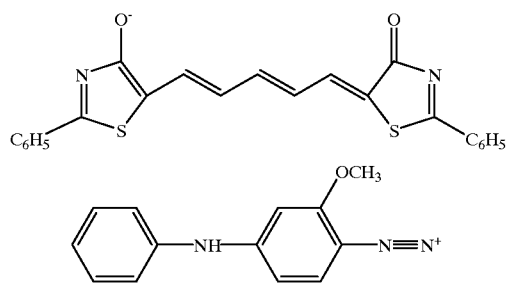
A-6
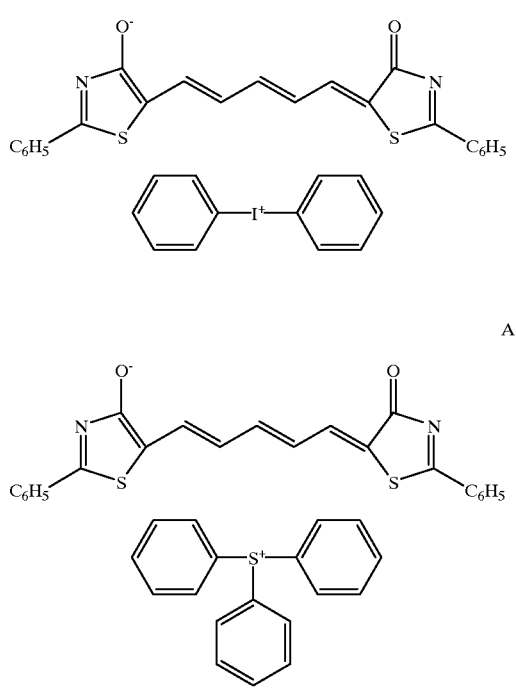
A-7
A-8
A-9
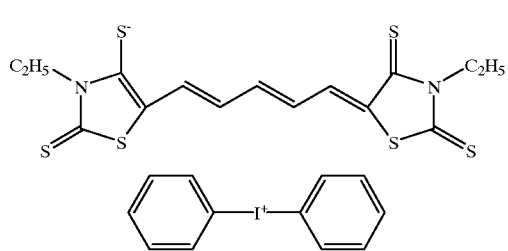
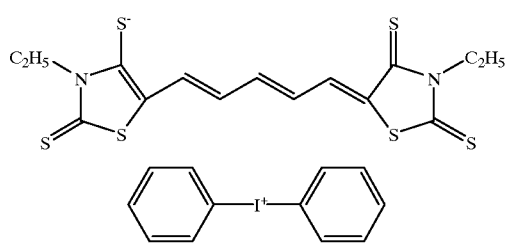
A-10
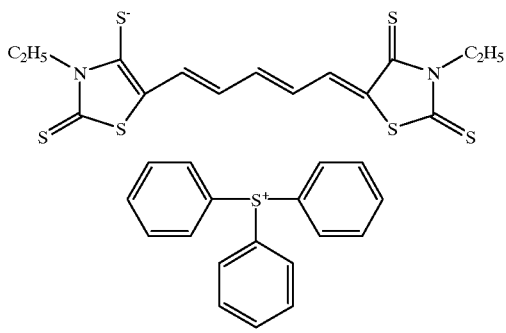
A-11
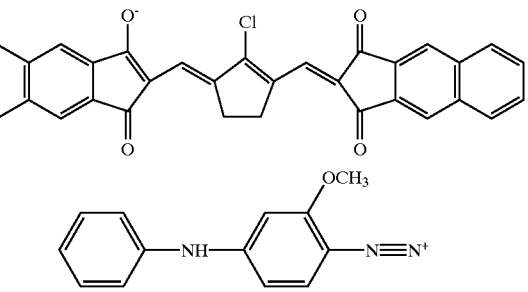
A-12
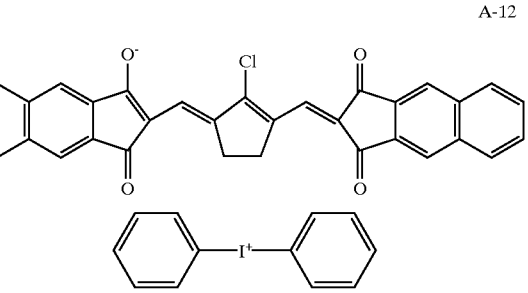
A-13
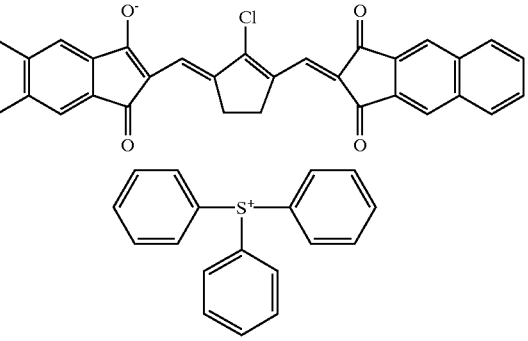
carbon-black-$CO_2^-$
A-14
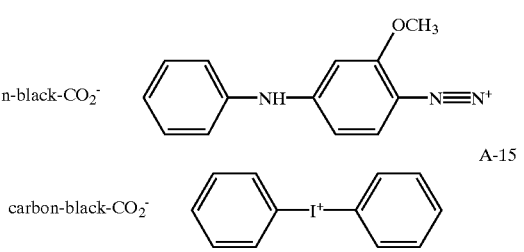
carbon-black-$CO_2^-$
A-15

-continued
A-16
carbon-black-CO₂⁻
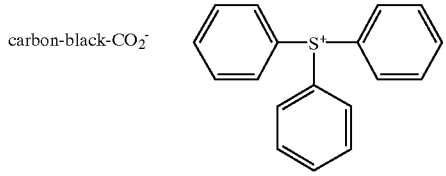
A-17
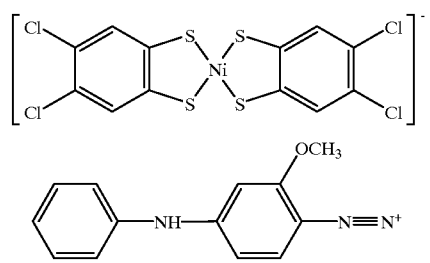
A-18
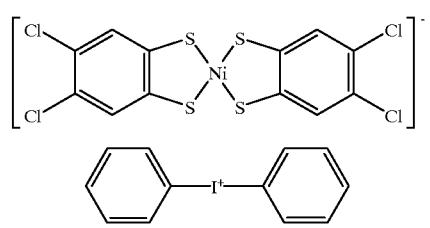
A-19
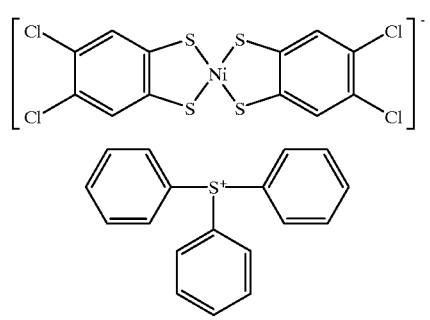
A-20
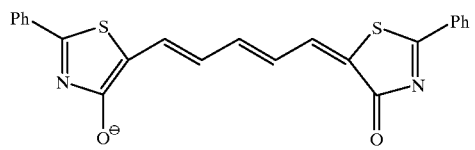
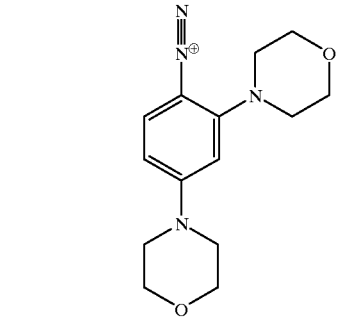
-continued
A-21
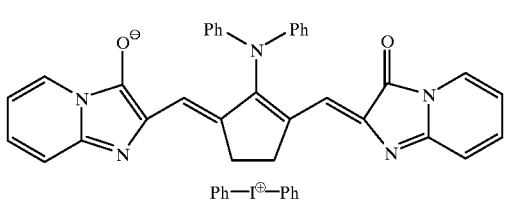
A-22
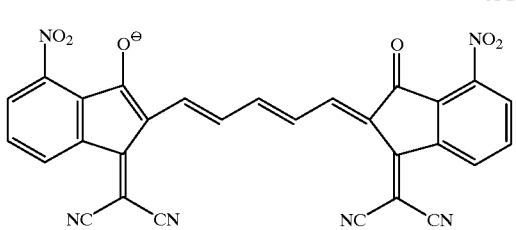
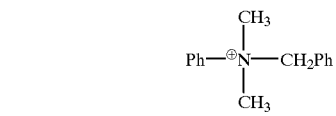
A-23
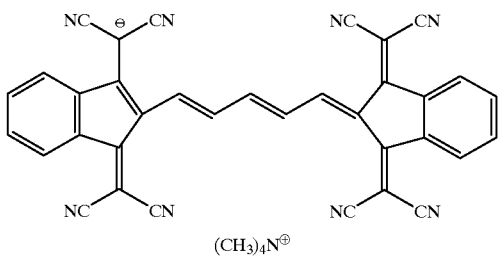
(CH₃)₄N⊕
A-24
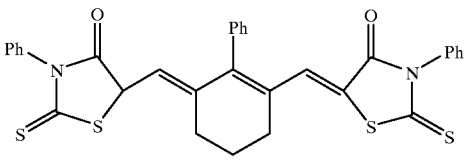
A-25
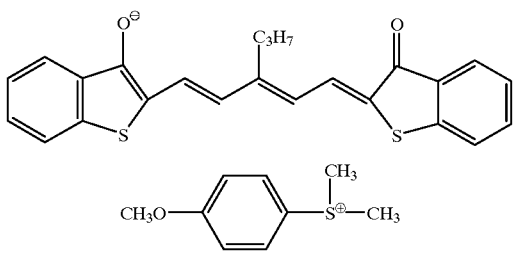

-continued
A-26
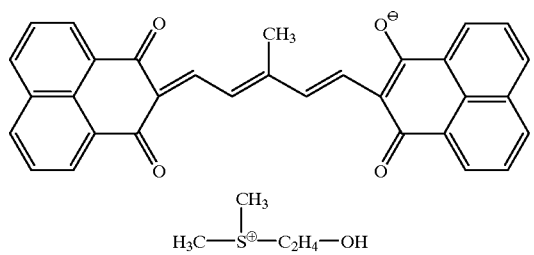
A-27
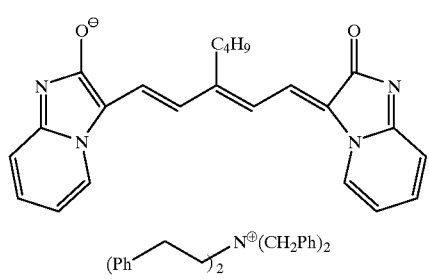
A-28
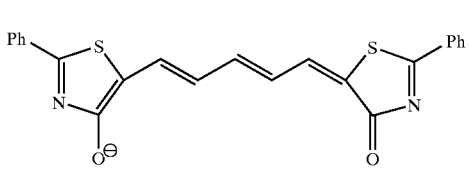
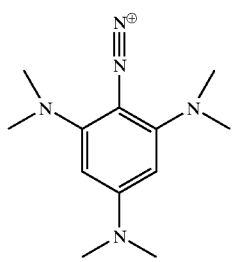
A-29
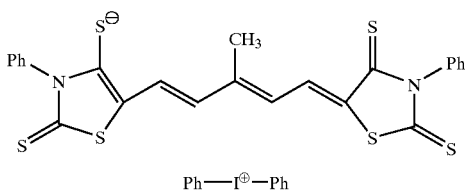
A-30
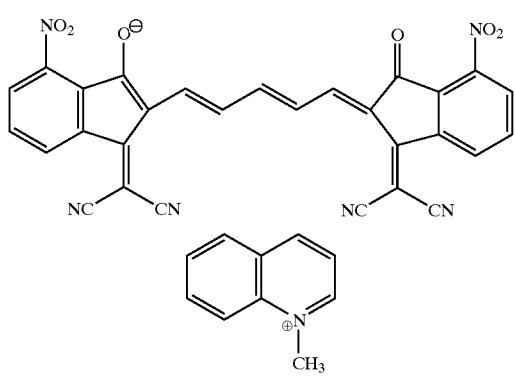
-continued
A-31
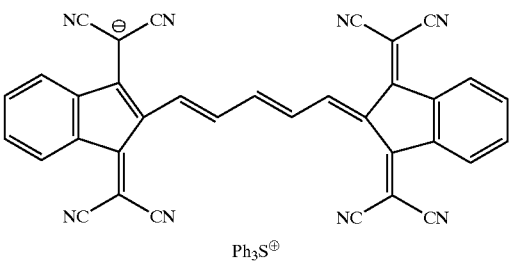
A-32
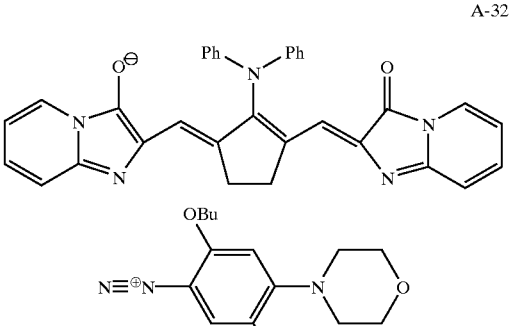
A-33
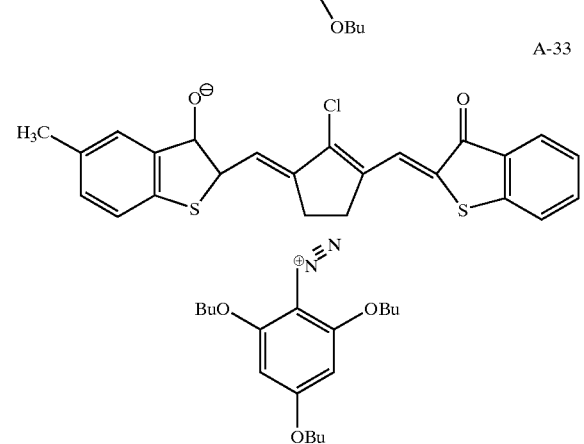
A-34
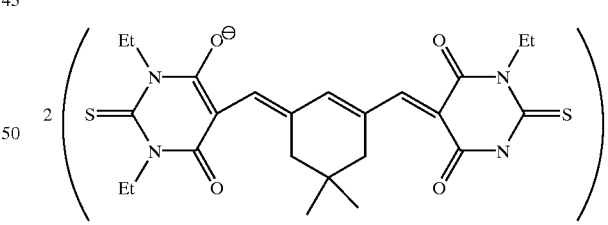
A-35
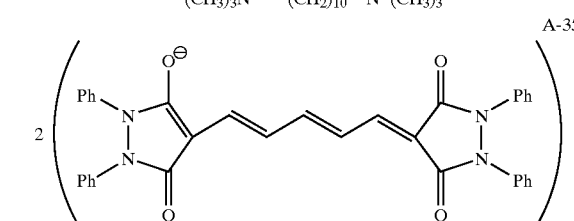
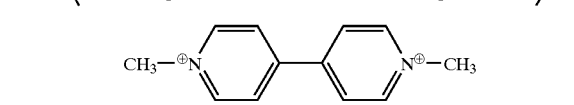

-continued
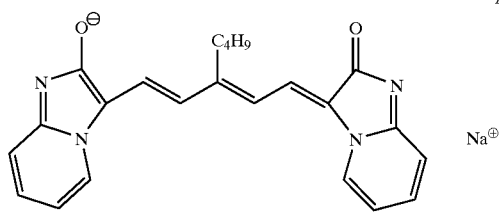
A-36
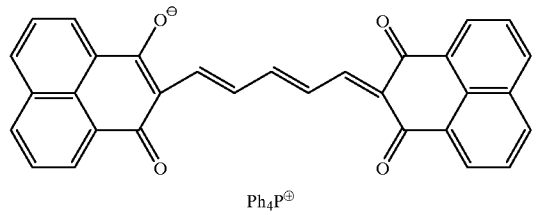
A-38
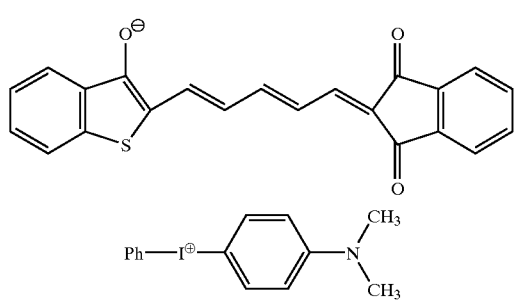
A-37
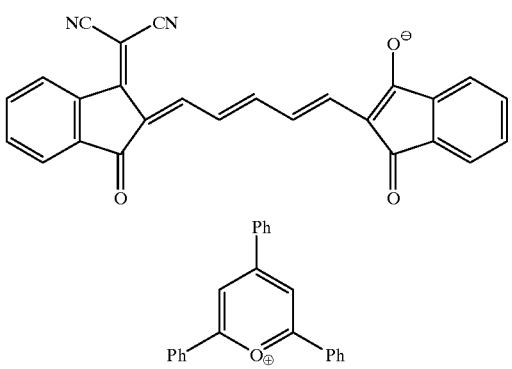
A-39
(7)
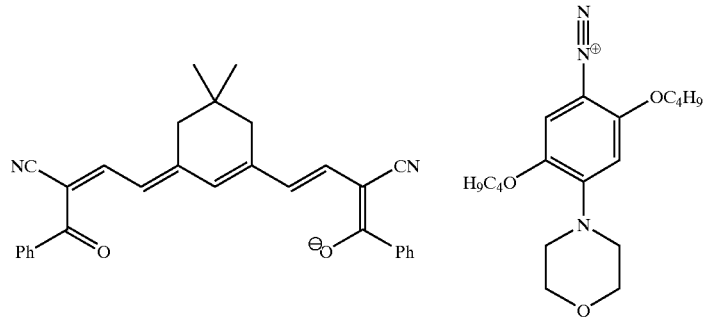
(IR-1)
(IR-2)
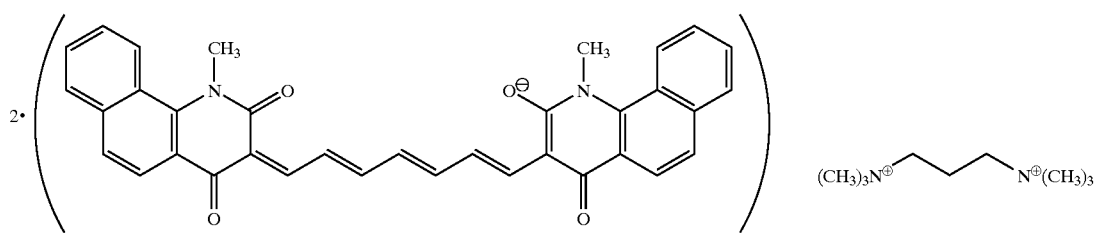

-continued
(7) (IR-3)
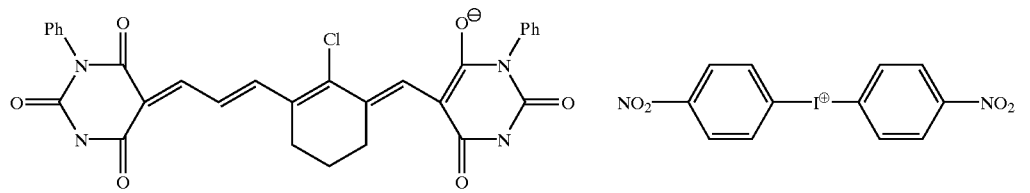
(7) (IR-4)
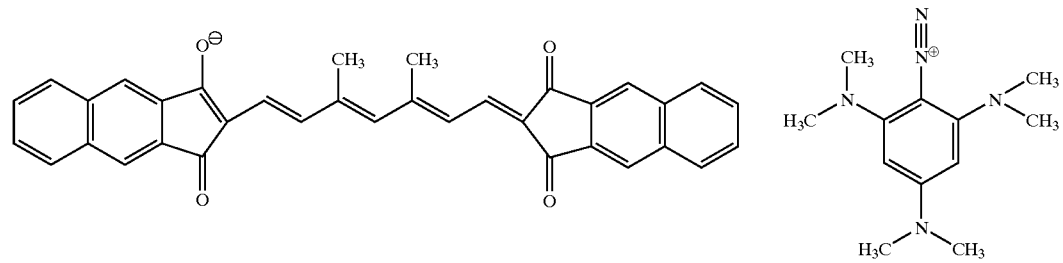
(7) (IR-5) (7) (IR-6)
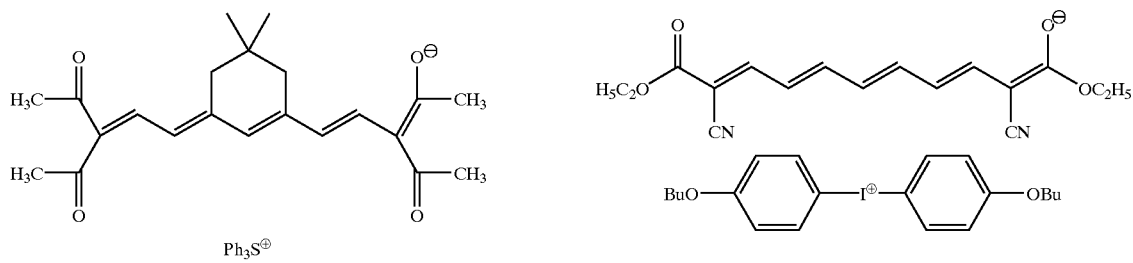
(7) (IR-7) (7) (IR-8)
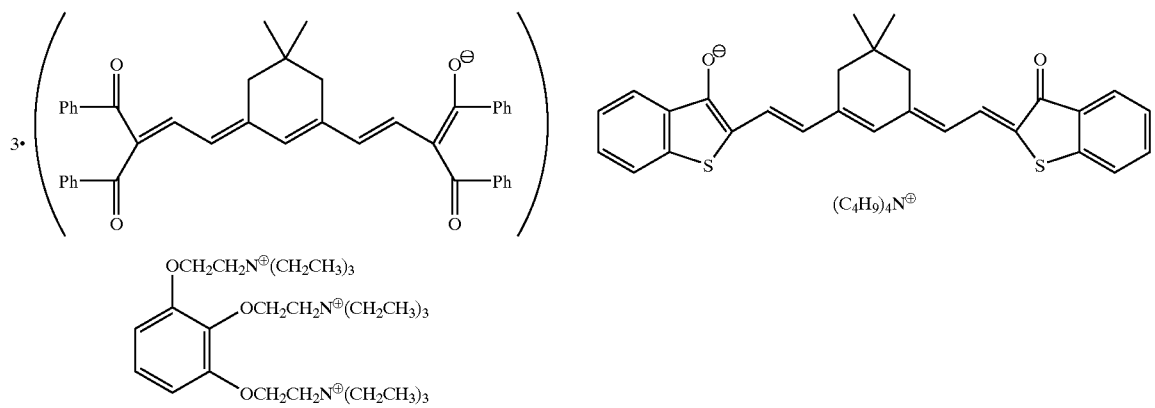

-continued
(IR-9) (IR-10) (IR-11) (IR-12) (IR-13) (IR-14) (IR-15) (IR-16)
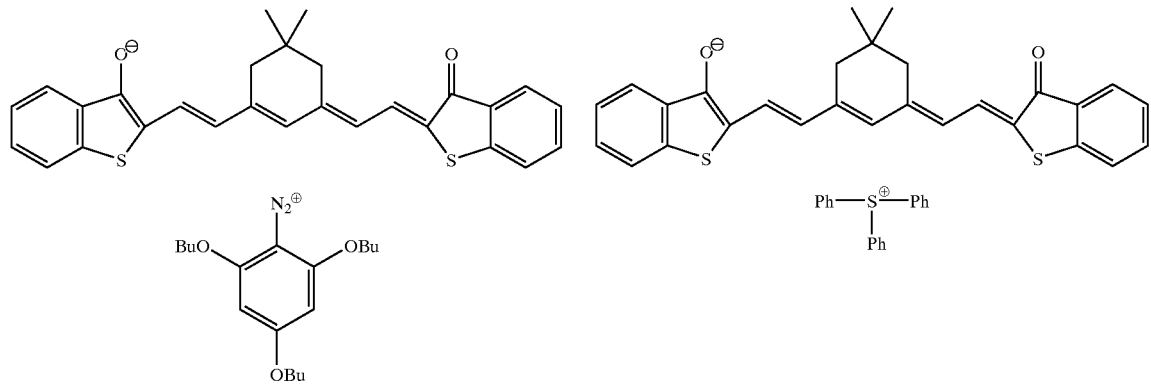
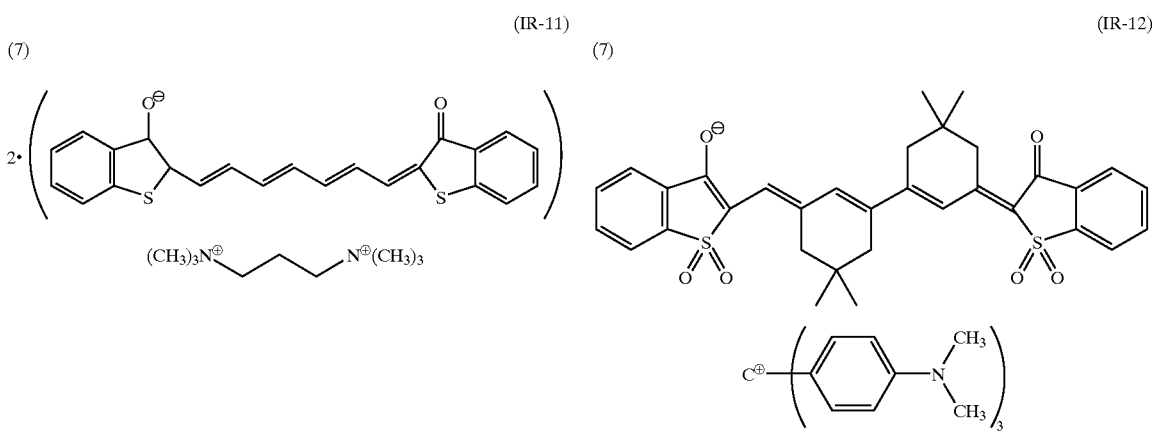
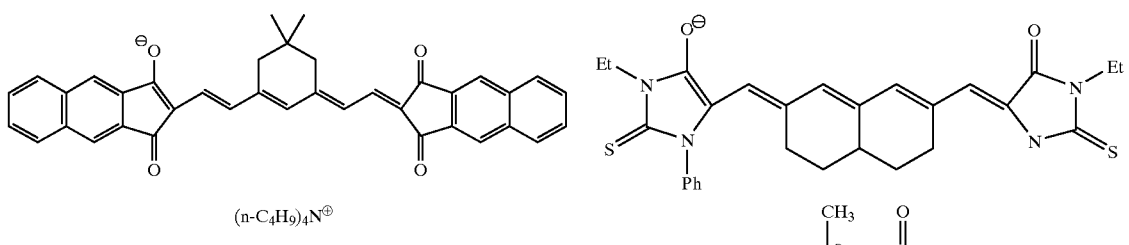
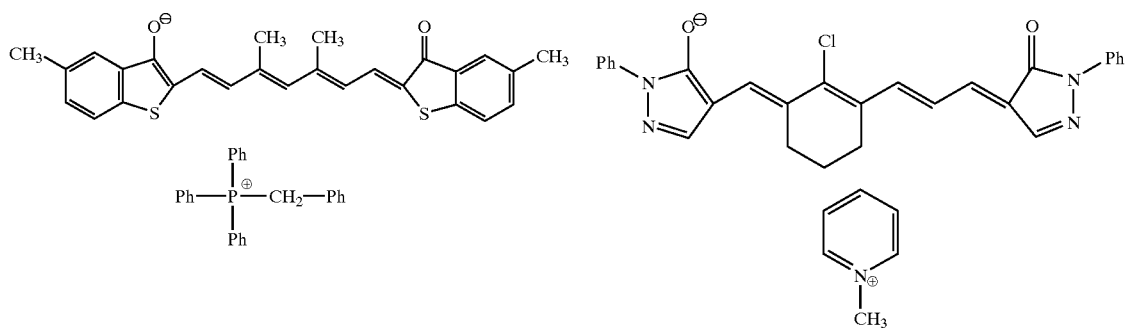

-continued
(IR-17)
(9)
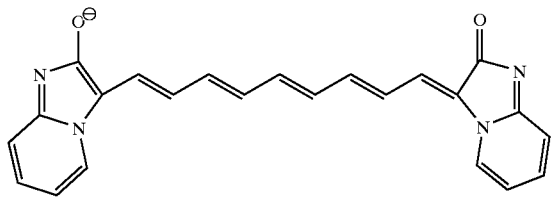
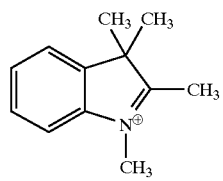
(IR-18)
(7)
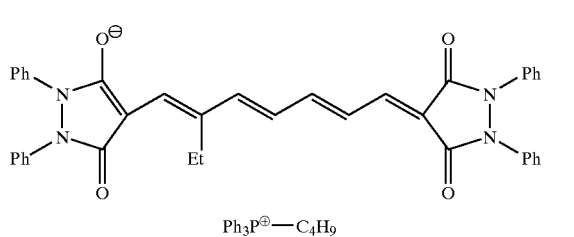
(IR-19)
(7)
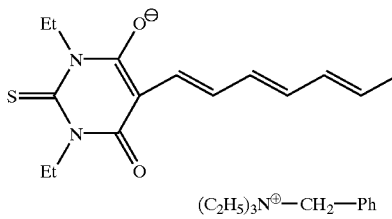
(IR-20)
(7)
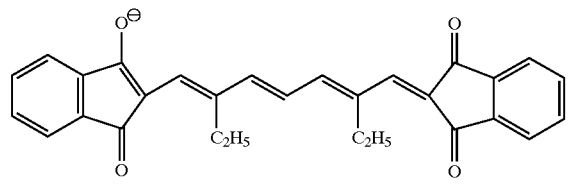
(IR-21)
(7)
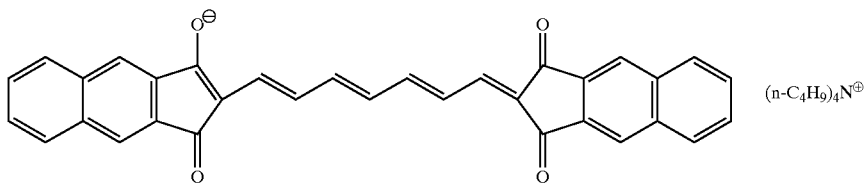
(IR-22)
(7)
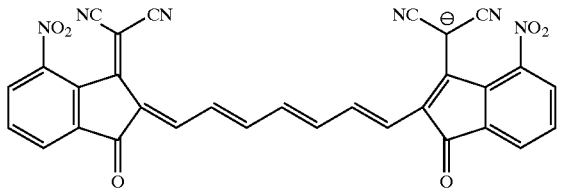
(IR-23)
(7)
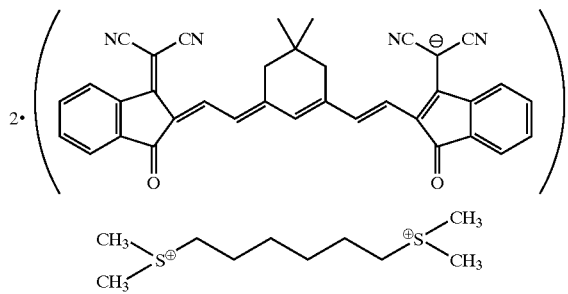

-continued
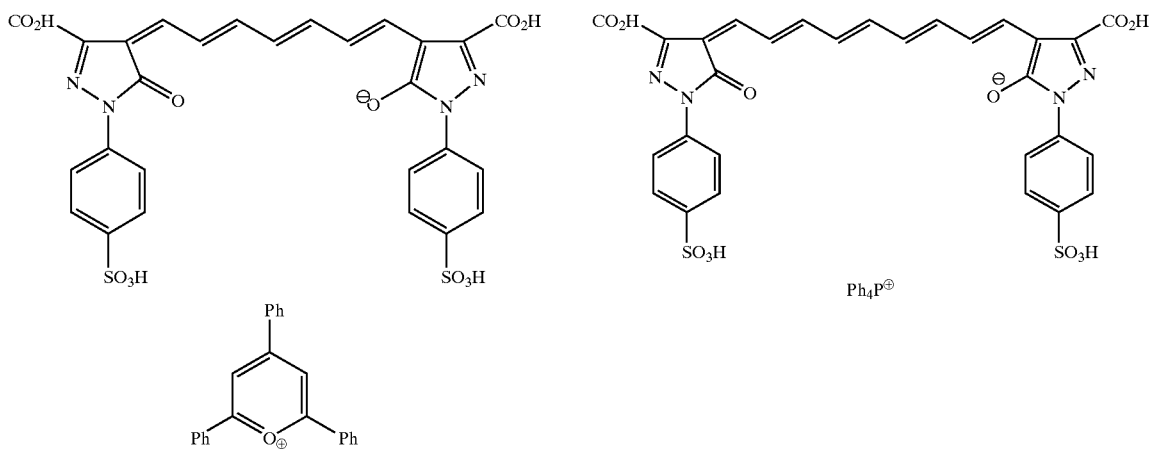
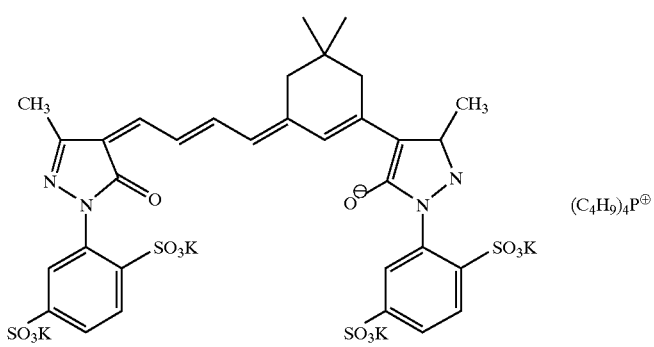
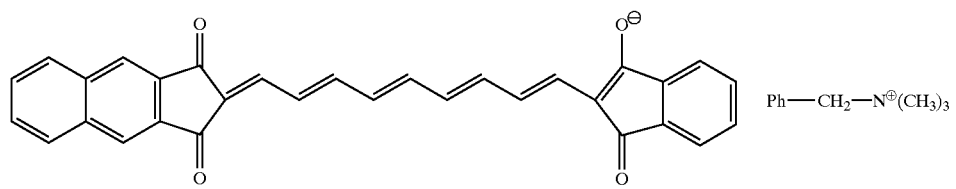
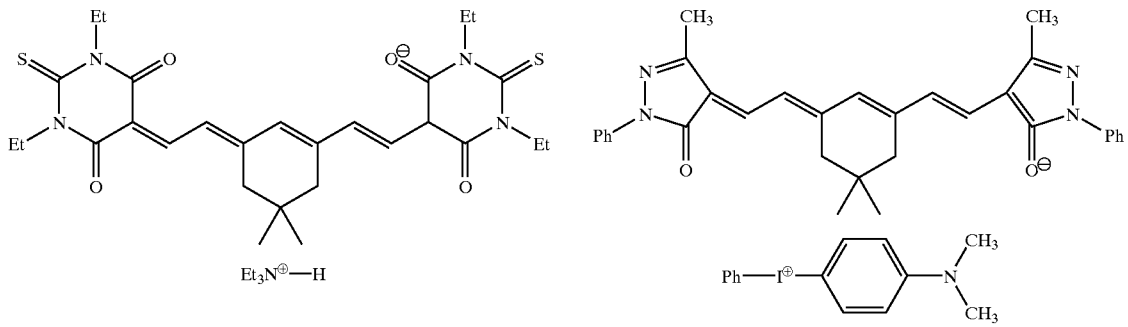

-continued
(IR-30) (7)
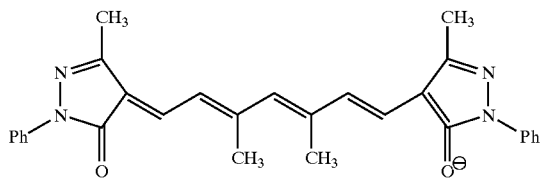
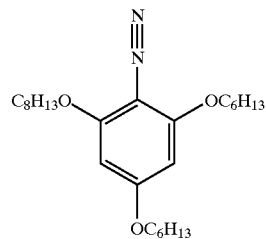
(IR-31) (7)
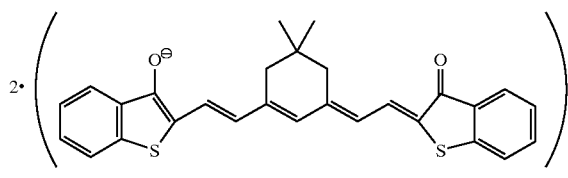
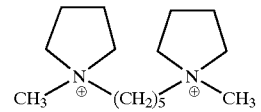
(IR-32) (7)
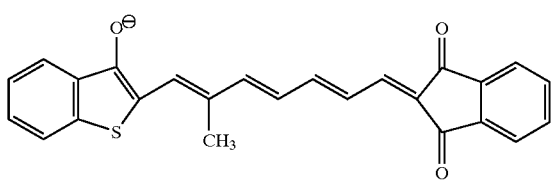
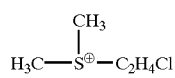
(IR-33) (7)
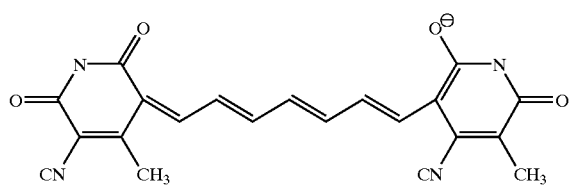
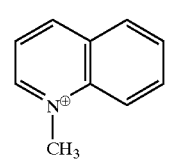
(IR-34) (9)
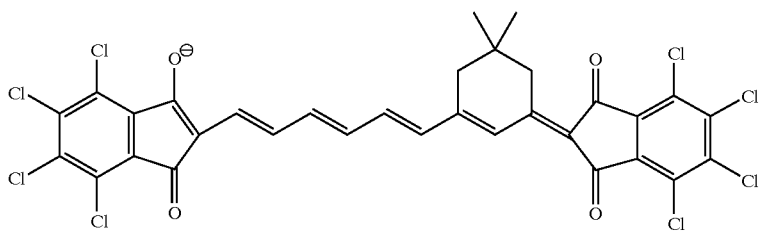
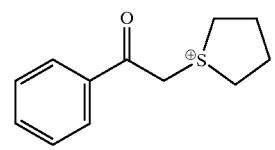
(IR-35) (9)
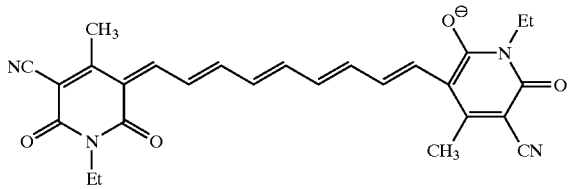
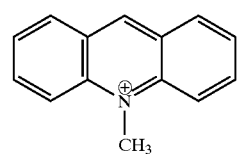
(IR-36) (7)
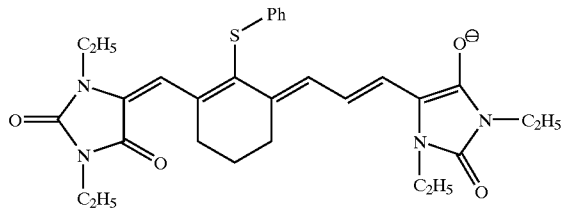
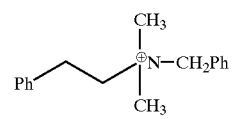

-continued
(IR-37)
(7) 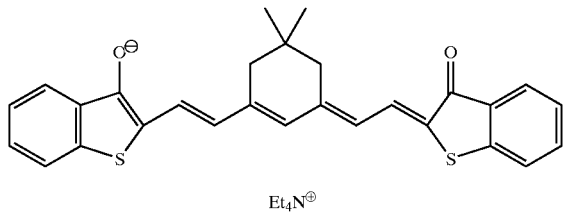
(IR-38)
(7) 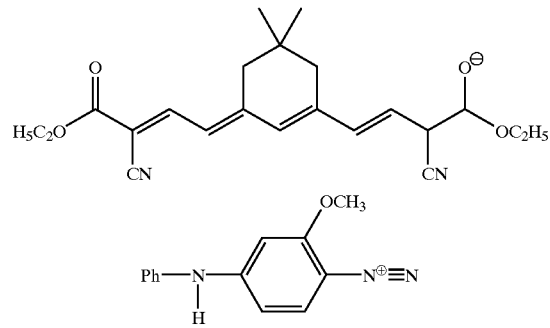
(7) 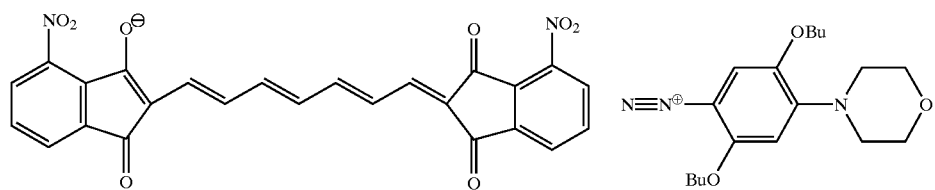
(IR-39)
(7) 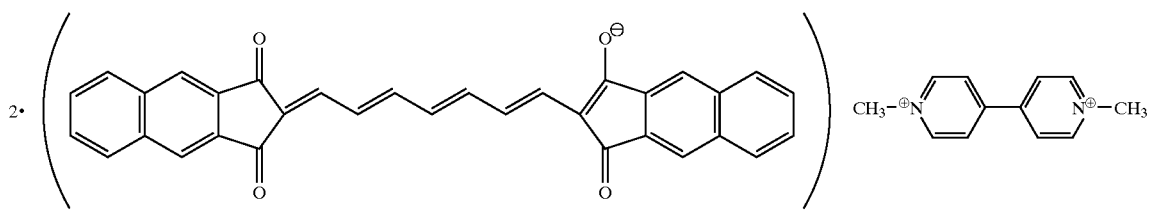
(IR-40)
(7) 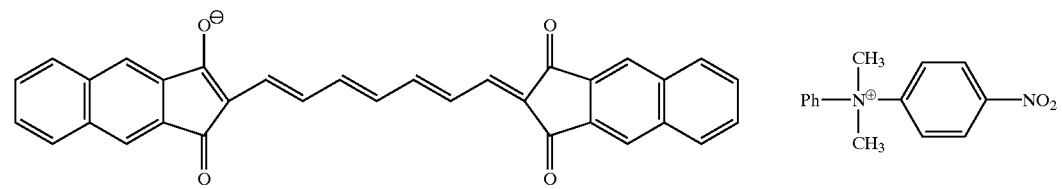
(IR-41)
(7) 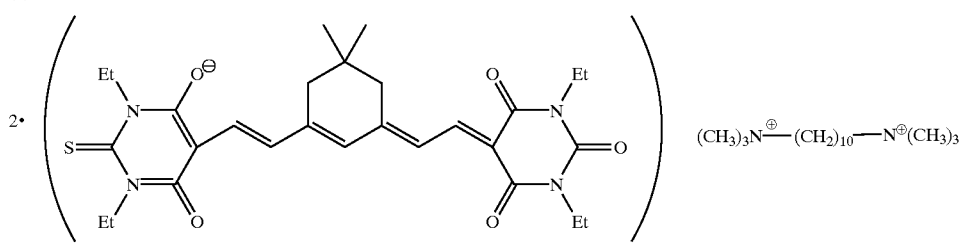
(IR-42)

(IR-43)
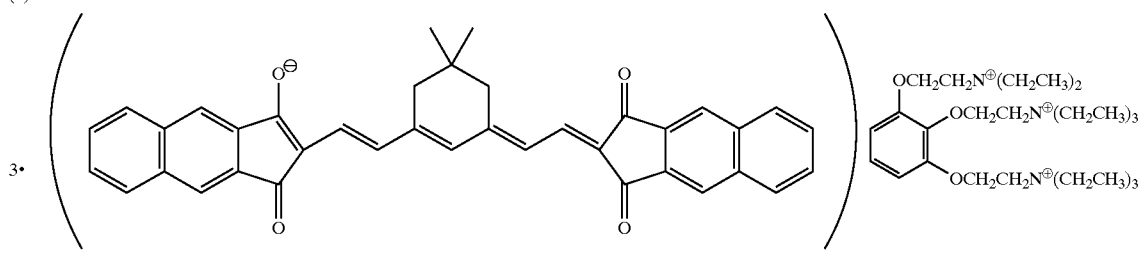
(IR-44)
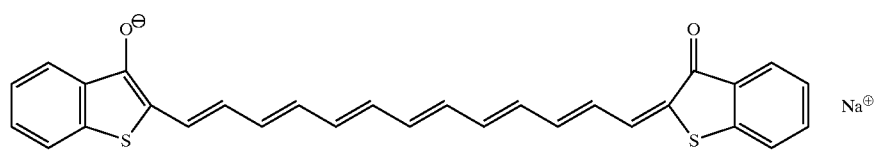
(IR-45) (IR-46)
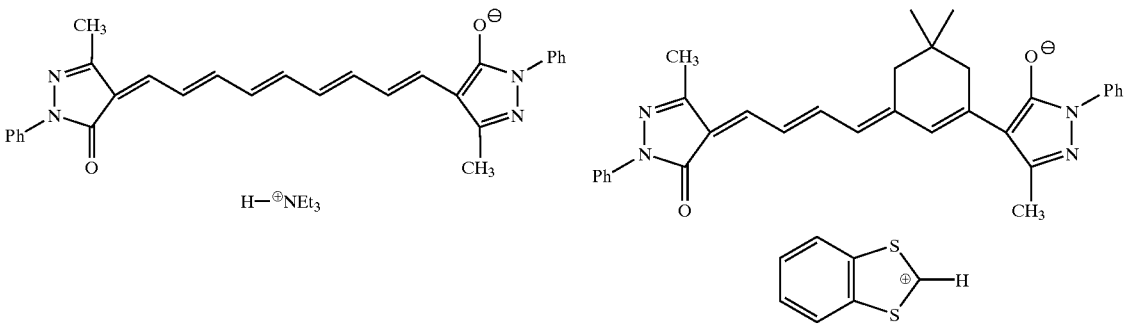
(IR-47)
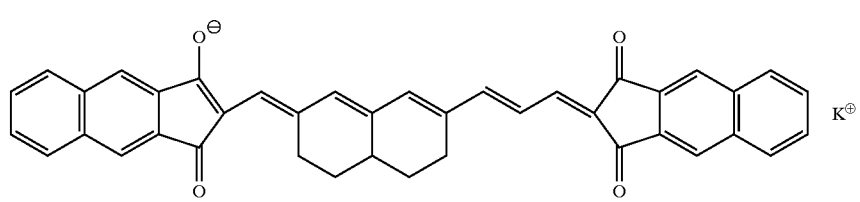
(IR-48)
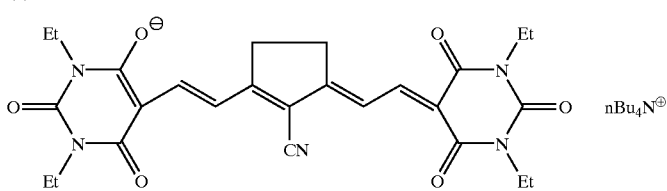
(IR-49)
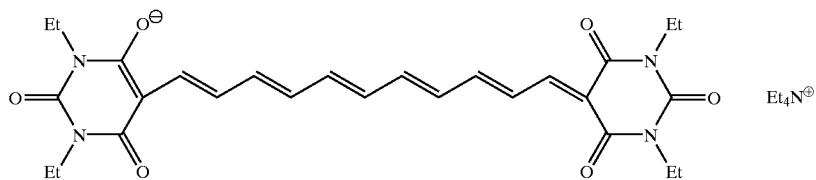

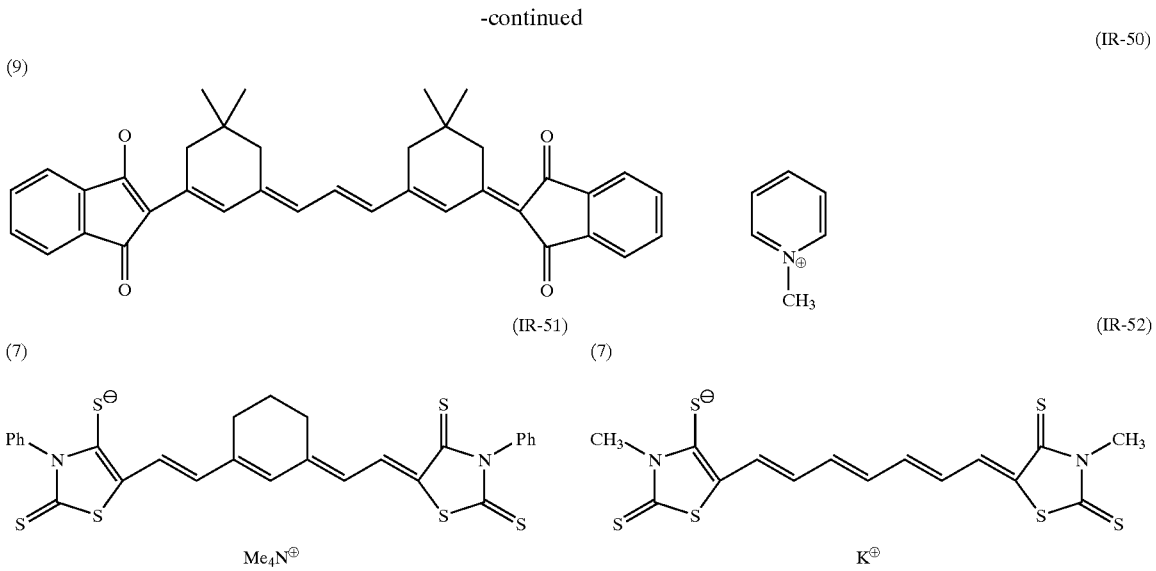

In the present invention, the amount added of the anionic, infrared-ray absorbing agent is of 0.01 to 50% by weight, preferably of 0.1 to 20% by weight, and more preferably of 0.5 to 15% by weight, based on the total weight of the solids in the photosensitive composition. If the amount added is less than 0.01% by weight, the photosensitive composition cannot form an image, whereas, if the amount added is more than 50% by weight, non-image portions may be smudged when the composition is used as the photosensitive layer of a planographic printing plate precursor.

In addition to the infrared-ray absorbing agent, the photosensitive composition of the present invention may contain a pigment or dye capable of absorbing infrared rays, in order to improve the image-forming performance.

The pigments suitable for use in the present invention include commercially available pigments and the pigments described in "Color Index (C.I.) Handbook", "The Handbook of the Latest Pigments" (Saishin Ganryo Binran), edited by the Japan Association of Pigment Technologies (Nihon Ganryo Gijutsu Kyokai) (1977), "Latest Pigment Application Technologies" (Saishin Ganryo Oyo Gijutsu), CMC, 1986, and "Printing Ink Technologies" (Insatsu Inki Gijutsu), CMC, 1984.

Examples of the kinds of the pigments include black pigments, yellow pigments, orange pigments, brown pigments, red pigments, purple pigments, blue pigments, green pigments, fluorescent pigments, metal powder pigments, and polymers containing chemically combined dyes. Specific examples of the pigments include insoluble azo pigments, azo lake pigments, condensed azo pigments, chelated azo pigments, phthalocyanine-based pigments, anthraquinone-based pigments, perylene- and perinone-based pigments, thioindigo-based pigments, quinacridone-based pigments, dioxazine-based pigments, isoindolinone-based pigments, quinophthalone-based pigments, dyed lake pigments, azine pigments, nitroso pigments, nitro pigments, natural pigments, fluorescent pigments, inorganic pigments, carbon black, and the like.

These pigments may be used without being surface-treated or may be used after being surface-treated. Possible surface treatments include a treatment wherein a resin or a wax is coated on the surface of the pigment, a treatment wherein a surfactant is adhered to the surface of the pigment, and a treatment wherein a reactive substance (for example, silane coupling agent, an epoxy compound, or a polyisocyanate) is bound to the surface of the pigment. These surface-treating methods are described in "Properties and Applications of Metal Soaps" (Saiwai Shobo Co., Ltd.), "Printing Ink Technologies" (Insatsu Inki Gijutsu), CMC, 1984, and "Latest Pigment Application Technologies" (Saishin Ganryo Oyo Gijutsu), CMC, 1986.

The diameter of the pigments is preferably in the range of from 0.01 to 10 $\mu$m, more preferably in the range of from 0.05 to 1 $\mu$m, and most preferably in the range of from 0.1 to 1 $\mu$m. If the diameter is less than 0.1 $\mu$m, dispersion stability of the pigments in a coating liquid for the preparation of the photosensitive layer is insufficient, whereas, if the diameter is greater than 10 $\mu$m, uniformity of the photosensitive layer is poor.

A known dispersion technology employed in the preparation of ink, toners, and the like can also be used for the purpose of dispersing the pigments. Examples of dispersing machines include an ultrasonic dispersing machine, a sand mill, an attritor, a pearl mill, a super mill, a ball mill, an impeller, a disperser, a KD mill, a colloid mill, a dynatron, a three-roller mill, a pressurized kneader, and the like. Details of these dispersion technologies are described in "Latest Pigment Application Technologies" (Saishin Ganryo Oyo Gijutsu), CMC, 1986.

The dyes suitable for use in the present invention include commercially available dyes and dyes described in "Handbook of Dyes", edited by the Association of Organic Synthesis (Yuki Gosei Kagaku Kyokai) (1970). Specific examples of the dyes include azo dyes, azo dyes in the form of a metallic complex salt, pyrazolone azo dyes, anthraquinone dyes, phthalocyanine dyes, carbonium dyes, quinoneimine dyes, methine dyes, and cyanine dyes.

Among these pigments and dyes, the pigments and dyes that absorb infrared or near-infrared rays are particularly preferable for use in the present invention, because of suitability for use in combination with a laser emitting infrared or near-infrared rays.

Carbon black may be used as the pigment that absorbs infrared or near-infrared rays suited for use in the present invention. Examples of the dyes that absorb infrared or near-infrared rays and are suited for use in the present invention include cyanine dyes described in, for example, JP-A Nos. 58-125,246, 59-84,356, 59-202,829, and 60-78, 787;methine dyes described in, for example, JP-A Nos. 58-173,696, 58-181,690 and 58-194,595; naphthoquinone dyes described in, for example, JP-A Nos. 58-112,793, 58-224,793, 59-48,187, 59-73,996, 60-52,940, and 60-63,744; squarylium dyes described in, for example, JP-A No. 58-112,792; cyanine dyes described in U.K. Patent No. 434,875; and dihydropyrimidinesquarylium dyes described in U.S. Pat. No. 5,380,635.

Other compounds that can be suitably used as the dye include a near-infrared ray absorbing sensitizer described in U.S. Pat. No. 5,156,938. Also, particularly suitable compounds include: a substituted arylbenzo(thio)pyrylium salt described in U.S. Pat. No. 3,881,924; a trimethinethiopyrylium salt described in JP-A No. 57-142,645 (U.S. Pat. No. 4,327,169); pyrylium-based compounds described in JP-A Nos. 58-181,051, 58-220,143, 59-41,363, 59-84,248, 59-84,249, 59-146,063, and 59-146,061; a cyanine dye described in JP-A No. 59-216,146; a pentamethinethiopyrylium salt described in U.S. Pat. No. 4,283,475; pyrylium compounds described in Japanese Patent Application Publication (JP-B) Nos. 5-13,514 and 5-19,702; Epolight III-178, Epolight III-130, Epolight III-125, Epolight IV-62A, and the like.

Further examples of particularly preferred dyes include the near-infrared ray absorbing dyes represented by the formulae (I) and (II) described in U.S. Pat. No. 4,756,993.

In the present invention, the amount added of the pigment or dye is of 0.01 to 50% by weight, preferably of 0.1 to 10% by weight, most preferably of 0.5 to 10% by weight in the case of dye, and most preferably of 3.1 to 10% by weight in the case of pigment, based on the total weight of the solids in the materials for the printing plate. If the amount added of the pigment or dye is less than 0.01% by weight, sensitivity is poor, whereas, if the amount added is more than 50% by weight, uniformity of the photosensitive layer and durability of a recording layer become poor.

These dyes or pigments may be added to the photosensitive composition so that these dyes or pigments are added together with other components to the photosensitive layer, or alternatively may be added to a layer that contains these dyes or pigments formed in addition to the photosensitive layer when the planographic printing plate precursor is prepared. (b) polymeric compounds soluble in an aqueous alkaline solution The term "(b) polymeric compounds soluble in an aqueous alkaline solution" used in the present invention means polymeric compounds having in a main chain or side chain thereof a group having acid group structures such as the following: namely, a phenolic hydroxyl group (—Ar—OH), carboxylic acid group (—COOH), sulfonic acid group (—SO$_3$H), phosphoric acid group (—OPO$_3$H), sulfonamide group (—SO$_2$NH—R), substituted sulfonamide-based group (active imido groups) (—SO$_2$NHCOR, —SO$_2$NHSO$_2$R, and —CONHSO$_2$R).

In these formulae, Ar represents a divalent aryl group which may have a substituent group, and R represents a hydrocarbon group which may have a substituent group.

Among these acid groups, preferable are (b-1) a phenolic hydroxyl group, (b-2) a sulfonamide group, and (b-3) an active imido group; and most preferable is (b-1) a resin that has a phenolic hydroxyl group and is soluble in an aqueous alkaline solution (this resin is hereinafter referred to as "a resin having a phenolic hydroxyl group").

Examples of the polymeric compounds having (b-1) a phenolic hydroxyl group include: novolac resins, such as a condensation polymerization product from phenol and formaldehyde (hereinafter referred to as a phenol/formaldehyde resin), a condensation polymerization product from m-cresol and formaldehyde (hereinafter referred to as a m-cresol/formaldehyde resin), a condensation polymerization product from p-cresol and formaldehyde, a condensation polymerization product from a m-cresol/p-cresol mixture and formaldehyde, and a condensation polymerization product from phenol, cresol (which may be m-cresol, p-cresol, or a mixture of m-cresol and p-cresol); and a condensation polymerization product from pyrogallol and acetone. Also usable are copolymers produced by copolymerization of monomers having a phenol group in a side chain. Examples of the monomers having a phenol group suited for use in the present invention include phenol group-containing acrylamide, methacrylamide, acrylate, methacrylate, hydroxystyrene, and the like. Specific preferred examples of these monomers include N-(2-hydroxyphenyl)acrylamide, N-(3-hydroxyphenyl)acrylamide, N-(4-hydroxyphenyl) acrylamide, N-(2-hydroxyphenyl)methacrylamide, N-(3-hydroxyphenyl)methacrylamide, N-(4-hydroxyphenyl) methacrylamide, o-hydroxyphenyl acrylate, m-hydroxyphenyl acrylate, p-hydroxyphenyl acrylate, o-hydroxyphenyl methacrylate, m-hydroxyphenyl methacrylate, p-hydroxyphenyl methacrylate, o-hydroxystyrene, m-hydroxystyrene, p-hydroxystyrene, 2-(2-hydroxyphenyl)ethyl acrylate, 2-(3-hydroxyphenyl) ethyl acrylate, 2-(4-hydroxyphenyl)ethyl acrylate, 2-(2-hydroxyphenyl)ethyl methacrylate, 2-(3-hydroxyphenyl) ethyl methacrylate, 2-(4-hydroxyphenyl)ethyl methacrylate, and the like. From the standpoint of image-forming performance, preferably the polymeric compound has a weight average molecular weight in the range of from $5.0 \times 10^2$ to $2.0 \times 10^4$ and a number average molecular weight in the range of from $2.0 \times 10^2$ to $1.0 \times 10^4$. These resins may be used singly or in a combination of two or more. In a case where a combination is used, any of these resins may be combined with a condensation polymerization product from a phenol substituted by an alkyl group having 3~8 carbon atoms and formaldehyde, such as a condensation polymerization product from t-butylphenol and formaldehyde or a condensation polymerization product from octylphenol and formaldehyde, as described in U.S. Pat. No. 4,123,279.

The weight average molecular weight of the resin having a phenolic hydroxyl group is preferably in the range of from 500 to 20,000. The number average molecular weight thereof is preferably in the range of from 200 to 10,000.

Further, as described in U.S. Pat. No. 4,123,279, resins, such as a t-butylphenol/formaldehyde resin and an octylphenol/formaldehyde resin, obtained by a condensation reaction between a phenol that is substituted by an alkyl group having 3 to 8 carbon atoms and formaldehyde, may be used in combination. These resins having a phenolic hydroxyl group may be used singly or in a combination of two or more.

In a case of a polymeric compound that has (b-2) a sulfonamide group and is soluble in alkaline water, examples of monomers having (b-2) a sulfonamide group, i.e., main monomers forming the polymeric compounds, include a monomer comprised of a compound that has a low molecular weight and has in a molecule thereof at least one sulfonamide group having at least one hydrogen atom linked to a nitrogen atom together with at least one unsaturated bond capable of polymerization. Among these monomers, preferable is a compound that has a low molecular weight and has an acryloyl group, an allyl group, or a vinyloxy group, together with a substituted or mono-substituted aminosulfonyl group or a substituted sulfonylimino group.

Examples of these compounds include the compounds represented by any of the following general formulae (3) to (7).

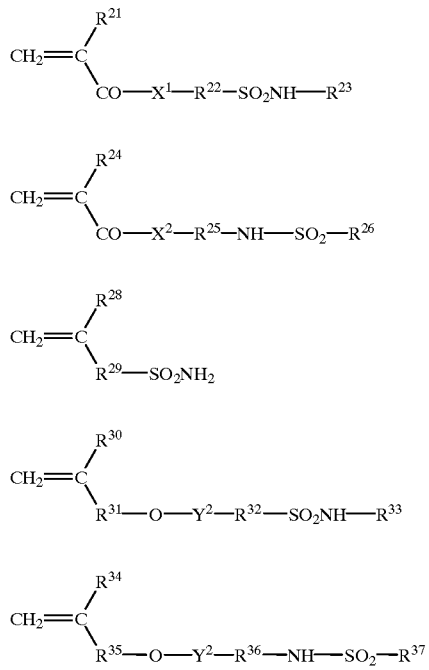

In the formulae, $X^1$ and $X^2$ each represent —O— or —$NR^{17}$—. $R^{21}$ and $R^{24}$ each represent a hydrogen atom or —$CH_3$. $R^{22}$, $R^{25}$, $R^{29}$, $R^{32}$ and $R^{36}$ each represent an alkylene group, a cycloalkyl group, an aryl group, or an aralkyl group, each garup having 1 to 12 carbon atoms and possibly having a substituent group. $R^{23}$ $R^{27}$, and $R^{33}$ each represent a hydrogen atom, or alternatively an alkyl group, a cycloalkyl group, an aryl group, or an aralkyl group, each group having 1 to 12 carbon atoms and possibly having a substituent group. $R^{26}$ and $R^{27}$ each represent an alkyl group, a cycloalkyl group, an aryl group, or an aralkyl group, each group having 1 to 12 carbon atoms and possibly having a substituent group. $R^{28}$, $R^{30}$ and $R^{34}$ each represent a hydrogen atom or —$CH_3$. $R^{31}$ and $R^{35}$ each represent a single bond or alternatively an alkylene group, a cycloalkylene group, an arylene group, or an aralkylene group, each group having 1 to 12 carbon atoms and possibly having either a substituent group. $Y^1$ and $Y^2$ each represent a single bond or —CO—.

Preferred specific examples of the compounds include m-aminosulfonylphenyl methacrylate, N-(p-aminosulfonylphenyl)methacrylamide, and N-(p-aminosulfonylphenyl)acrylamide.

In a case of a polymeric compound that has (b-3) an active imido group and is soluble in an aqueous alkaline solution, examples of monomers having (b-3) an active imido group, i.e., main monomers forming the polymeric compounds, include a monomer comprised of a compound that has a low molecular weight and has in a molecule thereof at least one active imido group represented by the formula given below, together with at least one unsaturated bond capable of polymerization.

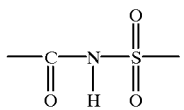

Preferred specific examples of the compounds include N-(p-toluenesulfonyl)methacrylamide and N-(p-toluenesulfonyl)acrylamide.

As a copolymer that is soluble in alkaline water and can be used in the present invention the copolymer does not need to be composed of a single kind of monomer selected from monomers having any of the (b-1)~(b-3) acid groups. Two or more kinds of monomers having the same acid group, or alternatively two or more kinds of monomers having different acid groups may also be used for copolymerization.

As for methods of copolymerizing the monomers, traditionally known methods such as graft polymerization, block polymerization, random polymerization, and the like can be used.

In the present invention, the copolymer includes in a percentage of preferably 10 mol % or more, more preferably 20 mol % or more, the copolymerization monomer(s) selected from the monomers having any of the (b-1)~(b-3) acid groups. If the copolymerizing component is less than 10 mol %, interaction between the resulting copolymer and the resin having a phenolic hydroxyl group is insufficient and thus an advantageous effect to be brought about by the use of the copolymerizing component, i.e., improvement in latitude in development, becomes insufficient.

The copolymer may include a copolymerizing component other than the monomer(s) selected from the monomers having any of the (b-1)~(b-3) acid groups.

Examples of monomers that can be used as the copolymerizing component include monomers of items (1) to (12) given below.

(1) acrylates and methacrylates which have each an aliphatic hydroxyl group and are exemplified by 2-hydroxyethyl acrylate, 2-hydroxyethyl methacrylate, and the like (2) alkyl acrylates such as methyl acrylate, ethyl acrylate, propyl acrylate, butyl acrylate, amyl acrylate, hexyl acrylate, octyl acrylate, benzyl acrylate, 2-chloroethyl acrylate glycidyl acrylate, and N-dimethylaminoethyl acrylate (3) alkyl methacrylates such as methyl methacrylate, ethyl methacrylate, propyl methacrylate, butyl methacrylate, amyl methacrylate, hexyl methacrylate, cyclohexyl methacrylate, benzyl methacrylate, 2-chloroethyl methacrylate glycidyl methacrylate and N-dimethylaminoethyl methacrylate (4) acrylamides or methacrylamides such acrylamide, methacrylamide, N-methylolacrylamide, N-ethylacrylamide, N-hexylmethacrylamide, N-cyclohexylacrylamide, N-hydroxyethylacrylamide, N-phenylacrylamide, N-nitrophenylacrylamide, and N-ethyl-N-phenylacrylamide (5) vinyl ethers such as ethyl vinyl ether, 2-chloroethyl vinyl ether, hydroxyethyl vinyl ether, propyl vinyl ether, butyl vinyl ether, octyl vinyl ether, and phenyl vinyl ether (6) vinyl esters such as vinyl acetate, vinyl chloroacetate, vinyl butyrate, and vinyl benzoate (7) styrenes such as α-methylstyrene, β-methylstyrene, and chloromethylstyrene (8) vinyl ketones such as methyl vinyl ketone, ethyl vinyl ketone, propyl vinyl ketone, and phenyl vinyl ketone (9) olefins such as ethylene, propylene, isobutylene, butadiene, and isoprene

(10) N-vinylpyrrolidone, N-vinylcarbazole, 4-vinylpyridine, acrylonitrile, and methacrylonitrile, and the like

(11) unsaturated imides such as maleimide, N-acryloylacrylamide, N-acetylmethacrylamide, N-propionylmethacrylamide, and N-(p-chlorobenzoyl) methacrylamide

(12) unsaturated carboxylic acids such as acrylic acid, methacrylic acid, maleic anhydride, and itaconic acid In the present invention, from the standpoint of film strength, preferably the polymeric compound soluble in alkaline water has a weight average molecular weight of 2,000 or more and a number average molecular weight of 500 or more, irrespective of whether the polymeric compound is a homopolymer or a copolymer. More preferably, the polymeric compound has a weight average molecular weight in the range of from 5,000 to 300,000, a number average molecular weight in the range of from 800 to 250,000, and an index of polydispersity (weight average molecular weight/number average molecular weight) in the range of from 1.1 to 10.

In the copolymer, from the standpoint of the latitude in development, the weight ratio of the monomer(s) having an acid group selected from the (b-1) to (b-3) acid groups to other monomer(s) is preferably in the range of from 50:50 to 5:95, and more preferably in the range of from 40:60 to 10:90.

In the present invention, the polymeric compounds soluble in alkaline water may be used singly or in a combination of two or more. The amount added of the polymeric compound soluble in alkaline water is of 30 to 99% by weight, preferably of 40 to 95% by weight, and most preferably of 50 to 90% by weight, based on the total weight of the solids of the photosensitive composition. If the amount added of the polymeric compound soluble in alkaline water is less than 30% by weight, the durability of the recording layer is poor, whereas, if the amount added of the polymeric compound soluble in alkaline water is more than 99% by weight, both sensitivity and durability are inferior.

other components

According to need, a variety of additives may be incorporated into the photosensitive composition of the present invention. For example, in order to inhibit more effectively the image portions from being dissolved in a developer, it is preferable to combine into the photosensitive composition a substance that is thermally decomposable and capable of substantially decreasing the solubility of the polymeric compound soluble in alkaline water if the substance is not decomposed, such as an aromatic sulfone, an aromatic sulfonate ester, or the like.

In addition to these additives, a cyclic acid anhydride, a phenol, and an organic acid can also be used in order to increase further the sensitivity. Examples of the cyclic acid anhydride include phthalic anhydride, tetrahydrophthalic anhydride, hexahydrophthalic anhydride, 3,6-endoxy-$\Delta^4$-tetrahydrophthalic anhydride, tetrachlorophthalic anhydride, maleic anhydride, chloromaleic anhydride, α-phenylmaleic anhydride, succinic anhydride, and pyromellitic anhydride, as described in U.S. Pat. No. 4,115,128. Examples of the phenol include bisphenol A, p-nitrophenol, p-ethoxyphenol, 2,4,4'-trihydroxybenzophenone, 2,3,4-trihydroxybenzophenone, 4-hydroxybenzophenone, 4,4',4''-trihydroxytriphenylmethane, and 4,4',3'',4''-tetrahydroxy-3,5,3',5'-tetramethyltriphenylmethane, and the like. Examples of the organic acid include sulfonic acids, sulfinic acids, alkylsulfuric acids, phosphonic acids, phosphates, and carboxylic acids, as described in, for example, JP-A Nos. 60-88,942 and 2-96,755. Specific examples of these organic acids include p-toluenesulfonic acid, dodecylbenzenesulfonic acid, p-toluenesulfinic acid, ethylsulfuric acid, phenylphosphonic acid, phenylphosphinic acid, phenyl phosphate, diphenyl phosphate, benzoic acid, isophthalic acid, adipic acid, p-toluic acid, 3,4-dimethoxybenzoic acid, phthalic acid, terephthalic acid, 4-cyclohexene-1,2-dicarboxylic acid, erucic acid, lauric acid, n-undecanoic acid, ascorbic acid, and the like.

The amount added of the cyclic acid anhydride, phenol, or organic acid is preferably in the range of from 0.05 to 20% by weight, more preferably in the range of from 0.1 to 15% by weight, and most preferably in the range of from 0.1 to 10% by weight, based on the total weight of the solids of the materials for the printing plate.

Further, in order to broaden the stability of processing with respect to conditions of development, the materials for the printing plate according to the present invention may contain a nonionic surfactant as described in JP-A Nos. 62-251,740 and 3-208,514, or an amphoteric surfactant as described in JP-A Nos. 59-121,044 and 4-13,149.

Specific examples of the nonionic surfactant include sorbitan tristearate, sorbitan monopalmitate, sorbitan trioleate, stearic acid monoglyceride, polyoxyethylene nonylphenyl ether, and the like.

Specific examples of the amphoteric surfactant include alkyldi(aminoethyl)glycine, hydrochloric acid salt of alkylpolyaminoethylglycine, 2-alkyl-N-carboxyethyl-N-hydroxyethylimidazolinium betaine, N-tetradecyl-N,N-betaine (for example, Amogen K (tradename) manufactured by Dai-ichi Kogyo Seiyaku Co., Ltd.), and the like.

The preferred amount added of the nonionic surfactant or the amphoteric surfactant is in the range of from 0.05 to 15% by weight, more preferably from 0.1 to 5% by weight, based on the total weight of the solids of the materials for the printing plate.

In the present invention, the material for the printing plate may contain a dye or a pigment as a printing-out agent which makes it possible to produce a visible image immediately after exposure-induced heating, or as an image coloring agent.

As a typical example of the printing-out agent, a combination of a compound that releases an acid by exposure-induced heating (i.e., a photoacid releasing agent) and an organic dye capable of forming a salt with the foregoing compound maybe listed. Specific examples of the printing-out agent include a combination of o-naphthoquinonediazide-4-sulfonyl halogenide and an organic dye that forms a salt with this compound as described in JP-A Nos. 50-36,209 and 53-8,128, as well as a combination of a trihalomethyl compound and an organic dye that forms a salt with this compound as described in JP-A Nos. 53-36,223, 54-74,728, 60-3,626, 61-143,748, 61-151,644, and 63-58,440. Examples of the trihalomethyl compound include an oxazole-based compound and a triazine-based compound, both of which are effective in providing good storability over time and a clear printed-out image.

A dye other than the above-mentioned salt-forming organic dyes can also be used as the image coloring agent. Suitable dyes include oil-soluble dyes and basic dyes in addition to the salt-forming organic dyes. Specific examples of these dyes include Oil Yellow No. 101, Oil Yellow No. 103, Oil Pink No. 312, Oil Green BG, Oil Blue BOS, Oil Blue No. 603, Oil Black BY, Oil Black BS, and Oil Black T-505 (tradenames, all manufactured by Orient Chemical Industries, Co., Ltd.), Victoria Pure Blue BO (C.I. 42595), Crystal Violet (C. I. 42555), Methyl Violet (C. I. 42535), Ethyl Violet (C. I. 42600), Rhodamine B (C. I. 145170B), Malachite Green (C. I. 42000), Methylene Blue (C. I. 52015), and the like. The dyes described in JP-A No. 62-293,247 are particularly preferable. The amount added of the dye may be in the range of from 0.01 to 10% by weight, preferably in the range of from 0.1 to 3% by weight, based on the total weight of the solids of the materials for the printing plate.

If necessary, in order to impart flexibility to a coating layer, a plasticizer may be added to the materials for the printing plate of the present invention. Examples of the plasticizer include butyl phthalate, polyethylane glycol, tributyl citrate, diethyl phthalate, dibutyl phthalate, dihexyl phthalate, dioctyl phthalate, tricresyl phosphate, tributyl phosphate, trioctyl phosphate, tetrahydrofurfuryl oleate, an oligomer or a polymer of acrylic acid or methacrylic acid, and the like.

In addition to the above-described substances, other substances, which may also be added according to need, include an epoxy compound, a vinyl ether, a phenolic compound having a hydroxymethyl group and a phenolic compound having an alkoxymethyl group, as described in JP-A No. 8-276,558, a cross-linking agent that inhibits the photosensitive composition from being dissolved in alkaline water and is described in Japanese Patent Application No. 9-32,837 previously filed by the present inventors, and the like.

The planographic printing plate precursor of the present invention can be prepared by coating an appropriate substrate with a photosensitive layer coating liquid containing the photosensitive composition, a coating liquid for a desired layer such as the protective layer, and the like, which are each prepared by dissolving the above-described components in a solvent. Some illustrative nonlimiting examples of the solvent include ethylene dichloride, cyclohexanone, methyl ethyl ketone, methanol, ethanol, propanol, ethylene glycol monomethyl ether, 1-methoxy-2-propanol, 2-methoxyethyl acetate, 1-methoxy-2-propyl acetate, dimethoxyethane, methyl lactate, ethyl lactate, N,N-dimethylacetamide, N,N-dimethylformamide, tetramethylurea, N-methylpyrrolidone, dimethyl sulfoxide, sulfolane, γ-butyrolactone, toluene, water, and the like. These solvents may be used singly or in a combination of two or more. The concentration of the components (total solids including additives) in the solvent is preferably in the range of from 1 to 50% by weight. The coated amount (solids) after coating and drying on the substrate varies according to usage, but the desirable amount is generally in the range of from 0.5 g to 5.0 g/m$^2$ for a photosensitive printing plate.

The coating liquid can be applied by various methods. Examples of the methods include bar coating, rotational coating, spraying, curtain coating, dipping, air-knife coating, blade coating, roll coating, and the like. As the coated amount decreases, the coat characteristics of the photosensitive layer becomes poor, although apparent sensitivity increases.

In order to improve coatability, the photosensitive layer coating liquid of the present invention may contain a surfactant. An example of this surfactant is a fluorine-based surfactant such as that described in JP-A No. 62-170,950. The preferred amount added of the surfactant is in the range of from 0.01 to 1% by weight, more preferably of from 0.05 to 0.5% by weight, based on the total weight of the solids of the materials for the printing plate.

The substrate which is used for the preparation of the planographic printing plate precursor in the present invention is a dimensionally stable plate. Specific examples of the substrate include paper, paper laminated with a plastic (for example, polyethylene, polypropylene, polystyrene, or the like), metal plates (such as aluminum, zinc, and copper), plastic films (such as diacetylcellulose, triacetylcellulose, cellulose propionate, cellulose butyrate, cellulose butyrate acetate, cellulose nitrate, polyethylene terephthalate, polyethylene, polystyrene, polypropylene, polycarbonate, and polyvinyl acetal), and paper or plastic films laminated or vapor-deposited with the above-mentioned metals.

Among these materials, a polyester film or an aluminum plate are preferable. The aluminum plate is particularly preferable, because it has good dimensional stability and is relatively cheap. Examples of the aluminum plate include a pure aluminum plate and a plate of an aluminum alloy containing aluminum as a main component together with traces of other elements. A further example of the substrate is a plastic film that is laminated or vapor-deposited with aluminum. Examples of the other elements that may be contained in the aluminum alloy include silicon, iron, manganese, copper, magnesium, chromium, zinc, bismuth, nickel, and titanium. The total included amount of the other elements in the aluminum alloy is 10% by weight or less. Although the aluminum particularly desirable for use in the present invention is pure aluminum, the aluminum to be used in the present invention may contain a small amount of other elements, because limitations in purification technologies make the production of perfectly pure aluminum difficult. Accordingly, the composition of the aluminum plate for use in the present invention is not particularly limited, and an aluminum plate of a conventionally known material may be used appropriately in the present invention. The thickness of the aluminum plate for use in the present invention is approximately of 0.1 to 0.6 mm, preferably of 0.15 to 0.4 mm, and most preferably of 0.2 to 0.3 mm.

Prior to surface-roughening the aluminum plate, if desired, a degreasing treatment is performed in order to remove rolling oil from the surface of the aluminum plate by means of, for example, a surfactant, an organic solvent, an aqueous alkaline solution, or the like.

Surface-roughening of the aluminum plate may be performed by a variety of methods. Examples of these methods include a method wherein the surface is mechanically roughened, a method wherein the surface is roughened by being electrochemically dissolved, and a method wherein the surface is chemically dissolved in a selective manner. The mechanical method may be a conventionally known method such as ball abrasion, brushing, blasting, and buffing. Exemplary of the electrochemical method is electrolysis of the aluminum plate in an electrolyte solution, such as a hydrochloric acid or a nitric acid, using an a.c. current or a d.c. current. A combination of a mechanical method and an electrochemical method is also possible as described in JP-A No. 54-63,902.

If necessary, the surface-roughened aluminum plate is then subjected to an alkali-etching treatment and a neutralizing treatment. After that, if desired, the aluminum plate is subjected to an anodizing treatment so as to increase water retention and wear resistance of the surface. A variety of electrolytes capable of producing a porous oxide layer can be used as an electrolyte for the anodizing treatment of the aluminum plate generally, sulfuric acid, phosphoric acid, oxalic acid, chromic acid, or a mixture of these acids can be used as the electrolyte. The concentration of the electrolyte may be determined appropriately, depending on the type of the electrolyte.

Conditions for anodizing vary depending on the type of electrolyte employed and cannot be stipulated unqualifiedly.

However, generally employed conditions are as follows: the concentration of the electrolyte solution is of from 1 to 80% by weight; the temperature of the solution is of from 5 to 70° C.; the current density is of from 5 to 60 A/dm$^2$; the voltage is of from 1 to 100V; and the duration of the electrolysis is of from 10 seconds to 5 minutes.

If the amount of the anodized layer is less than 1.0 g/m$^2$, the surface has poor printing durability and the non-image portions of the resulting planographic printing plate are liable to form scratch marks, which collect printing ink during printing to cause so-called scratch smudging.

If necessary, the substrate whose surface has already been anodized may be rendered hydrophilic by a surface treatment. Preferred examples of this hydrophilizing surface treatment include treating the surface with an aqueous solution of an alkali metal silicate (such as sodium silicate) as described in U.S. Pat. Nos. 2,714,066, 3,181,461, 3,280,734, and 3,902,734, wherein the substrate is simply immersed or electrolytically treated in an aqueous solution of sodium silicate. Further examples are a treatment of the surface with a potassium fluorozirconate as described in JP-B No. 36-22,063 and a treatment of the surface with a polyvinylsulfonic acid as described in U.S. Pat. Nos. 3,276,868, 4,153,461 and 4,689,272.

The planographic printing plate precursor of the present invention is prepared by forming a positive-type photosensitive layer containing the photosensitive composition of the present invention on the substrate. If necessary, an under coat may be formed between the foregoing layer and the substrate.

Various organic compounds may be used as components of the under coat. For example, an organic compound constituting the under coat may be selected from the group consisting of: carboxymethyl cellulose; dextrin; gum arabic; phosphonic acids having an amino group such as 2-aminoethylphosphonic acid and the like; organic phosphonic acids such as phenylphosphonic acid, naphthylphosphonic acid, alkylphosphonic acid, glycerophosphonic acid, methylenediphosphonic acid, ethylenediphosphonic acid, and the like, which may each have a substituent group; organic phosphoric acids such as phenylphosphoric acid, naphthylphosphoric acid, alkylphosphoric acid, glycerophosphoric acid, and the like, which may each have a substituent group; organic phosphinic acids such as phenylphosphinic, naphthylphosphinic acid, alkylphosphinic acid, glycerophosphinic acid, and the like, which may each have a substituent group; amino acids such as glycine, β-alanine, and the like; and hydrochloric acid salts of amines having a hydroxyl group such as triethanolamine and the like. These compounds may be used singly or may be used in a combination of two or more.

The organic under coat may be formed by any method described below. For example, the organic compound is dissolved in water, an organic solvent such as methanol, ethanol, or methyl ethyl ketone, or in a mixture thereof, to prepare a coating solution, and thereafter the coating solution is coated on an aluminum plate to provide a layer which is then dried. Alternatively, the organic compound is dissolved in water, an organic solvent such as methanol, ethanol, or methyl ethyl ketone, or a in a mixture thereof to prepare a coating solution, and thereafter an aluminum plate is immersed in the coating solution so that the organic compound is adsorbed on the surface of the aluminum plate to thereby form a layer which is then rinsed with water or the like and dried. When the former method is employed, a solution containing 0.005 to 10% by weight of the organic compound can be applied by a variety of methods. When the latter method is employed, the parameters of the conditions are as follows: the concentration of the solution is of from 0.01 to 20% by weight and preferably of from 0.05 to 5% by weight; the immersion temperature is of from of from 20 to 90° C. and preferably of from 25 to 50° C.; and the immersion time is of from 0.1 seconds to 20 minutes and preferably of from 2 seconds to 1 minute. The pH of the solution may be adjusted to a value within the range of from 1 to 12 by use of abase such as ammonia, triethylamine or potassium hydroxide, or an acid such as hydrochloric acid or phosphoric acid. Further a yellow dye may be added into the coating solution so as to improve the reproducibility of the surface characteristics of the planographic printing plate precursor.

The desirable coated amount after drying of the organic under coat is in the range of from 2 to 200 mg/m$^2$ and preferably in the range of from 5 to 100 mg/m$^2$. If the coated amount is less than from 2 mg/m$^2$, sufficient printing durability may not be obtained. On the other hand, if the coated amount exceeds 200 mg/m$^2$, the same undesirable result may occur.

The positive-type planographic printing plate precursor thus obtained is usually subjected to image-wise exposure and development.

Examples of a light source of active rays to be used for the image-wise exposure include mercury lamps, metal halide lamps, xenon lamps, chemical lamps, and carbon arc lamps. Examples of radiation rays include electron beams, X-rays, ion beams, and far-infrared rays. Further, g-rays, i-rays, deep-UV rays, and high-density energy beams (laser beams) can also be used. Examples of the laser beams include helium/neon lasers, argon lasers, krypton lasers, helium/cadmium lasers, and Kr/F excimer lasers, solid-state lasers, semiconductor lasers, and the like.

In the present invention, a light source emitting light whose wavelength ranges from a near-infrared region to a far-infrared region is preferable, and a solid-state laser and a semiconductor laser are particularly preferable.

A conventionally known aqueous alkaline solution can be used as a developer and also as a replenisher solution for the planographic printing plate precursor of the present invention. For example, the aqueous alkaline solution may comprise an inorganic alkali salt such as sodium silicate, potassium silicate, sodium tertiary phosphate, potassium tertiary phosphate, ammonium tertiary phosphate, sodium secondary phosphate, potassium secondary phosphate, ammonium secondary phosphate, sodium carbonate, potassium carbonate, ammonium carbonate, sodium hydrogencarbonate, potassium hydrogencarbonate, ammonium hydrogencarbonate, sodium borate, potassium borate, ammonium borate, sodium hydroxide, ammonium hydroxide, potassium hydroxide, or lithium hydroxide. In addition, an organic alkali can also be used for the preparation of the aqueous alkaline solution. Examples of the organic alkali include monomethylamine, dimethylamine, trimethylamine, monoethylamine, diethylamine, triethylamine, monoisopropylamine, diisopropylamine, triisopropylamine, n-butylamine, monoethanolamine, diethanolamine, triethanolamine, monoisopropanolamine, diisopropanolamine, ethyleneimine, ethylenediamine, and pyridine.

These alkalis may be used singly or in a combination of two or more.

A particularly preferred developer is an aqueous solution of a silicate, such as sodium silicate, potassium silicate, or the like, among the above-mentioned alkalis. This is because adjustment of developing performance of the developer is possible by varying the ratio of silicon oxide $SiO_2$ to alkali metal oxide $M_2O$, each of which is an element of the silicate, and by varying the concentrations thereof in the solution. For example, using alkali metal silicates described in JP-A No. 54-62,004 and JP-B No. 57-7,427 is effective in the present invention.

As is generally known, when an automatic processor is used, a conventionally employed replenishing system can process a large amount of PS plates without changing the developer in a tank for a long period of time by feeding the tank with an aqueous solution (a replenisher solution) having an alkali strength higher than that of the developer in the tank. This replenishing system is also suitable for the present invention. If necessary, the developer and the replenisher solution may contain a surfactant or an organic solvent for such purposes as acceleration or retardation of development, dispersion of sludge resulting from development, and enhancement of the affinity of the image portions of the printing plate for ink. Examples of preferred surfactants include anionic surfactants, cationic surfactants, nonionic surfactants, and amphoteric surfactants.

Further, if necessary, the developer and the replenisher solution may contain: a reducing agent such as hydroquinone, resorcinol, and a salt of an inorganic acid, for example, sodium or potassium sulfite and sodium or potassium hydrogensulfite; an organic carboxylic acid; a defoaming agent; and an agent to convert hard water into soft water.

The printing plate, after being processed with the developer and the replenisher solution described above, is subjected to a post-treatment such as a treatment with rinsing water, a treatment with a rinsing solution containing a surfactant or the like, or a treatment with a desensitizing solution containing gum arabic or a starch derivative. A combination of these treatments may be employed as the post-treatment when the planographic printing original plate of the present invention is used as a printing plate.

In recent years, for the purpose of rationalization and standardization of plate production, automatic processors have been widely used in the processing of materials for printing plates in the plate production and printing industries. Generally, the automatic processor is comprised of a developing portion and a post-treatment portion, each comprising a device for transferring a printing plate and a tank filled with a processing solution and equipped with a spraying device, wherein the printing plate after exposure travels horizontally so that it is developed by the processing solutions which are sprayed from nozzles after being pumped up from the tanks, respectively. Further, according to a new process, a printing plate is immersed in and transferred through a processing tank filled with a processing solution by means of immersed guide rolls or the like. In these kinds of automated processing, processing can be performed by supplying replenisher solutions to each of the processing solutions, in amounts in accordance with the processed volume, the period of time of operation, or the like.

Further, a so-called single-use treatment system, in which a printing plate is processed with a substantially unused processing solution, can also be employed in the present invention.

Details of the photosensitive planographic printing plate precursor using the photosensitive composition of the present invention are given below. If unnecessary image portions (for example, film edge marks of an original film) are found on the planographic printing plate, which has been obtained by a procedure comprising image-wise exposure, developing, water-washing and/or rinsing, and/or gum coating, the unnecessary image portions are erased. Erasure is preferably performed by a process comprising coating the unnecessary image portions with an erasing solution, leaving the coating on the unnecessary image portions for a predetermined period of time, and then removing the coating by washing with water, as described in JP-B No. 2-13,293. In addition to this process, also possible is a process comprising irradiating the unnecessary image portions with active rays from an optical fiber and then carrying out development, as described in JP-A No. 59-174,842.

The planographic printing plate thus obtained is coated with a desensitizing gum, if necessary, and can be used in a printing process. However, if it is desired to impart a higher level of printing durability to the printing plate, the printing plate is subjected to a burning treatment.

If the printing plate undergoes the burning treatment, it is desirable to treat the printing plate with a surface-adjusting solution, which is described in, for example, JP-B Nos. 61-2,518 and 55-28,062, and JP-A Nos. 62-31,859 and 61-159,655, prior to the burning treatment.

According to these treatment methods, the planographic printing plate is coated with a surface-adjusting solution by using a sponge or absorbent cotton soaked with the solution; the planographic printing plate is immersed in a vat filled with the surface-adjusting solution; or the planographic printing plate is coated with the surface-adjusting solution by using an automated coater. If the coated amount is homogenized by means of using a squeegee or a squeegee roller after coating, a better result is obtained.

The suitable coated amount of the surface-adjusting solution is generally in the range of from 0.03 to 0.8 mg/m$^2$(dry weight).

The planographic printing plate after being coated with the surface-adjusting solution is dried and thereafter heated to a high temperature, if necessary, by means of a burning processor (for example, Burning Processor BP-1300, tradename, manufactured by Fuji Film Co., Ltd.). The temperature and time vary depending on the kinds of the components forming the image, but ranges of from 180 to 300° C. and of from 1 to 20 minutes, respectively, are preferable.

After the burning treatment, if necessary, the planographic printing plate may be subjected to conventionally employed treatments such as water-rinsing and gum-coating. However, if the surface-adjusting solution contains a water-soluble polymeric compound or the like, so-called desensitizing treatments such as gum-coating may be omitted.

The planographic printing plate thus prepared is mounted on an offset printing machine or the like and is then used for printing a large number of sheets.

EXAMPLES

The present invention is further explained below by way of a description of synthesis of anionic, infrared-ray absorbing agents and examples. However, it must be noted that the scope of the present invention is not limited to these synthesis examples and examples.

Synthesis of anionic infrared-ray absorbing agent IR(21)

Synthesis of the anionic infrared-ray absorbing agent IR(21) was carried out using the following sheme.

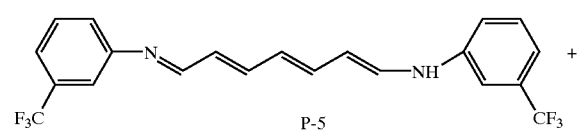

P-5

-continued

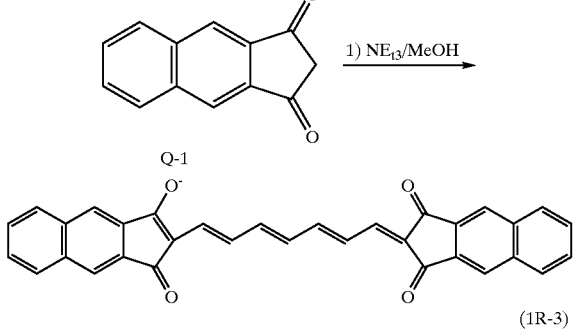

Q-1 (0.04 mol), P-5 (0.02 mol) and ethanol (40 ml) were placed in a beaker, triethylamine (0.08 mol) was added to the contents in the beaker, and the result was stirred for 30 minutes at room temperature and further stirred over 10 minutes at 50° C. In this way, a black suspension liquid was obtained. The suspension was added to 40 ml of water and a formed solid precipitate was collected by filtration. The $^1$H-NMR chart data (FIG. 3) confirmed that the precipitate was the above exemplified IR(53). The maximum absorption wavelength thereof was λmax=798 nm (MeOH).

Salt exchange from IR(53) to IR(21)

An IR(53) solution in DMSO was added dropwise to an aqueous solution of tetrabutylammonium bromide and then a formed solid precipitate was collected by filtration. The precipitate was further purified by reslurrying using acetone/hexane, to obtain IR(21). As is described above, counter cations can be easily exchanged; therefore, other compounds having other counter cations can also be easily synthesized. The structure of IR(21) was confirmed by $^1$H-NMR; the chart data thereof is shown in FIG. 1. The melting point thereof was 155–156° C., and the maximum absorption wavelength thereof was λmax=798 nm (MeOH).

Synthesis of anionic infrared-ray absorbing agent IR(13)

Synthesis of anionic infrared-ray absorbing agent IR(13) was carried out using the following scheme.

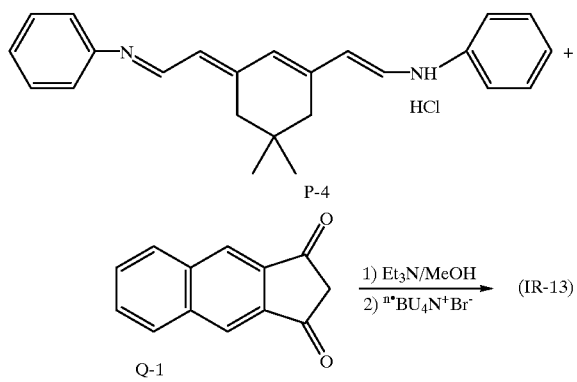

Figure 2:
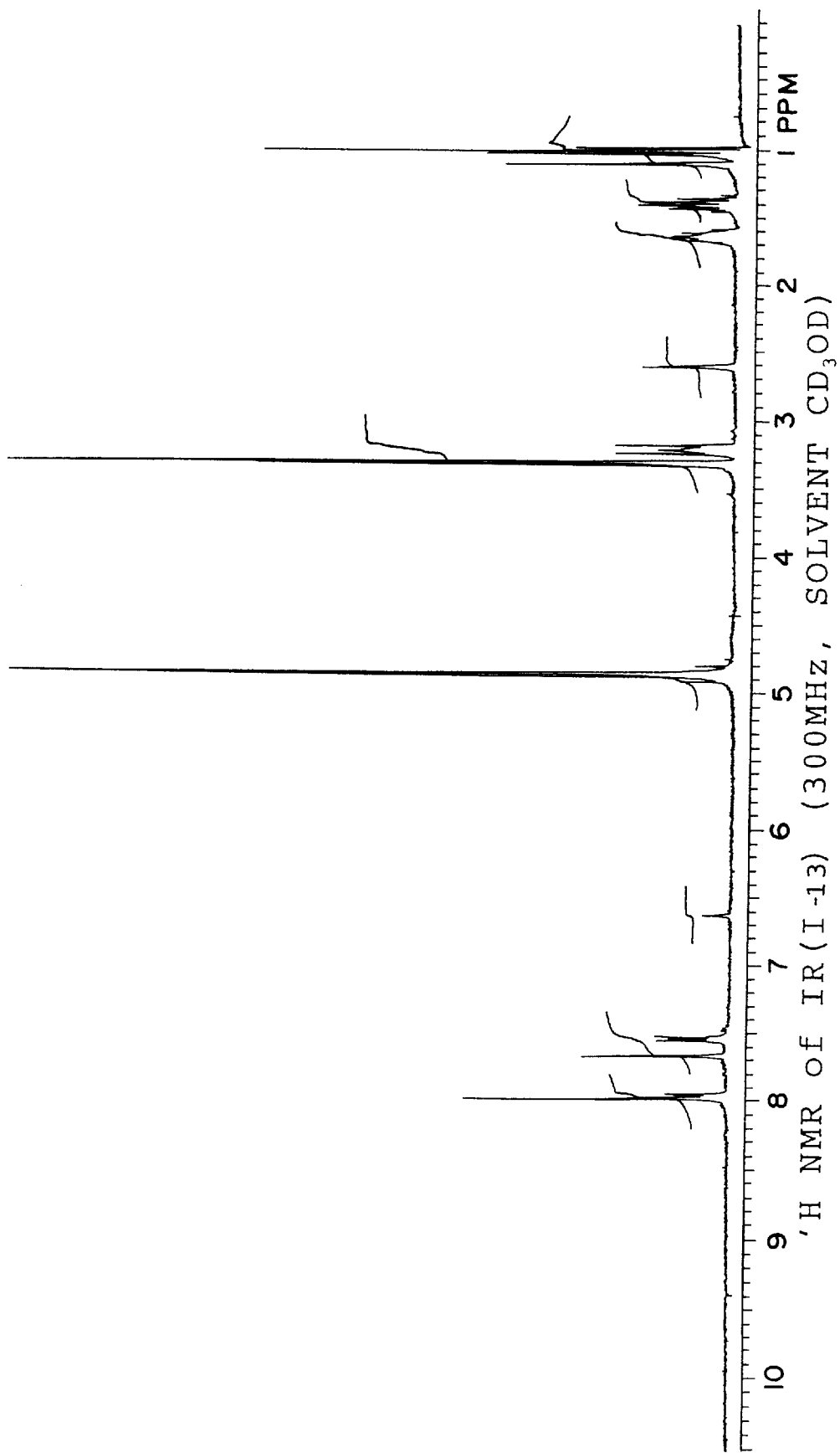
FIG. 2 is a $^1$H NMR chart of IR-13.

Q-1 (0.04 mol), P-4 (0.02 mol) and ethanol (40 ml) were placed in a beaker, and triethylamine (0.08 mol) was added dropwise to the contents in the beaker over 1 minute. Next the contents were stirred for 1 hour at room temperature. In this way, a deep blue suspension liquid was obtained. Then, tetrabutylammonium bromide (10 g) was added to the liquid, and the result was stirred for an additional 5 minutes to obtain a deep blue precipitate. The formed solid precipitate was collected by filtration, and further purified by selicagel column chromatography (developed with ethyl acetate/methanol) to obtain IR(13). The structure of IR(13) was confirmed by $^1$H-NMR; the chart data thereof is shown in FIG. 2. The melting point thereof was 180–184° C., and the maximum absorption wavelength thereof was λmax=811 nm (MeOH).

As is shown above, the novel anionic, infrared-ray absorbing agents IR(21) and IR(13) have absorption wavelength ranges in a long wavelength region and large molecular extinction coefficients, due to introducing substituents into indandione groups Further, other anionic, infrared-ray absorbing agents useful for the photosensitive composition of the present invention can be synthesized by condensing compounds having active methylene groups and methylene chain donors in the presence of a base. This method of synthesis (as shown in the following scheme) can be executed with known methods, for example, a synthesis method of an oxonol dye disclosed in "Dye and Agents" p274–289 (1991).

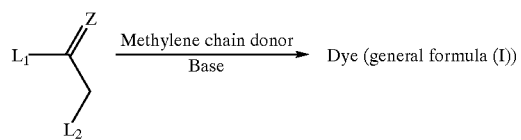

As an example of the methylene chain donor, the following structure can be given.

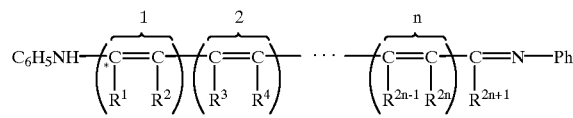

The synthesis of the anionic, infrared-ray absorbing agents that are useful in the present invention can be effected by condensing a compound having an active methylene with a methylene chain donor in the presence of a base, as illustrated in the following scheme. This synthesis can be carried out in accordance with a generally known method, for example, a method of synthesizing an oxonol dye described in "Dyes and Chemicals" (1991), pp. 274–289.

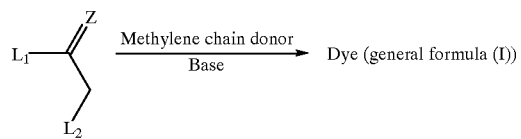

Examples of the methylene chain donor include the following structure.

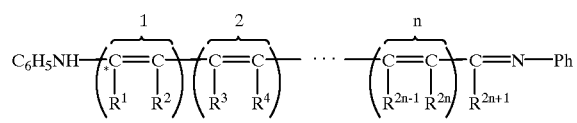

(Synthesis 1: synthesis of compound A-1)

Q-1 (0.1 mol), P-1 (0.1 mol), and methanol (500 ml) were placed in a beaker, and triethylamine (0.2 mol) was added dropwise to the contents in the beaker over 10 minutes. The contents were then stirred for 2 hours at room temperature. In this way, a deep blue suspension liquid was obtained.

Then, tetrabutylammonium bromide (0.1 mol) was added to the liquid, and the liquid was stirred for an additional 30 minutes. A formed blue solid precipitate was collected by filtration and washed with water. In this way, A-1 was obtained with a 55% yield. The structure of A-1 was confirmed by mass spectrometry, H-NMR, and infrared spectrometry.

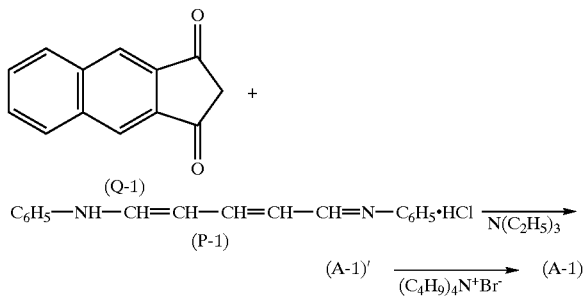

(Synthesis 2: synthesis of compound A-2)

The compound A-1 (0.1 mol) and methanol (500 ml) were placed in a beaker, and an aqueous solution of diazonium salt P-2 (0.5 mol) was added to the contents in the beaker. The contents were then stirred for 30 minutes at room temperature. A formed blue solid precipitate was collected by filtration. The precipitate thus collected and methanol (500 ml) were placed in a beaker, and an aqueous solution of diazonium salt P-2 (0.5 mol) was added to the contents in the beaker. The contents were then stirred for 30 minutes at room temperature. A formed solid precipitate was collected by filtration and washed well with water. In this way, A-2 was obtained with a 90% yield. The structure of A-2 was confirmed by mass spectrometry, H-NMR, and infrared spectrometry.

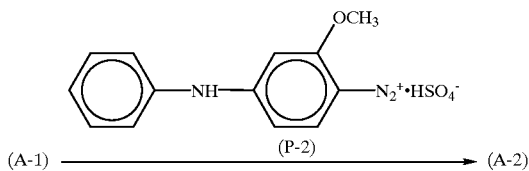

(Synthesis 3: synthesis of compound A-3)

The compound A-1 (0.1 mol) and methanol (500 ml) were placed in a beaker, and an aqueous solution of iodonium salt P-3 (0.5 mol) was added to the contents in the beaker. The contents were then stirred for 30 minutes at room temperature. A formed deep blue solid precipitate was collected by filtration. The precipitate thus collected and methanol (500 ml) were placed in a beaker, and an aqueous solution of iodonium salt P-3 (0.5 mol) was added to the contents in the beaker. The contents were then stirred for 30 minutes at room temperature. A formed solid precipitate was collected by filtration and washed well with water. In this way, A-3 was obtained with an 88% yield. The structure of A-3 was confirmed by mass spectrometry, $^1$H-NMR, and infrared spectrometry.

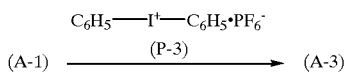

In a similar way, A-4-A-16 were synthesized.
(Synthesis 4: synthesis of compound IR-8)

Q-2 (10 mmol), P-4 (5 mmol), and methanol (20 ml) were placed in a beaker, and triethylamine (20 mmol) was added dropwise to the contents in the beaker over 10 minutes. The contents were stirred for 2 hours at room temperature. Then, tetrabutylammonium bromide (10 mmol) was added to the liquid, and the liquid was stirred for an additional 20 minutes. A formed solid precipitate was collected by filtration. The precipitate thus collected was purified by chromatography on silica and then slurried in a solution of ethyl acetate and hexane. In this way, IR-8 was obtained with a 25% yield. The structure of IR-8 was confirmed by mass spectrometry, $^1$H-NMR, and infrared spectrometry.

Synthesis of IR-8

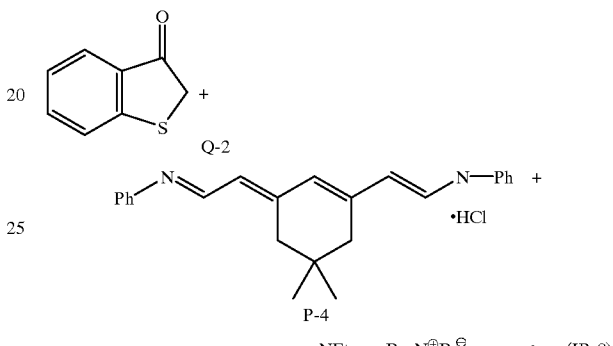

(Synthesis 5: synthesis of compound IR-1)

The compound IR-8 (1 mmol) was added to a solution of triphenylsulfonium chloride (10 mmol) in a solution of methanol and water. A formed crystalline precipitate formed and was collected by filtration. The same procedure was repeated three times so as to exchange salt. In this way, IR-10 was obtained with a 50% yield. The structure of IR-10 was confirmed by mass spectrometry, $^1$H-NMR, and infrared spectrometry.

In a similar way, IR-9, IR-37, and IR-44 were synthesized.
Synthesis of IR-10

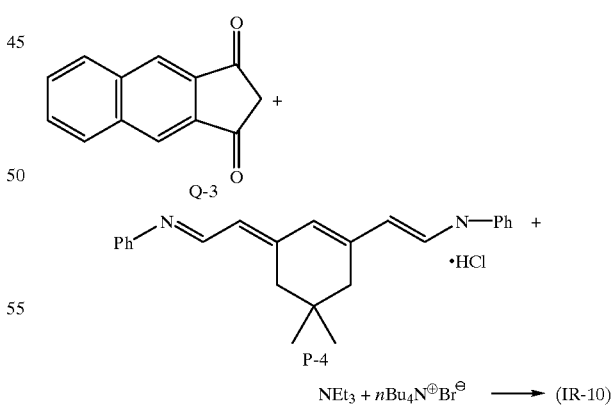

(Synthesis 6: synthesis of compound IR-11)

The procedure of the synthesis 4 was repeated, except that P-4 was replaced with P-5 and tetrabutylammonium bromide was replaced with the compound represented by the following general formula. In this way, IR-11 was obtained with a 20% yield. The structure of IR-11 was confirmed by mass spectrometry, $^1$H-NMR, and infrared spectrometry.

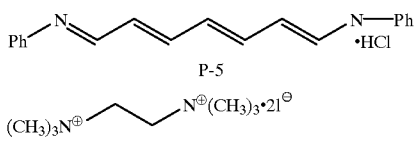

P-5

Examples 1~33

Preparation of substrates

A 0.30 mm thick aluminum plate (type of material: 1050) was cleaned with trichloroethylene and roughened with a nylon brush and an aqueous suspension of 400 mesh pumice powder. After being rinsed well with water, the aluminum plate was etched by a process comprising the steps of immersing the aluminum plate in a aqueous solution of 25% sodium hydroxide at 45° C. for 9 seconds, rinsing the aluminum plate with water, immersing the aluminum plate in a aqueous solution of 20% nitric acid for 20 seconds, and rinsing the aluminum plate with water. In the process, the etched amount of the grained aluminum plate was about 3 g/m$^2$. Next, the aluminum plate was subjected to an anodizing process comprising immersing the aluminum plate in a 7% sulfuric acid solution as an electrolyte solution through which a d. c. current with a density of 15 A dm$^2$ was passed. This process produced an anodized film of 3 g/m$^2$. Then, the surface-treated aluminum plate was rinsed with water and thereafter dried. The aluminum plate was then coated with an under coat fluid described below, and the coated layer was dried at 90° C. for 1 minute. After drying, the coated amount of the coated layer was 10 mg/m$^2$.

| Composition of under coat fluid | |
|---|---|
| β-alanine | 0.5 g |
| methanol | 95 g |
| water | 5 g |

On the other hand, photosensitive liquids were prepared according to the following base formulation of a photosensitive liquid 1 by replacing the infrared-ray absorbing agent with those shown in Table 1, respectively. The photosensitive liquids thus prepared were each coated on the substrates obtained with the above-described procedure, in a coated amount of 1.8 g/m$^2$. In this way, planographic printing plate precursors of Examples 1~33 were obtained.

| Composition of photosensitive liquid 1 | in grams |
|---|---|
| m-cresol/p-cresol novolac resin (m to p ratio: 6:4; weight average molecular weight: 3,500; content of unreacted cresol: 0.5% by weight) | 1.0 |
| *polymeric compound soluble in alkaline water | 0.2 |
| an infrared-ray absorbing agent shown in Table 1 | |
| *compound represeneted by the general formula (I) | 0.02 |
| a dye prepared by using 1-naphthalenesulfonic acid anion as the counter anion of Victoria Pure Blue BOH | |
| Flourine-based surfactant (Megafac F-177 manufactured by Dainippon Ink and Chemicals Inc.) | 0.05 |
| γ-butyrolactone | 3 |
| methyl ethyl ketone | 8 |
| 1-methoxy-2-propanol | 7 |

Examples 34~66

Synthesis of a copolymer as a polymeric compound soluble in an aqueous alkaline solution Synthesis example (copolymer 1)

31.0 g (0.36 mol) of methacrylic acid, 39.1 g (0.36 mol) of ethyl chloroformate, and 200 ml of acetonitrile were placed in a 500 ml, three-neck flask fitted with a stirrer, a condenser tube, and a dropping funnel. The resulting reaction mixture was stirred while being cooled on an ice water bath. Then, 36.4 g (0.36 mol) of triethylamine was added dropwise from the dropping funnel to the reaction mixture over a period of about 1 hour. Upon completing the addition, the ice water bath was removed and the reaction mixture was stirred at room temperature for 30 minutes.

Next, 51.7 g (0.30 mol) of p-aminobenzenesulfonamide was added to the reaction mixture, and the reaction mixture was stirred at 70° C. on an oil bath for about 1 hour. After the reaction, the reaction mixture was poured into 1 liter of water while the water was stirred, and the resulting mixture was stirred for 30 minutes. The mixture was filtered to collect a precipitate, which was slurried in 500 ml of water. The slurry was filtered to obtain a solid, which were then dried. The white solid substance thus obtained was N-(p-aminosulfonylphenyl)methacrylamide (the yield was 46.9 g).

Then, 5.04 g (0.0210 mol) of N-(p-aminosulfonylphenyl)methacrylamide, 2.05 g (0.0180 mol) of ethyl methacrylate, 1.11 g (0.021 mol) of acrylonitrile, and 20 g of N,N-dimethylacetamide were placed in a 100 ml, three-neck flask fitted with a stirrer, a condenser tube, and a dropping funnel. The resulting reaction mixture was stirred at 65° C. on a warm water bath. To the reaction mixture was added 0.15 g of V-65 (manufactured by Wako Pure Chemical Industries, Ltd.), and the reaction mixture was stirred while being kept at 65° C. for 2 hours under a nitrogen stream. Further, a mixture of 5.04 g of N-(p-aminosulfonylphenyl)methacrylamide, 2.05 g of ethyl methacrylate, 1.11 g of acrylonitrile, 20 g of N,N-dimethylacetamide, and 0.15 g of V-65 was added dropwise from the dropping funnel to the reaction mixture over a period of 2 hours. Upon completing the addition, the reaction mixture was stirred at 65° C. for additional 2 hours. After the reaction, 40 g of methanol was added to the reaction mixture, and the mixture was poured into 2 liters of water while the water was stirred, and the resulting mixture was stirred for 30 minutes. The mixture was filtered to collect a precipitate, which was then dried. In this way, 15 g of a white solid substance was obtained, and this substance was designated as copolymer 1. The weight average molecular weight (using polystyrene as a standard) of the copolymer 1 was 53,000 according to gel permeation chromatography.

On the other hand, photosensitive liquids were prepared according to the following base formulation of a photosensitive liquid 2 by replacing the infrared-ray absorbing agent with those shown in Table 2, respectively. The photosensitive liquids thus prepared were each coated on the substrates obtained in Examples 1~33, in a coated amount of 1.8 g/m$^2$. In this way, planographic printing plate precursors of Examples 33~66 were obtained.

| Composition of photosensitive liquid 2 | in grams |
|---|---|
| copolymer 1 | 1.0 |
| an infrared-ray absorbing agent shown in Table 2 | 0.1 |
| *compound represented by the general formula (I) | |

| Composition of photosensitive liquid 2 | in grams |
|---|---|
| p-toluenesulfonic acid | 0.002 |
| a dye prepared by using 1-naphthalenesulfonic acid anion as the counter anion of Victoria Pure Blue BOH | 0.02 |
| Fluorine-based surfactant (Megafac F-177 manufactured by Dainippon Ink and Chemicals Inc.) | 0.05 |
| γ-butyrolactone | 8 |
| methyl ethyl ketone | 8 |
| 1-methoxy-2-propanol | 4 |

Comparative Examples 1~3

Planographic printing plate precursors of Comparative Examples 1~3 were obtained by repeating the procedure of Example 1, except that the infrared-ray absorbing agent represented by the general formula (I) in the photosensitive liquid 1 was replaced with infrared-ray absorbing agents B-1, B-2, and B-3 represented by the following structural formulae, respectively.

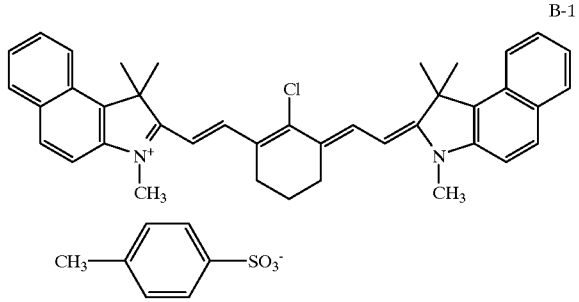

B-1

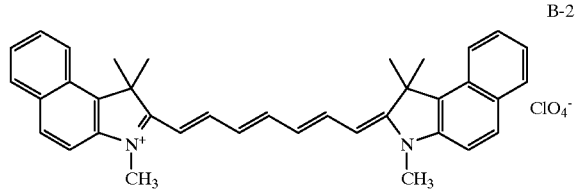

B-2

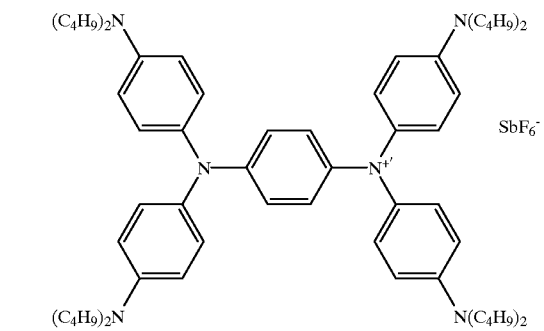

B-3

Comparative Examples 4~6

Planographic printing plate precursors of Comparative Examples 4–6 were obtained by repeating the procedure of Example 34, except that the infrared-ray absorbing agent represented by the general formula (I) in the photosensitive liquid 2 was replaced with infrared-ray absorbing agents B-1, B-2, and B-3 represented by the above-described structural formulae, respectively.

Examples 67~81

Synthesis example (copolymer 2)

31.0 g (0.36 mol) of methacrylic acid, 39.1 g (0.36 mol) of ethyl chloroformate, and 200 ml of acetonitrile were placed in a 500 ml, three-neck flask fitted with a stirrer, a condenser tube, and a dropping funnel. The resulting reaction mixture was stirred while being cooled on an ice water bath. Then, 36.4 g (0.36 mol) of triethylamine was added dropwise from the dropping funnel to the reaction mixture over a period of about 1 hour. Upon completing the addition, the ice water bath was removed and the reaction mixture was stirred at room temperature for 30 minutes.

Next, 51.7 g (0.30 mol) of p-aminobenzenesulfonamide was added to the reaction mixture, and the reaction mixture was stirred at 70° C. on an oil bath for 1 hour. After the reaction, the reaction mixture was poured into 1 liter of water while the water was stirred, and the resulting mixture was stirred for 30 minutes. The mixture was filtered to collect a precipitate, which was slurried in 500 ml of water. The slurry was filtered to obtain a solid, which were then dried. The white solid substance thus obtained was N-(p-aminosulfonylphenyl)methacrylamide (the yield was 46.9 g).

Then, 4.61 g (0.0192 mol) of N-(p-aminosulfonylphenyl) methacrylamide, 2.94 g (0.0258 mol) of ethyl methacrylate, 0.80 g (0.015 mol) of acrylonitrile, and 20 g of N,N-dimethylacetamide were placed in a 20 ml, three-neck flask fitted with a stirrer, a condenser tube, and a dropping funnel. The resulting reaction mixture was stirred at 65° C. on a warm water bath. To the reaction mixture was added 0.15 g of V-65 (manufactured by Wako Pure Chemical Industries, Ltd.), and the reaction mixture was stirred while being kept at 65° C. for 2 hours under a nitrogen stream. Further, a mixture of 4.61 g of N-(p-aminosulfonylphenyl) methacrylamide, 2.94 g of ethyl methacrylate, 0.80 g of acrylonitrile, and a mixture of 20 g of N,N-dimethylacetamide and 0.15 g of V-65 was added dropwise from the dropping funnel to the reaction mixture over a period of 2 hours. Upon completing the addition, the reaction mixture was stirred at 65° C. for an additional 2 hours. After the reaction, 40 g of methanol was added to the reaction mixture, and the mixture was poured into 2 liters of water while the water was stirred, and the resulting mixture was stirred for 30 minutes. The mixture was filtered to collect a precipitate, which was then dried. In this way, 15 g of a white solid substance was obtained, and this substance was designated as copolymer 2. The weight average molecular weight (using polystyrene as a standard) of the copolymer 2 was 53,000 according to gel permeation chromatography.

On the other hand, photosensitive liquids were prepared according to the following base formulation of a photosensitive liquid 3 by replacing the infrared-ray absorbing agent with those shown in Table 3, respectively. The photosensitive liquids thus prepared were each coated on the substrates obtained in Examples 1~33 in a coated amount of 1.8 g/m². In this way, planographic printing plate precursors of Examples 67~81 were obtained.

| Composition of photosensitive liquid 3 | in grams |
|---|---|
| copolymer 2 | 0.75 |
| m-cresol/p-cresol novolac resin (m to p ratio: 6:4; weight average molecular weight: 3,500; | 0.25 |

| Composition of photosensitive liquid 3 | in grams |
|---|---|
| content of unreacted cresol: 0.5% by weight) | |
| tetrahydrophthalic anhydride | 0.03 |
| an infrared-ray absorbing agent shown in Table 3 | 0.017 |
| *compound represented by the general formula (I) | 0.015 |
| a dye prepared by using 1-naphthalenesulfonic acid anion as the counter anion of Victoria Pure Blue BOH | |
| Fluorine-based surfactant (Megafac F-177 manufactured by Dainippon Ink and Chemicals Inc.) | 0.05 |
| γ-butyrolactone | 10 |
| methyl ethyl ketone | 10 |
| 1-methoxy-2-propanol | 1 |

Comparative Examples 7~8

Planographic printing plate precursors of Comparative Examples 7–8 were obtained by repeating the procedure of Example 67, except that the infrared-ray absorbing agent represented by the general formula (I) in the photosensitive liquid 3 was replaced with infrared-ray absorbing agents B-1 and B-2 represented by the previously described structural formulae, respectively.

Evaluation of the planographic printing plate precursors

The planographic printing plate precursors of Examples 1~69 and the planographic printing plate precursors of Comparative Examples 1~8 obtained in the above manner were subjected to the following tests to evaluate performance. Test results are shown in Tables 1~3.

Image-forming performance: evaluation of sensitivity and latitude in development The obtained planographic printing plate precursors were exposed with a semiconductor laser having a wavelength of 840 nm. The exposed plates were developed by using an automatic processor (PS Processor 900 VR manufactured by Fuji Film Co., Ltd.) fed with a developer DP-4 and a rinsing solution FR-3 (1:7), all manufactured by Fuji Film Co., Ltd. In this test, two dilution levels were employed when diluting DP-4 with water, namely, a 1:6, dilution level and a 1:12 dilution level. For each of the two dilution levels of the developer, the line width in the obtained non-image portions was measured. Next, the amount of laser energy radiation corresponding to the line width was calculated, and this amount was designated as the sensitivity. The difference between the sensitivity for the dilution of 1:6 which is standard and the dilution of 1:12 was recorded. A planographic printing plate precursor that exhibits a smaller difference was judged to have better latitude in development. A difference of 20 mJ/cm² or less indicated a level that was practicable.

Evaluation of stability

The obtained planographic printing plate precursors were stored at 60° C. for 3 days, and then exposed to a laser and developed as in the above-described test. The sensitivity was measured in the same way as described above. The difference in sensitivity between before and after storage was calculated. A planographic printing plate precursor that exhibits a difference of 20 mJ/cm² or less was judged to have good storage stability and to be on a practicable level.

TABLE 1

| | Sensitivity | Latitude in development | Storage stability | Infrared-ray absorbing agent |
|---|---|---|---|---|
| Example 1 | 110 | 5 | Good | A-2 |
| Example 2 | 110 | 10 | Good | A-3 |
| Example 3 | 115 | 10 | Good | A-4 |
| Example 4 | 115 | 5 | Good | A-5 |
| Example 5 | 115 | 10 | Good | A-6 |
| Example 6 | 110 | 5 | Good | A-7 |
| Example 7 | 120 | 5 | Good | A-8 |
| Example 8 | 115 | 10 | Good | A-9 |
| Example 9 | 115 | 5 | Good | A-10 |
| Example 10 | 115 | 5 | Good | A-11 |
| Example 11 | 110 | 5 | Good | A-12 |
| Example 12 | 110 | 10 | Good | A-13 |
| Example 13 | 115 | 5 | Good | A-14 |
| Example 14 | 110 | 5 | Good | A-15 |
| Example 15 | 110 | 5 | Good | A-16 |
| Example 16 | 110 | 10 | Good | A-17 |
| Example 17 | 115 | 5 | Good | A-18 |
| Example 18 | 115 | 5 | Good | A-19 |
| Example 19 | 115 | 5 | Good | IR-8 |
| Example 20 | 120 | 5 | Good | IR-9 |
| Example 21 | 110 | 10 | Good | IR-10 |
| Example 22 | 120 | 10 | Good | IR-15 |
| Example 23 | 115 | 5 | Good | IR-51 |
| Example 24 | 115 | 10 | Good | IR-17 |
| Example 25 | 120 | 10 | Good | IR-23 |
| Example 26 | 120 | 10 | Good | IR-25 |
| Example 27 | 120 | 10 | Good | IR-34 |
| Example 28 | 115 | 15 | Good | IR-37 |
| Example 29 | 120 | 10 | Good | IR-44 |
| Example 30 | 115 | 5 | Good | IR-13 |
| Example 31 | 115 | 5 | Good | IR-21 |
| Example 32 | 110 | 5 | Good | IR-41 |
| Example 33 | 115 | 10 | Good | IR-43 |
| Comparative example 1 | 135 | 25 | Good | B-1 |
| Comparative example 2 | 135 | 25 | Good | B-2 |
| Comparative example 3 | 140 | 25 | Good | B-3 |

TABLE 2

| | Sensitivity | Latitude in development | Storage stability | Infrared-ray absorbing agent |
|---|---|---|---|---|
| Example 34 | 110 | 5 | Good | A-2 |
| Example 35 | 115 | 5 | Good | A-3 |
| Example 36 | 110 | 10 | Good | A-4 |
| Example 37 | 115 | 5 | Good | A-5 |
| Example 38 | 120 | 10 | Good | A-6 |
| Example 39 | 115 | 5 | Good | A-7 |
| Example 40 | 110 | 5 | Good | A-8 |
| Example 41 | 110 | 5 | Good | A-9 |
| Example 42 | 115 | 10 | Good | A-10 |
| Example 43 | 120 | 5 | Good | A-11 |
| Example 44 | 115 | 10 | Good | A-12 |
| Example 45 | 115 | 10 | Good | A-13 |
| Example 46 | 115 | 5 | Good | A-14 |
| Example 47 | 120 | 5 | Good | A-15 |
| Example 48 | 115 | 10 | Good | A-16 |
| Example 49 | 110 | 5 | Good | A-17 |
| Example 50 | 110 | 10 | Good | A-18 |
| Example 51 | 115 | 10 | Good | A-19 |
| Example 52 | 110 | 5 | Good | IR-8 |
| Example 53 | 115 | 10 | Good | IR-9 |
| Example 54 | 110 | 10 | Good | IR-10 |
| Example 55 | 115 | 5 | Good | IR-15 |
| Example 56 | 115 | 5 | Good | IR-51 |
| Example 57 | 110 | 10 | Good | IR-17 |
| Example 58 | 120 | 5 | Good | IR-23 |
| Example 59 | 110 | 10 | Good | IR-25 |
| Example 60 | 110 | 5 | Good | IR-34 |
| Example 61 | 105 | 10 | Good | IR-37 |

TABLE 2-continued

| | Sensitivity | Latitude in development | Storage stability | Infrared-ray absorbing agent |
|---|---|---|---|---|
| Example 62 | 105 | 10 | Good | IR-44 |
| Example 63 | 110 | 5 | Good | IR-13 |
| Example 64 | 110 | 5 | Good | IR-21 |
| Example 65 | 115 | 5 | Good | IR-41 |
| Example 66 | 115 | 5 | Good | IR-43 |
| Comparative example 4 | 135 | 25 | Good | B-1 |
| Comparative example 5 | 140 | 25 | Good | B-2 |
| Comparative example 6 | 135 | 25 | Good | B-3 |

TABLE 3

| | Sensitivity | Latitude in development | Storage stability | Infrared-ray absorbing agent |
|---|---|---|---|---|
| Example 67 | 105 | 5 | Good | IR-8 |
| Example 68 | 110 | 10 | Good | IR-9 |
| Example 69 | 105 | 10 | Good | IR-10 |
| Example 70 | 110 | 5 | Good | IR-15 |
| Example 71 | 115 | 10 | Good | IR-51 |
| Example 72 | 105 | 5 | Good | IR-17 |
| Example 73 | 105 | 5 | Good | IR-23 |
| Example 74 | 110 | 5 | Good | IR-25 |
| Example 75 | 110 | 10 | Good | IR-34 |
| Example 76 | 105 | 5 | Good | IR-37 |
| Example 77 | 105 | 10 | Good | IR-44 |
| Example 78 | 115 | 5 | Good | IR-13 |
| Example 79 | 110 | 5 | Good | IR-21 |
| Example 80 | 110 | 5 | Good | IR-41 |
| Example 81 | 110 | 10 | Good | IR-43 |
| Comparative example 7 | 135 | 25 | Good | B-1 |
| Comparative example 8 | 140 | 25 | Good | B-2 |

As seen in Tables 1~3, all of the planographic printing plates of Examples 1~69 had a higher sensitivity to an infrared laser in comparison with the planographic printing plates of Comparative Examples 1~8. In addition, all of the planographic printing plates of Examples 1~69 exhibited a remarkably smaller difference between the sensitivities for the two dilution levels of the developer. Since these planographic printing plate precursors fulfilled the practicability requirement, i.e., a difference of not greater than 20 mJ/cm$^2$, these planographic printing plate precursors were found to have good latitude in development.

Further, based on the results of the storage stability test, the planographic printing plates of the present invention fulfilled the practicability requirement for storage stability, i.e., a difference in sensitivity of not greater than 20 mJ/cm$^2$ between before and after storage.

As stated above, the present invention makes it possible to provide a photosensitive composition that has good sensitivity, good stability of sensitivity with respect to variations in the concentrations of the developer (i.e. good latitude in development), and good storage stability. The planographic printing plate precursor using the composition can be used in a direct plate production process using an infrared laser and provides advantages characterized by high sensitivity, good latitude in development, and good storage stability.

What is claimed is:

1. A photosensitive composition for a planographic printing plate that comprises the following components (a) and (b) and becomes soluble in an aqueous alkaline solution by heat generated by irradiation with an infrared laser:

(a) the anionic, infrared-ray absorbing agent; and (b) a polymeric compound insoluble in water but soluble in an aqueous alkaline solution, wherein the anionic, infrared-ray absorbing agent includes a chemical structure that substantially absorbs infrared-ray radiation and generates heat, the chemical structure having a negative electric charge and the anionic infrared-ray absorbing agent is a compound represented by the following general formula (I):

$$\{G_a^- - M - G_b\}_m X^{m+} \qquad (I)$$

wherein, $G_a^-$ represents an anionic substituent group which includes an oxygen atom, a sulfur atom or a carbon atom; M represents a conjugated chain of carbon atoms; $G_b$ represents a neutral substituent group; and $X^{m+}$ represents a cation including a proton, said cation having a valence of from 1 to m, wherein m represents an integer ranging from 1 to 6.

2. A photosensitive composition according to claim 1, wherein a counter cation of (a) the anionic, infrared-ray absorbing agent has a construction of a thermally decomposable onium salt.

3. A photosensitive composition according to claim 1, wherein (a) the anionic, infrared-ray absorbing agent is the compound represented by the following general formula (1):

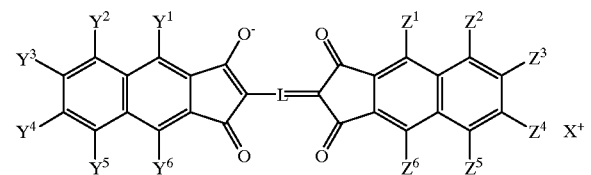

wherein, L represents a conjugated methine chain which has seven or more carbon atoms and which may contain substituent groups that may form a ring by linking together; $X^+$ represents a cation; $Y^1$ to $Y^6$ and $Z^1$ to $Z^6$ each independently represents a hydrogen atom or a substituent group such that substituent groups thereof may form a ring by linking together.

4. A photosensitive composition according to claim 1, wherein (a) the anionic, infrared-ray absorbing agent is the compound represented by the following general formula (2):

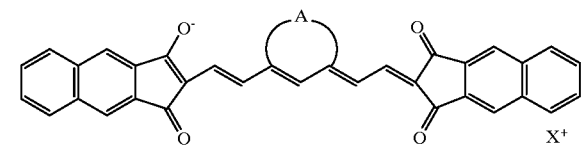

wherein, $X^+$ represents a cation; and A represents 14 or less nonmetallic atoms forming a 5-membered carbocycle, a 6-membered carbocycle, a 7-membered carbocycle, a 5-membered heterocycle, a 6-membered heterocycle, a 7-membered heterocycle, a 5-membered condensed ring, a 6-membered condensed ring or a 7-membered condensed ring, each of the nonmetallic atoms being selected from the group consisting of a carbon atom, a nitrogen atom, an oxygen atom, a sulfur atom and a selenium atom.

5. A photosensitive composition according to claim 1, wherein (a) the anionic, infrared-ray absorbing agent is the compound represented by the following general formula (3):

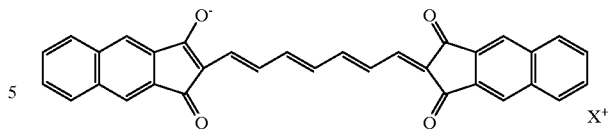

wherein, $X^+$ represents a cation.

6. A planographic printing plate precursor comprising a substrate and a photosensitive layer formed thereon, the photosensitive layer comprising the photosensitive composition of claim 1.

* * * * *